(12) United States Patent
Takashima et al.

(10) Patent No.: US 11,656,171 B2
(45) Date of Patent: May 23, 2023

(54) CONTROL APPARATUS, CONTROL METHOD, AND CONTROL SYSTEM

(71) Applicant: Sony Corporation, Tokyo (JP)

(72) Inventors: Masatoshi Takashima, Tokyo (JP); Tetsu Ogawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 1112 days.

(21) Appl. No.: 16/331,304

(22) PCT Filed: Sep. 8, 2017

(86) PCT No.: PCT/JP2017/032394
§ 371 (c)(1),
(2) Date: Mar. 7, 2019

(87) PCT Pub. No.: WO2018/056071
PCT Pub. Date: Mar. 29, 2018

(65) Prior Publication Data
US 2019/0369609 A1 Dec. 5, 2019

(30) Foreign Application Priority Data
Sep. 23, 2016 (JP) .............. JP2016-185346

(51) Int. Cl.
*A01G 7/04* (2006.01)
*G01N 21/31* (2006.01)
*G01N 21/84* (2006.01)

(52) U.S. Cl.
CPC .............. *G01N 21/31* (2013.01); *A01G 7/045* (2013.01); *G01N 2021/8466* (2013.01)

(58) Field of Classification Search
None
See application file for complete search history.

(56) References Cited

U.S. PATENT DOCUMENTS 6,624,887 B1 * 9/2003 Kramer .............. G01N 21/6486
356/322
8,302,346 B2 * 11/2012 Hunt ...................... A01G 7/045
47/DIG. 6

(Continued)

FOREIGN PATENT DOCUMENTS

JP 2012-163482 A 8/2012
JP 2014226064 A 12/2014

(Continued)

OTHER PUBLICATIONS

Utkhao, "Changes in leaf gas exchange and biomass of Eucalyptus camaldulensis in response to increasing drought stress induced by polyethylene glycol", Aug. 2015 (Year: 2015).*

(Continued)

*Primary Examiner* — Magdalena Topolski
(74) *Attorney, Agent, or Firm* — Michael Best & Friedrich LLP

(57) ABSTRACT

Embodiments include a control apparatus, a control method, and a control system that can effectively utilize an index regarding light incident on a measured object by obtaining the index effective for the measured object. The control apparatus can effectively utilize an effective index by controlling improvement of an environment that affects calculation of the effective index on the basis of the effective index representing an index that is related to light incident on a measured object and that is effectively utilized for the measured object. The measured object may be a plant.

18 Claims, 53 Drawing Sheets

(56) References Cited

U.S. PATENT DOCUMENTS 9,137,874 B2 * 9/2015 Maxik ............... H05B 45/22
10,473,592 B2 * 11/2019 Kramer ............ G01N 21/3563

FOREIGN PATENT DOCUMENTS

| JP | 2016065868 A | | 4/2016 | | |
|---|---|---|---|---|---|
| JP | 2016101145 A | | 6/2016 | | |
| KR | 20150033364 A | * | 4/2015 | | |
| KR | 20160042815 A | * | 4/2016 | | |
| NL | 1031466 C2 | | 10/2007 | | |
| WO | WO-2013184856 A1 | * | 12/2013 | ............ | A01G 7/045 |
| WO | WO-2015032428 A1 | * | 3/2015 | ......... | C12N 15/8261 |

OTHER PUBLICATIONS

Extended European Search Report dated Sep. 17, 2019 for corresponding European Application No. 17852848.5.
Japanese Office Action dated Nov. 30, 2021 for corresponding Japanese Application No. 2018-540960.

* cited by examiner

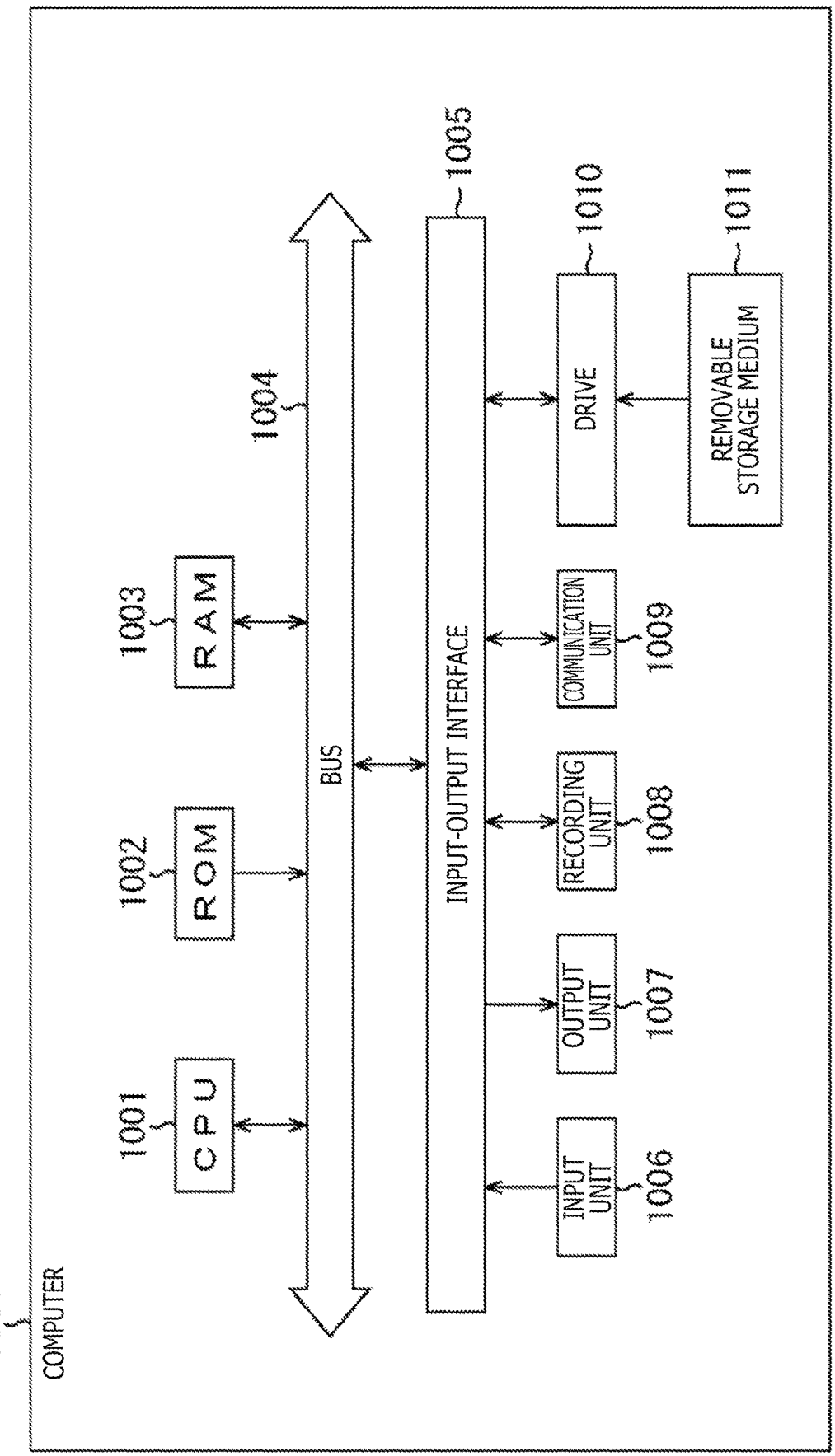

CONTROL APPARATUS, CONTROL METHOD, AND CONTROL SYSTEM

TECHNICAL FIELD

The present technique relates to a control apparatus, a control method, and a control system, and particularly, to a control apparatus, a control method, and a control system that can effectively utilize an index regarding light incident on a measured object by obtaining the index effective for the measured object.

BACKGROUND ART

It is known that the photosynthesis of a plant is affected by the number of photons that are particles of light, instead of the energy of light. In addition, a technique regarding a quantum meter that measures photon flux density effective for the photosynthesis of a plant is disclosed in PTL 1.

CITATION LIST

Patent Literature

[PTL 1]
JP 2012-163482A

SUMMARY

Technical Problem

Incidentally, although the quantum meter disclosed in PTL 1 pinpoints and measures the photon flux density effective for the photosynthesis of a plant, the measured index may not be an index effective for the plant. On the other hand, it is desirable to effectively utilize an index regarding light incident on a measured object by obtaining the index effective for the measured object.

The present technique has been made in view of the circumstances, and the present technique enables to effectively utilize an index regarding light incident on a measured object by obtaining the index effective for the measured object.

Solution to Problem

A first aspect of the present technique provides a control apparatus including a control unit acquiring information regarding improvement of an environment that affects calculation of an effective index on a basis of the effective index representing an index that is related to light incident on a measured object and that is effectively utilized for the measured object.

The control apparatus according to the first aspect of the present technique may be an independent apparatus or may be an internal block included in one apparatus. In addition, a control method according to the first aspect of the present technique is a control method corresponding to the control apparatus according to the first aspect of the present technique.

In the control apparatus and the control method according to the first aspect of the present technique, the information regarding the improvement of the environment that affects the calculation of the effective index is acquired on the basis of the effective index representing the index that is related to the light incident on the measured object and that is effectively utilized for the measured object.

A second aspect of the present technique provides a control system including a sensing apparatus sensing a measured object, an environment sensor sensing an environment around the measured object, an environment improvement apparatus improving an environment for the measured object, and a control apparatus controlling the environment improvement apparatus. The control apparatus includes a calculation unit calculating an effective index representing an index effectively utilized for the measured object as an index regarding light incident on the measured object on a basis of sensing results of the sensing apparatus and the environment sensor, and a control unit controlling the environment improvement apparatus on a basis of the effective index to improve an environment that affects the calculation of the effective index.

In the control system according to the second aspect of the present technique, the control apparatus calculates the effective index representing the index effectively utilized for the measured object as the index regarding the light incident on the measured object on the basis of the sensing results of the sensing apparatus and the environment sensor and controls the environment improvement apparatus on the basis of the effective index to improve the environment that affects the calculation of the effective index.

A third aspect of the present technique provides a control apparatus including a control unit controlling display of information obtained by controlling improvement of an environment that affects calculation of an effective index based on the effective index representing an index that is related to light incident on a measured object and that is effectively utilized for the measured object.

The control apparatus according to the third aspect of the present technique may be an independent apparatus or may be an internal block included in one apparatus. In addition, a control method according to the third aspect of the present technique is a control method corresponding to the control apparatus according to the third aspect of the present technique.

In the control apparatus and the control method according to the third aspect of the present technique, the display of the information obtained by controlling the improvement of the environment that affects the calculation of the effective index is controlled on the basis of the effective index representing the index that is related to the light incident on the measured object and that is effectively utilized for the measured object.

Advantageous Effect of Invention

According to the present technique, the index regarding the light incident on the measured object can be effectively utilized by obtaining the index effective for the measured object.

Note that the advantageous effect described here is not limited, and the advantageous effect may be any of the advantageous effects described in the present disclosure.

BRIEF DESCRIPTION OF DRAWINGS

FIG. 53 is a diagram illustrating a configuration example of a computer.

DESCRIPTION OF EMBODIMENTS

Hereinafter, embodiments of the present technique will be described with reference to the drawings. Note that the embodiments will be described in the following order.

1. Overview of the Present Technique
2. Configuration of System
3. Procedure of Calculating Effective PPFD value
(1) Effective PPFD Value Calculation Process
(2) Measurement Example of Sensing Apparatus
(3) Photosystem Reaction Maximum ETR Calculation Process
(4) Carbon Reduction Reaction Maximum ETR Calculation Process
(5) Display Example of Effective PPFD Value and the Like
4. Utilization Method of Effective PPFD Value
(1) Real-Time Environment Control
(2) Predicted Environment Control
5. Modifications
6. Configuration of Computer <1. Overview of the Present Technique>

Figure 1:
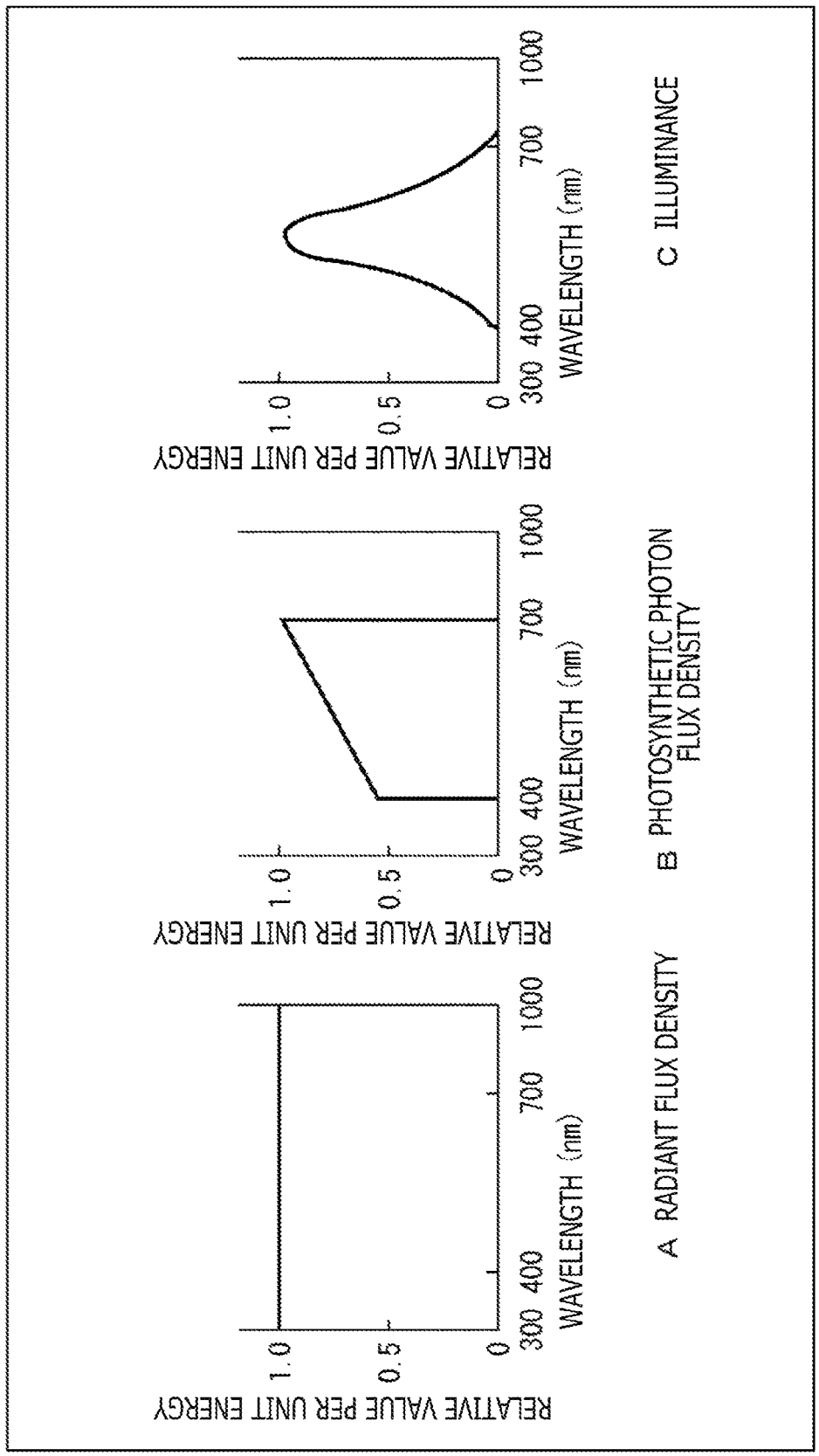
FIG. 1 is a diagram describing units related to light.

FIG. 1 is a diagram describing units related to light.

A of FIG. 1 is a diagram illustrating a relative value per unit energy at each wavelength of radiant flux density. The radiant flux density is a sum of energy intensity at each wavelength. Therefore, the characteristics of the radiant flux density are flat at any wavelength. Note that the radiant flux density measured by using a filter for transmitting only a wavelength range of 400 nm to 700 nm effective for photosynthesis is called photosynthetic radiant flux density.

B of FIG. 1 is a diagram illustrating a relative value per unit energy at each wavelength of photosynthetic photon flux density. Here, the photosynthesis of plants is affected by the number of light quanta (photons) that are particles of light, instead of the energy of light. The photosynthetic photon flux density (PPFD) indicates the number of photons at the wavelength of 400 nm to 700 nm, which is an absorption wavelength of chlorophyll, incident on a unit area in a unit time. That is, the photosynthetic photon flux density (PPFD) is a unit expressed by the number of light quanta (photons) that are particles of light, instead of the energy of light.

C of FIG. 1 is a diagram illustrating a relative value per unit energy at each wavelength of illuminance. The illuminance has characteristics according to the sensitivity of human eyes. Therefore, in a case where light with certain energy is applied as illustrated in A of FIG. 1, the energy is zero at wavelengths equal to or lower than 400 nm and equal to or higher than 700 nm as illustrated in C of FIG. 1. Therefore, the illuminance is a unit not related to the photosynthesis of plants, and the unit cannot be used to evaluate the light environment of plants.

The light as an environmental condition that affects the growth is a significantly important element for plants, and it is important here to consider the light as particles. Therefore, the light incident on the plant is used as an index indicating the effect on the photosynthesis, and the photosynthetic photon flux density (PPFD) is defined as illustrated in B of FIG. 1. Hereinafter, the photosynthetic photon flux density (PPFD) will also be referred to as a PPFD value.

In addition, the number of photons that allows the plant to effectively utilize the light is significantly affected by environmental conditions, such as temperature, humidity, carbon dioxide ($CO_2$), and nutrients, as well as the type and the state of the plant.

For example, a case in which the light effective for the plant is 500 umol/m² will be considered. In the illustrated case, light at 2000 umol/m² is applied to the plant for three hours around noon of a day, and there is almost no sunlight after that. In this case, although the total number of photons is 6000 umol/m² (2000 umol/m²×3 h), the number of photons actually effective for the plant is 1500 umol/m² (500 umol/m²×3 h).

On the other hand, in a case where light at 500 umol/m² is applied to the plant for six hours, the total number of photons is 3000 umol/m² (500 umol/m²×6 h). In this case, the number of photons effective for the plant is also 3000 umol/m² (500 umol/m²×6 h).

Here, when the former case and the latter case are compared, it can be stated that sunshine is more effective in the latter case with a larger number of effective photons. In this way, even when the photosynthetic photon flux density (PPFD) of the light applied to the plant can be measured, the measured photosynthetic photon flux density (PPFD) may not be actually effectively utilized for the plant.

(Photosystem Reaction and Carbon Reduction Reaction of Photosynthesis)

Figure 2:
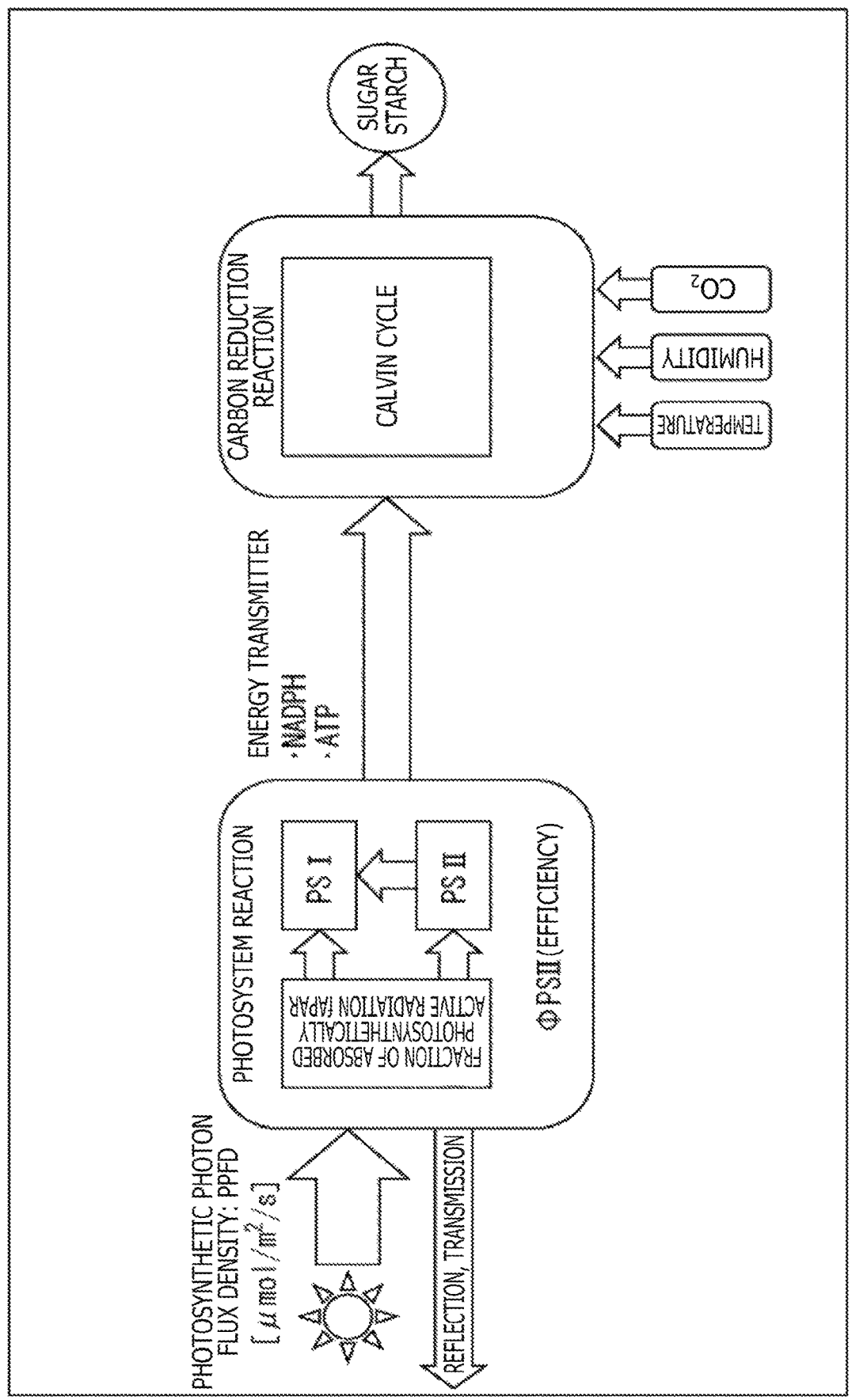
FIG. 2 is a diagram describing photosystem reaction and carbon reduction reaction of photosynthesis.

FIG. 2 is a diagram describing photosystem reaction and carbon reduction reaction of photosynthesis.

As illustrated in FIG. 2, the photosynthesis is roughly classified into two stages including photosystem reaction and carbon reduction reaction.

The photosystem reaction (photochemical reaction) in the first stage is a system for converting light energy into chemical energy. When sunlight with a certain PPFD value is applied to a plant, light reflection and transmission occur in the plant, and therefore, the amount of light actually absorbed is limited. Here, the ratio of the amount of light actually absorbed to the photosynthetically active radiation (PAR) absorbed by the plant is called fraction of absorbed photosynthetically active radiation (fAPAR).

The absorbed light is further separated into a photosystem I (PSI) and a photosystem II (PSII). Nicotinamide adenine dinucleotide phosphate (NADPH) and adenosine triphosphate (ATP) as energy transmitters are generated on the basis of a quantum yield (ΦPSII) of the photosystem reaction, and they are transported as energy sources of the carbon reduction reaction in the second stage.

Here, the quantum yield (ΦPSII) of the photosystem reaction denotes an electron transport rate per photoelectron absorbed by the chlorophyll of the photosystem II (PSII).

In addition, the nicotinamide adenine dinucleotide phosphate (NADPH) exists anywhere in a living body. There are a "reduction type" and an "oxidation type," and the nicotinamide adenine dinucleotide phosphate plays a role of carrying electrons and hydrogen. The adenosine triphosphate (ATP) is widely distributed in a living body. Through separation and bonding of one molecule of phosphoric acid, the adenosine triphosphate releases and stores energy and plays an important role of metabolism and synthesis of substance.

The carbon reduction reaction in the second stage includes a circuit called Calvin cycle (Calvin circuit). In the Calvin cycle, carbon dioxide ($CO_2$) and water ($H_2O$) are introduced. The carbon dioxide and the water are used as ingredients, and the nicotinamide adenine dinucleotide phosphate (NADPH) and the adenosine triphosphate (ATP) generated in the photosystem reaction of the first stage are used as energy to generate sugar and starch.

Here, the photosynthesis is a phenomenon with a series of photosystem reaction and carbon reduction reaction. Therefore, if one of the rate of the photosystem reaction and the rate of the carbon reduction reaction is slow, the slow rate becomes a bottleneck, and the rate of the entire photosynthesis is determined by the bottleneck.

Figure 3:
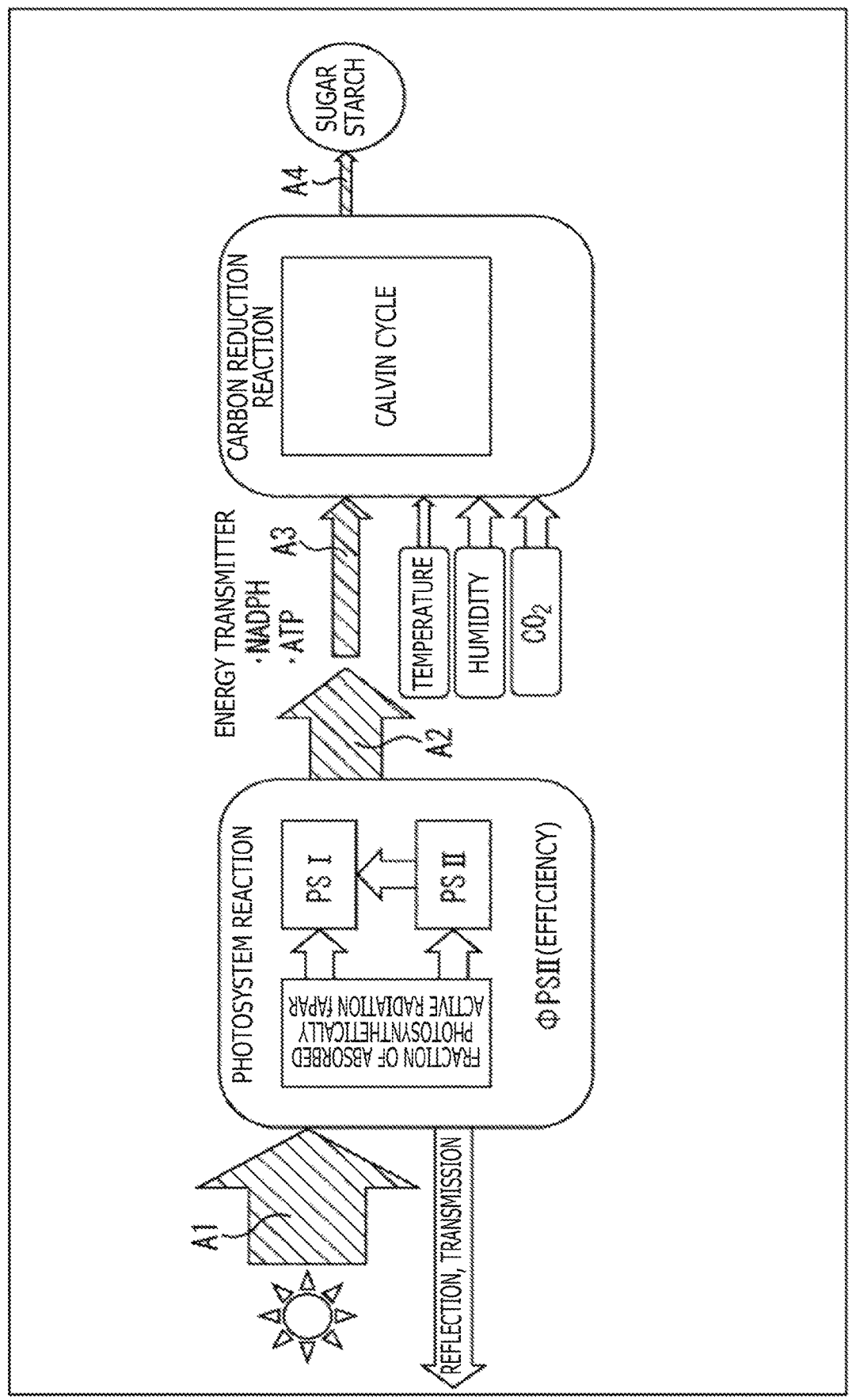
FIG. 3 is a diagram illustrating an example of comparison of the photosystem reaction and the carbon reduction reaction.

Specifically, in the case where the light effective for the plant is 500 umol/m² as described above, the case of applying the light at 2000 umol/m² to the plant for three hours can be expressed by a relationship illustrated in FIG. 3. On the other hand, in the case where the light effective for the plant is 500 umol/m², the case of applying the light at 500 umol/m² to the plant for six hours can be expressed by a relationship illustrated in FIG. 4.

Figure 4:
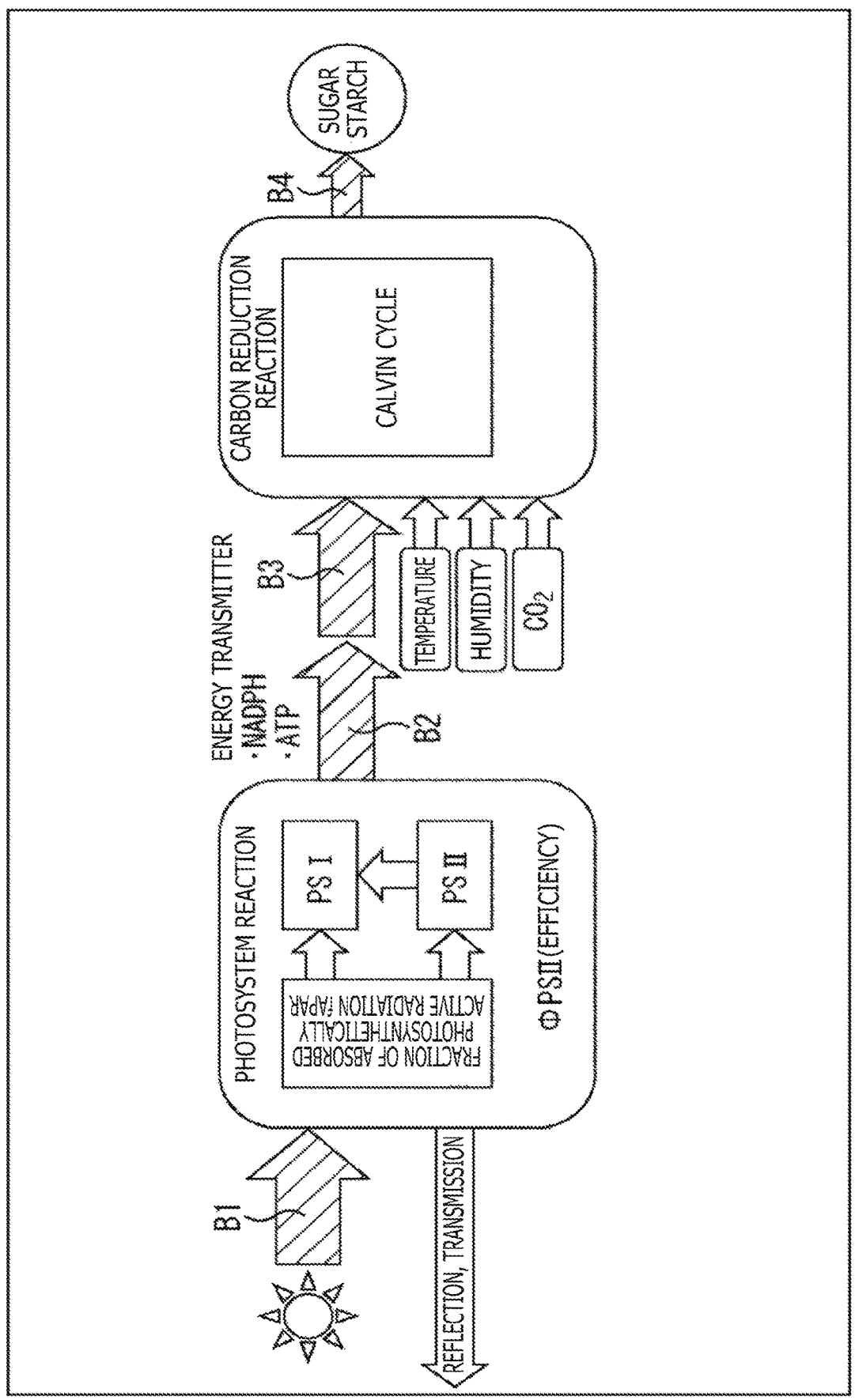
FIG. 4 is a diagram illustrating an example of comparison of the photosystem reaction and the carbon reduction reaction.

More specifically, comparing the case of FIG. 3 and the case of FIG. 4, the widths of arrows A1 to A4 are gradually narrowed down in the case of FIG. 3, while the widths of arrows B1 to B4 are not changed much in the case of FIG. 4. In this case, there are more effective photons in the case of FIG. 4 than in the case of FIG. 3, and the sunshine is more effective.

In the present technique, the location of the bottleneck of the photosystem reaction and the carbon reduction reaction of photosynthesis can be determined to calculate the photosynthetic photon flux density (PPFD) effective for the plant. Hereinafter, the PPFD value will be referred to as an effective PPFD value. That is, the effective PPFD value represents an amount of photons actually contributed to the growth of the plant among the photons applied to the plant. Note that the unit of the effective PPFD value can be umol/m²/s, umol/m²/day, or the like as in the case of the effective PPFD value.

Figure 5:
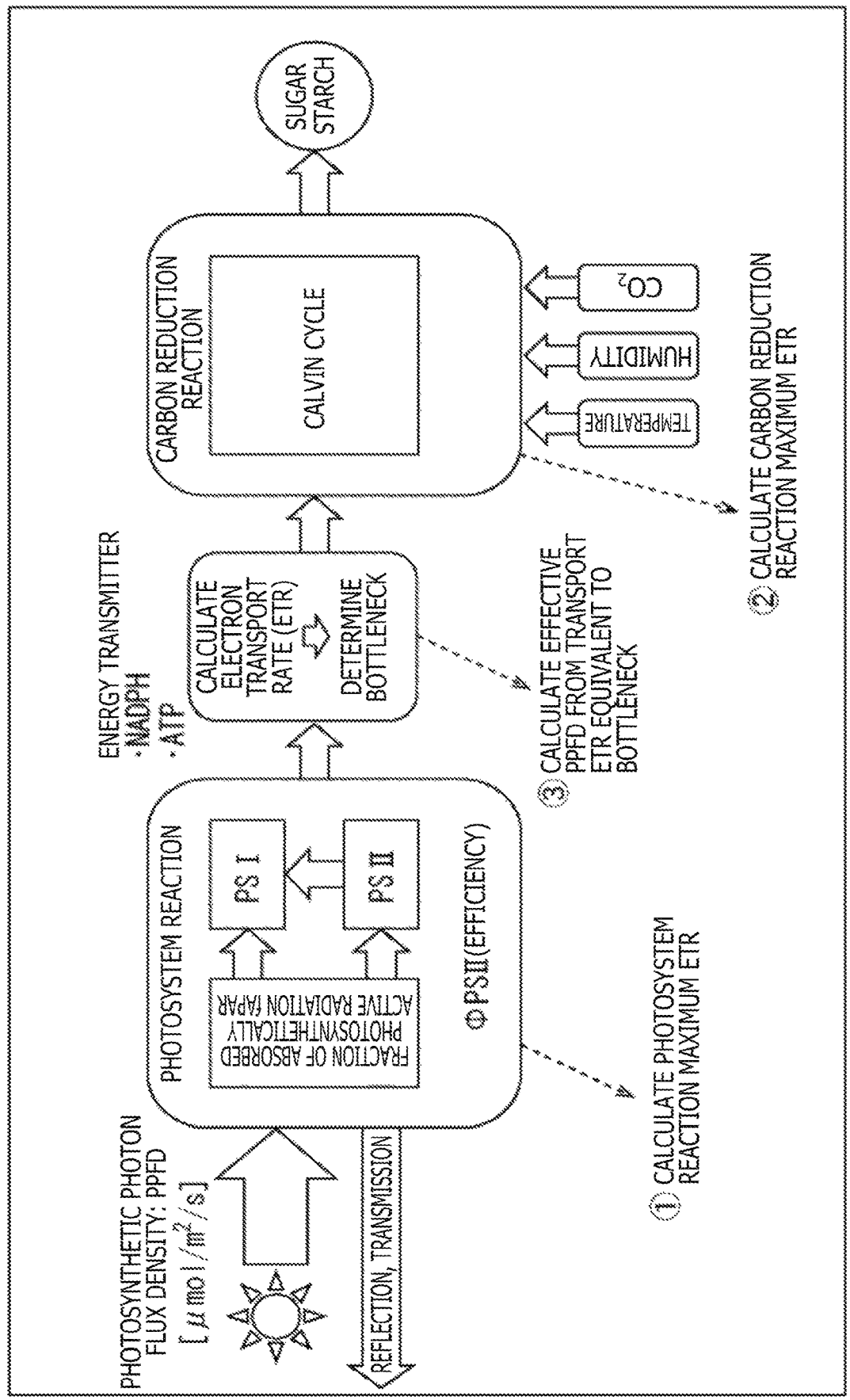
FIG. 5 is a diagram illustrating a procedure of calculating an effective PPFD value.

Here, procedures of calculating the effective PPFD value can be expressed by three procedures illustrated in FIG. 5.

That is, in the first procedure, an electron transport rate (ETR) equivalent to energy output from the photosystem reaction is calculated as a photosystem reaction maximum ETR. The photosystem reaction maximum ETR represents a maximum electron transport rate (ETR) determined by photosystem reaction performance of the plant when the photosystem reaction and the carbon reduction reaction are separated. The unit of the photosystem reaction maximum ETR is umol/m²/s.

Next, in the second procedure, an electron transport rate (ETR) equivalent to a maximum photosynthetic rate of the carbon reduction reaction decided from the environment and the type of plant is calculated as a carbon reduction reaction maximum ETR. The carbon reduction reaction maximum ETR represents a maximum electron transport rate (ETR) determined by carbon reduction reaction performance of the plant when the photosystem reaction and the carbon reduction reaction are separated. The unit of the carbon reduction reaction maximum ETR is umol/m²/s.

Then, in the third procedure, a bottleneck is determined (specified) from the photosystem reaction maximum ETR calculated in the first procedure and the carbon reduction reaction maximum ETR calculated in the second procedure, and a PPFD value equivalent to a transport ETR equivalent to the bottleneck is calculated as an effective PPFD value. The transport ETR represents an electron transport rate (ETR) dependent on a photosynthetic rate of the plant calculated from the photosystem reaction maximum ETR and the carbon reduction reaction maximum ETR. The unit of the transport ETR is umol/m²/s.

Note that the electron transport rate (ETR) represents an amount of oxidation-reduction (so-called electron transport activity) per unit time of electron transport complexes. Examples of photosynthetic electron transport system include reaction center complexes (photosystem I, photosystem II, and photosynthetic bacteria) and a cytochrome complex. A mobile electron carrier, such as plastocyanin and cytochrome, is used to exchange electrons between the complexes. The unit of the electron transport rate (ETR) is umol/m²/s.

Hereinafter, a calculation method of the effective PPFD value according to the present technique will be described.

<2. Configuration of System>
(Configuration of Effective Index Computation System)

Figure 6:
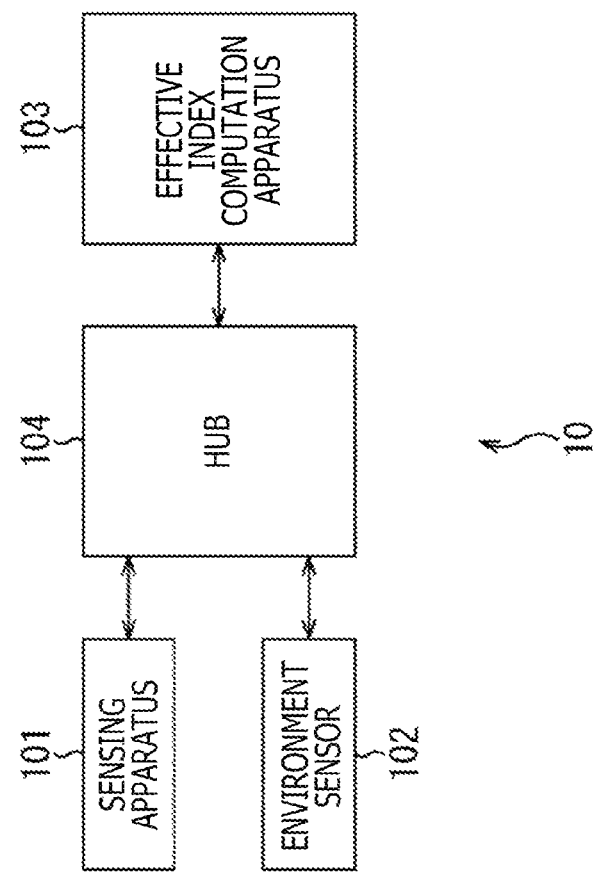
FIG. 6 is a diagram illustrating a configuration of an embodiment of an effective index computation system according to the present technique.

FIG. 6 is a diagram illustrating a configuration of an embodiment of an effective index computation system according to the present technique.

An effective index computation system 10 is a system for sensing a measured object to calculate an effective index, such as an effective PPFD value, on the basis of the result of sensing. That is, the effective index computation system 10 sets a plant (vegetation) as a measured object and calculates the effective PPFD value as an effective index in a case of obtaining a PPFD value (photosynthetic photon flux density (PPFD)) as an index of the plant.

In FIG. 6, the effective index computation system 10 includes a sensing apparatus 101, an environment sensor 102, and an effective index computation apparatus 103. The sensing apparatus 101, the environment sensor 102, and the effective index computation apparatus 103 are connected to each other through a hub 104.

The sensing apparatus 101 senses the measured object and outputs data obtained by the sensing. Here, the sensing means measurement of the measured object. The sensing also includes imaging of the measured object.

The sensing apparatus 101 senses the measured object and outputs the measurement results as index measurement data to the effective index computation apparatus 103 through the hub 104. The index measurement data is data for obtaining indices, such as a PPFD value and an NDVI value. Here, the normalized difference vegetation index (NDVI) is an index indicating the distribution condition or activity of vegetation. Note that the normalized difference vegetation index (NDVI) is an example of a vegetation index.

Note that the detailed configuration of the sensing apparatus 101 will be described later with reference to FIG. 7.

The environment sensor 102 is a sensor for measuring the air environment, such as temperature, humidity, and $CO_2$ concentration. The environment sensor 102 senses the temperature, the humidity, and the $CO_2$ concentration in the air around the measured object and outputs the measurement results as environment measurement data to the effective index computation apparatus 103 through the hub 104.

The effective index computation apparatus 103 is an apparatus with a computation function of a circuit, such as a CPU (Central Processing Unit) and an FPGA (Field Programmable Gate Array). For example, the effective index computation apparatus 103 is configured as a personal computer, a dedicated terminal apparatus, or the like. The index measurement data from the sensing apparatus 101 and the environment measurement data from the environment sensor 102 are input to the effective index computation apparatus 103 through the hub 104.

The effective index computation apparatus 103 calculates the effective PPFD value on the basis of the index measurement data and the environment measurement data. Here, the processes equivalent to the procedures 1 to 3 illustrated in FIG. 5 can be executed to calculate the effective PPFD value as an effective index for an index that is a PPFD value.

Note that the detailed configuration of the effective index computation apparatus 103 will be described later with reference to FIG. 8.

The effective index computation system 10 is configured in this way.

(Configuration of Sensing Apparatus)

Figure 7:
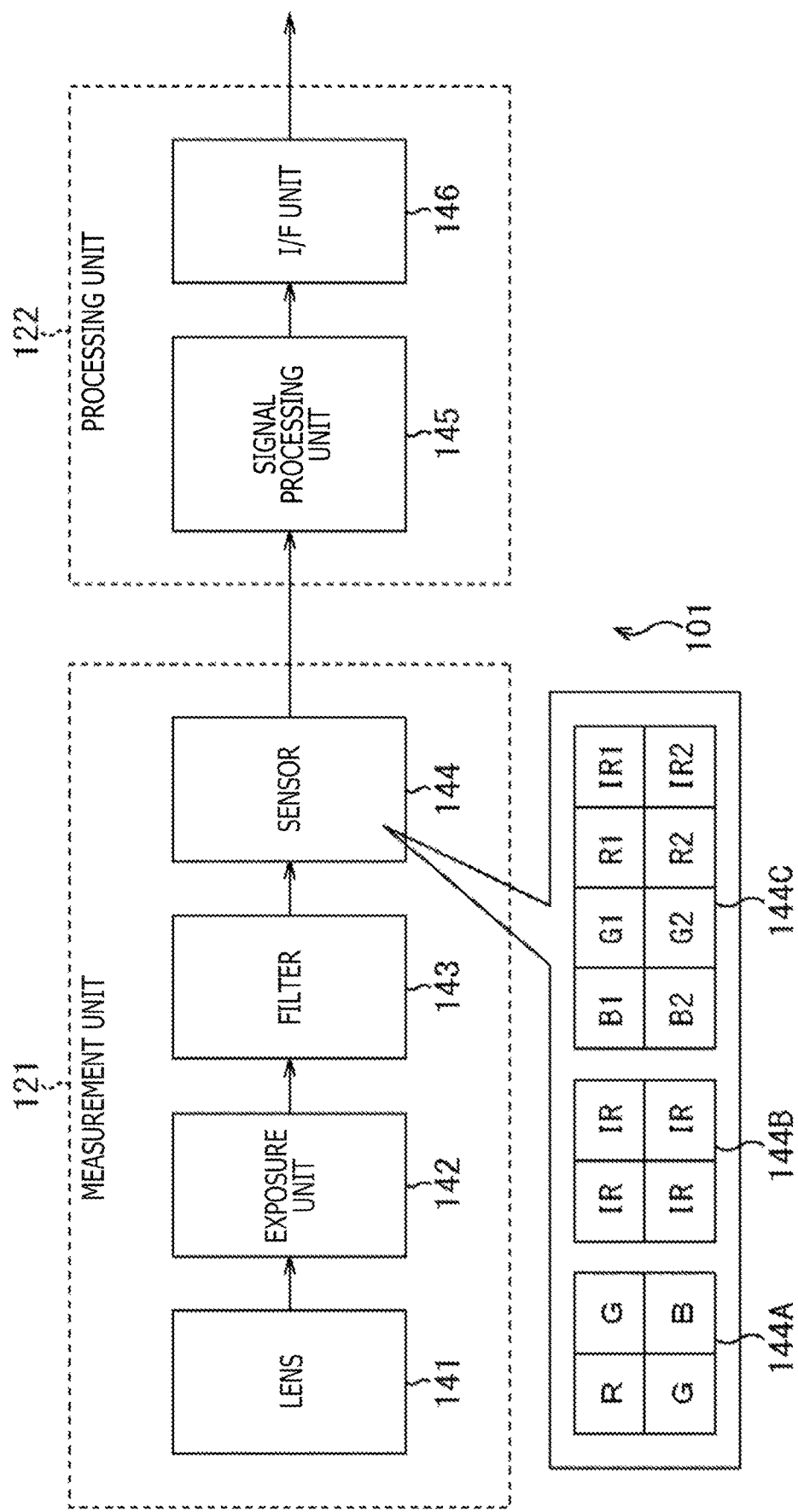
FIG. 7 is a diagram illustrating a configuration example of a sensing apparatus.

FIG. 7 is a diagram illustrating a configuration example of the sensing apparatus 101 of FIG. 6.

In FIG. 7, the sensing apparatus 101 includes: a measurement unit 121 including a lens 141, an exposure unit 142, a filter 143, and a sensor 144; and a processing unit 122 including a signal processing unit 145 and an I/F unit 146.

In the sensing apparatus 101, the light (reflected light) from an object, such as a measured object, enters the sensor 144 through the lens 141 and the filter 143.

The exposure unit 142 controls the exposure by adjusting an optical system such as the lens 141 or by adjusting an amount of opening of an iris (diaphragm) so that the sensor 144 performs the sensing in a state in which the signal charge is in the dynamic range without saturation. However, the exposure can also be controlled by remote control from the effective index computation apparatus 103.

The filter 143 is an optical filter corresponding to the index to be measured (effective index). The filter 143 transmits the light entered through the lens 141 to the sensor 144.

The sensor 144 is an image sensor including a sensor surface provided with a sensing element including a plurality of pixels two-dimensionally arrayed in a repeated pattern. The sensing element detects the light passing through the filter 143, and the sensor 144 outputs the measurement signal (measurement data) according to the amount of light to the signal processing unit 145.

Here, for example, RGB signals are necessary in the case of calculating the PPFD value as an index, and the filter 143 includes a combination of RGB filters and an IR cut filter. In this case, a Bayer array can be used to two-dimensionally array a plurality of pixels in the sensing element of the sensor 144 as illustrated for example by an array pattern 144A of FIG. 7.

Here, the Bayer array is an array pattern including G pixels of green (G) arranged in a checkered pattern and including R pixels of red (R) and B pixels of blue (B) alternately arranged line by line in the remaining part. In addition, the array pattern of the plurality of pixels two-dimensionally arrayed in the sensing element of the sensor 144 is not limited to the Bayer array illustrated by the array pattern 144A, and other array patterns may also be adopted. Note that filters of visible regions, such as red (R), green (G), and blue (B), can be provided to take images to be presented to the user, and the images can be presented at the same time.

In addition, for example, IR signals are necessary in the case of calculating the NDVI value as an index, and an IR filter is provided as the filter 143. In this case, all pixels are two-dimensionally arrayed as IR pixels corresponding to components of the infrared region (IR) in the sensing element of the sensor 144 as illustrated for example by an array pattern 144B of FIG. 7.

Furthermore, although the array pattern 144A of FIG. 7 includes the IR cut filter in the described configuration, the IR cut filter may not be provided. In this case, R, G, and B pixels corresponding to the RGB filters that transmit the wavelengths of the visible light of red (R), green (G), and blue (B) as well as IR pixels corresponding to the components of the infrared region (IR) are arranged in the sensing element of the sensor 144 as illustrated for example by an array pattern 144C of FIG. 7.

In the array pattern 144C of FIG. 7, for example, one set of pixels includes 4×2 pixels, in which four pixels are arranged in the horizontal direction, and two pixels are arranged in the vertical direction (two R pixels (R1 and R2), two G pixels (G1 and G2), two B pixels (B1 and B2), and two IR pixels (IR1 and IR2)). Furthermore, a plurality of pixels included in n (n is an integer equal to or greater than 1) sets, each set including eight pixels, are repeatedly arranged on the sensor surface of the sensing element. Note that the number of pixels per set is not limited to eight pixels, and other modes can also be adopted, such as one set including four pixels including one R pixel, one G pixel, one B pixel, and one IR pixel.

Note that in the case of calculating the PPFD value as an index, an optical filter corresponding to the PPFD value may be provided as the filter 143 instead of the RGB filters and the IR cut filter. That is, the optical filter corresponding to the PPFD value is a filter that allows the sensor 144 in the second stage to detect the light according to the PPFD value. Therefore, the light passing through the filter 143 has characteristics similar to the photosynthetic photon flux density (PPFD) illustrated in B of FIG. 1.

The signal processing unit 145 applies predetermined signal processing, such as a process of sorting the data, to the measurement data output from the sensor 144 and outputs the measurement data to the I/F unit 146.

Note that although the indices, such as the PPFD value and the NDVI value, are calculated by the effective index computation apparatus 103 of the second stage in the description of the present embodiment, the signal processing unit 145 may include a circuit, such as a CPU and an FPGA, to calculate the indices, such as the PPFD value and the NDVI value, on the basis of the measurement data.

The I/F unit 146 includes an external output interface circuit or the like. The I/F unit 146 sets the measurement data supplied from the signal processing unit 145 as index measurement data and outputs the index measurement data to the effective index computation apparatus 103 through the hub 104.

The sensing apparatus 101 is configured in this way.

Note that in the following description, the effective index computation system 10 includes a plurality of sensing apparatuses 101 in some cases. In that case, reference signs, such as "-1" and "-2," are added to describe and distinguish the plurality of sensing apparatuses 101. The filter 143, the sensor 144, and the like in the sensing apparatus 101 are also similarly distinguished.

(Configuration of Effective Index Computation Apparatus)

Figure 8:
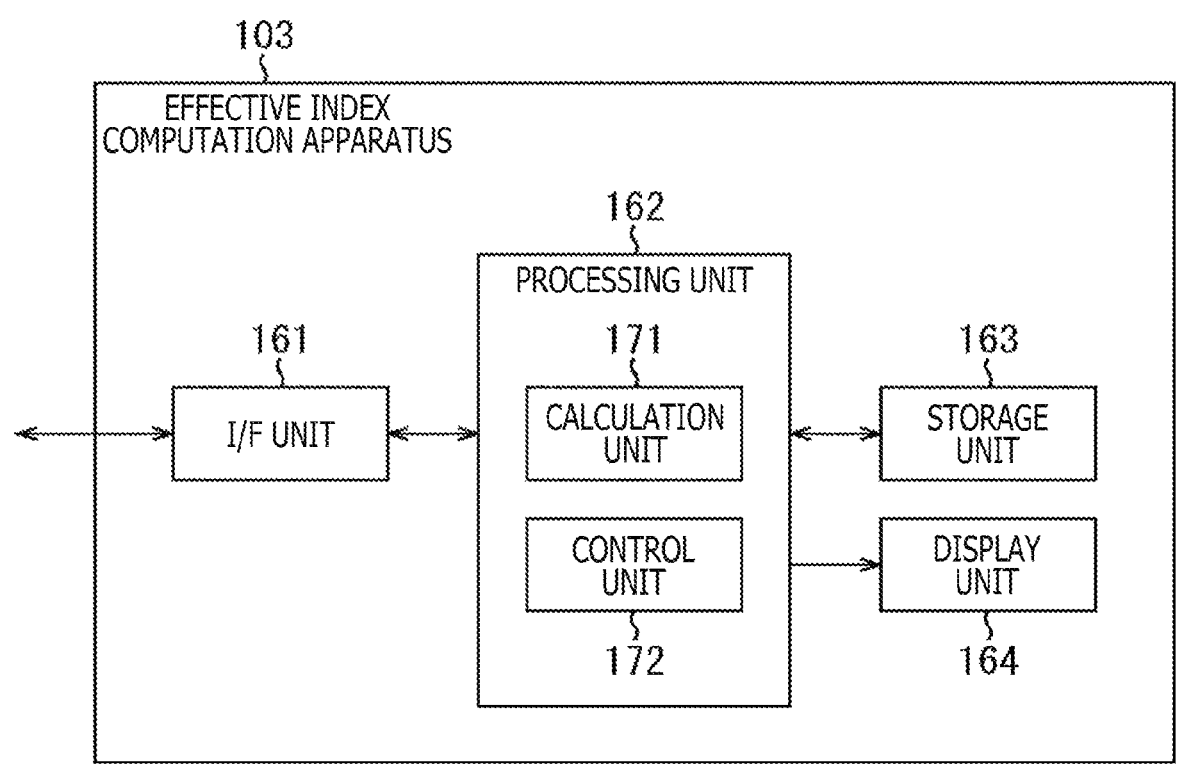
FIG. 8 is a diagram illustrating a configuration example of an effective index computation apparatus.

FIG. 8 is a diagram illustrating a configuration example of the effective index computation apparatus 103 of FIG. 6.

In FIG. 8, the effective index computation apparatus 103 includes an I/F unit 161, a processing unit 162, a storage unit 163, and a display unit 164.

The I/F unit 161 includes an external input interface circuit or the like and supplies the index measurement data input from the sensing apparatus 101 and the environment measurement data input from the environment sensor 102 to the processing unit 162.

The processing unit 162 includes, for example, a circuit, such as a CPU and an FPGA. The processing unit 162 includes a calculation unit 171 and a control unit 172.

The calculation unit 171 refers to look-up tables (LUTs) stored in the storage unit 163 to apply predetermined signal processing to the index measurement data and the environment measurement data supplied from the I/F unit 161 to calculate the effective PPFD value.

Although the details of the signal processing will be described later, a photosystem reaction maximum ETR calculation process and a carbon reduction reaction maximum ETR calculation process are executed here as processes equivalent to the procedures 1 to 3 illustrated in FIG. 5, and a photosystem reaction maximum ETR and a carbon reduction reaction maximum ETR obtained as a result of the processes are compared to decide a bottleneck. Furthermore, the PPFD value equivalent to the ETR (transport ETR) corresponding to the bottleneck is calculated as an effective PPFD value.

The control unit 172 controls operation of each unit of the effective index computation apparatus 103. For example, the control unit 172 controls display of various types data, such as numeric data and image data, displayed on the display unit 164. The control unit 172 can also control external apparatuses, such as the sensing apparatus 101 and the environment sensor 102.

The storage unit 163 includes, for example, a semiconductor memory or the like. The storage unit 163 stores various types of data, such as numeric data and image data, according to the control from the control unit 172. Furthermore, look-up tables (LUTs) for calculating the effective PPFD value are stored in advance in the storage unit 163.

Although the details will be described later, examples of the look-up tables include a coefficient calculation LUT (LUT1), an fAPAR calculation LUT (LUT2), a ΦPSII calculation LUT (LUT3), a $CO_2$-limited photosynthetic rate LUT (LUT4), a temperature correction coefficient LUT (LUT5), and a humidity correction coefficient LUT (LUT6). Note that the reference information for calculating the values are not limited to the look-up tables, and for example, predetermined functions may be stored. In that case, the values can be obtained with reference to the functions.

The display unit 164 includes, for example, a display, such as an LCD (Liquid Crystal Display) and an OLED (Organic Light-Emitting Diode). The display unit 164 displays data (for example, numeric data and image data) regarding the effective PPFD value calculated by the calculation unit 171 according to the control from the control unit 172. The display unit 164 can also display various types of data stored in the storage unit 163 according to the control from the control unit 172.

Note that although the storage unit 163 and the display unit 164 are provided in the effective index computation apparatus 103 in the description of FIG. 8, a storage apparatus and a display apparatus may be provided outside of the effective index computation apparatus 103. In that case, the calculation unit 171 acquires the look-up tables from the external storage apparatus through a network. In addition, the control unit 172 can display, on the external display apparatus, various types of data, such as numeric data and image data, obtained by the signal processing or may store the data in the external storage apparatus.

The effective index computation apparatus 103 is configured in this way.

(Another Configuration of Effective Index Computation System)

Incidentally, although the effective index computation apparatus 103, such as a personal computer, calculates the effective PPFD value in a local environment through the hub 104 in the effective index computation system 10 illustrated in FIG. 6, the effective PPFD value may be calculated in a cloud environment through a network.

Figure 9:
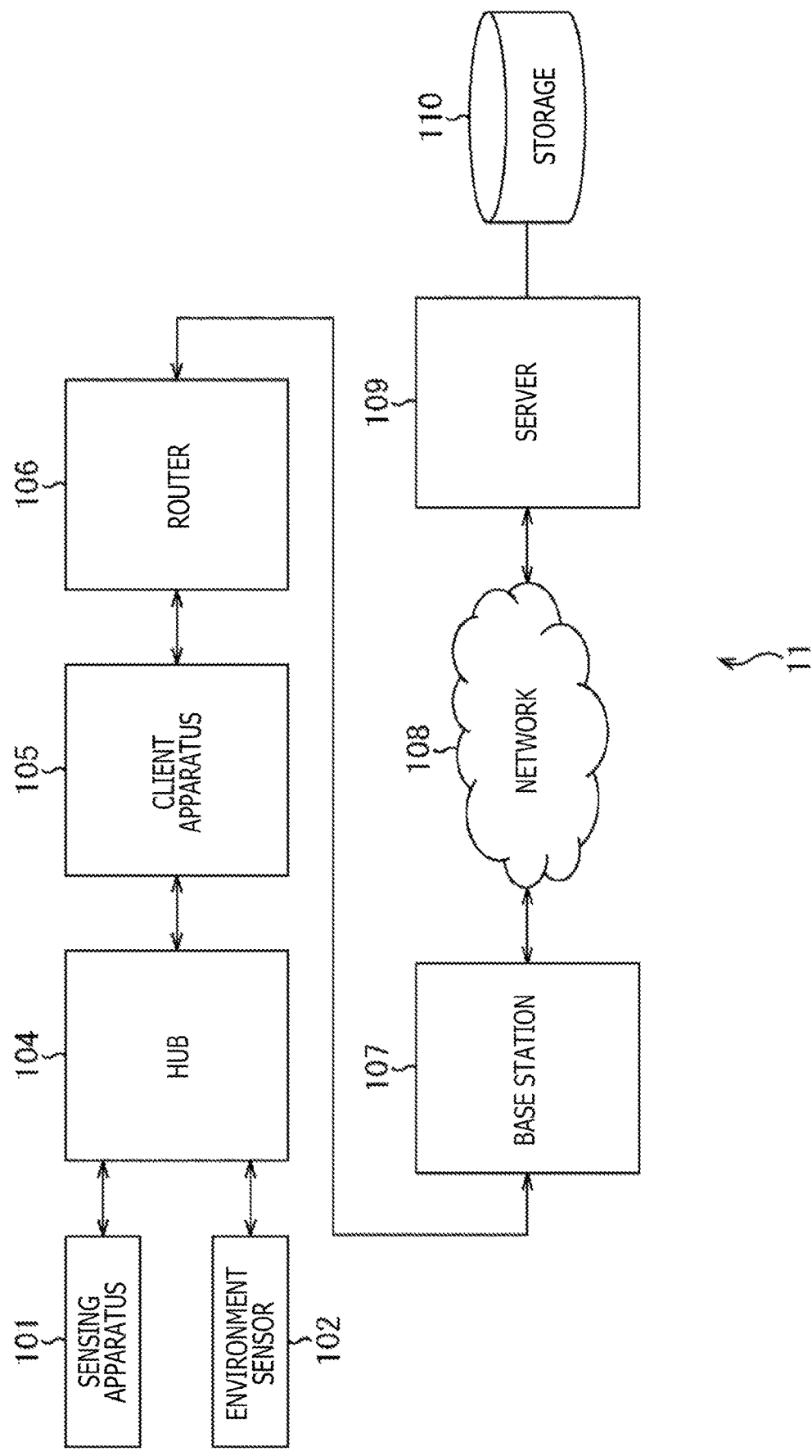
FIG. 9 is a diagram illustrating another configuration example of the effective index computation system.

FIG. 9 illustrates a configuration example of an effective index computation system 11 corresponding to the cloud environment as another configuration example of the effective index computation system.

In the effective index computation system 11 of FIG. 9, the sensing apparatus 101 and the environment sensor 102 measure the index measurement data and the environment measurement data and output the data to a client apparatus 105 through the hub 104 as in the sensing apparatus 101 and the environment sensor 102 of FIG. 6.

The client apparatus 105 includes a personal computer or the like and outputs the index measurement data and the environment measurement data input from the sensing apparatus 101 and the environment sensor 102 to a router 106 through the hub 104. That is, although the client apparatus 105 corresponds to the effective index computation apparatus 103 of FIG. 6, the client apparatus 105 does not execute the signal processing for calculating the effective PPFD value.

The router 106 is, for example, a router for mobile and can be connected to a network 108, such as the Internet, through a base station 107. The router 106 transmits the index measurement data and the environment measurement data input from the client apparatus 105 to a server 109 through the network 108.

The server 109 receives the index measurement data and the environment measurement data transmitted from the client apparatus 105 through the network 108. Here, the sensor 109 has at least functions similar to the processing unit 162 and the storage unit 163 among the functions of the effective index computation apparatus 103 illustrated in FIG. 8.

That is, the calculation unit 171 of the processing unit 162 in the server 109 refers to the look-up tables stored in the storage unit 163 to apply predetermined signal processing to the index measurement data and the environment measurement data received from the client apparatus 105 to execute processes equivalent to the procedures 1 to 3 illustrated in FIG. 5 to calculate the effective PPFD value.

In a case where the server 109 includes the display unit 164 or a case where the server 109 and the display unit 164 can communicate, various types of data, such as numeric data and image data, obtained by the signal processing of the calculation unit 171 can be displayed on the display unit 164. The various types of data, such as numeric data and image data, may also be stored in a storage 110. The sensor 109 can also read the various types of data stored in the storage 110 and display the data on the display unit 164.

The effective index computation system 11 is configured in this way.

<3. Procedure of Calculating Effective PPFD Value>

(1) Effective PPFD Value Calculation Process (Flow of Effective PPFD Value Calculation Process)

First, a flow of an effective PPFD value calculation process executed by the effective index computation system 10 of FIG. 6 will be described with reference to a flow chart of FIG. 10.

In step S101, the sensing apparatus 101 and the environment sensor 102 perform sensing and acquire data obtained by the sensing.

Here, the index measurement data obtained by the sensing of the sensing apparatus 101 and the environment measurement data obtained by the sensing of the environment sensor 102 are output to the effective index computation apparatus 103 through the hub 104. Note that a measurement example of the measured object measured by the sensing apparatus 101 will be described later with reference to FIGS. 11 to 14.

In step S102, the calculation unit 171 of the effective index computation apparatus 103 executes a photosystem reaction maximum ETR calculation process on the basis of the data obtained in the process of step S101.

In the photosystem reaction maximum ETR calculation process, a process equivalent to the first procedure illustrated in FIG. 5 is executed, and an electron transport rate (ETR) equivalent to the energy output from the photosystem reaction is calculated as a photosystem reaction maximum ETR. Note that details of the photosystem reaction maximum ETR calculation process will be described later with reference to FIGS. 15 to 19.

In step S103, the calculation unit 171 of the effective index computation apparatus 103 executes a carbon reduction reaction maximum ETR calculation process on the basis of the data obtained in the process of step S101.

In the carbon reduction reaction maximum ETR calculation process, a process equivalent to the second procedure illustrated in FIG. 5 is executed, and an electron transport rate (ETR) equivalent to the maximum photosynthetic rate of the carbon reduction reaction decided from the environment and the type of plant is calculated as a carbon reduction reaction maximum ETR. Note that details of the carbon reduction reaction maximum ETR calculation process will be described later with reference to FIGS. 20 and 21.

In step S104, the calculation unit 171 of the effective index computation apparatus 103 compares the photosystem reaction maximum ETR calculated in the process of step S102 and the carbon reduction reaction maximum ETR calculated in the process of step S103 and decides a bottleneck according to the comparison result.

Here, the photosystem reaction maximum ETR as a maximum value of the photosystem reaction and the carbon reduction reaction maximum ETR as a maximum value of the carbon reduction reaction are compared, and the smaller one is determined as the bottleneck. That is, if the photosystem reaction maximum ETR is smaller, the current photosynthetic rate is limited by the photosystem reaction. On the other hand, if the carbon reduction reaction maximum ETR is smaller, the current photosynthetic rate is limited by the carbon reduction reaction.

In step S105, the calculation unit 171 of the effective index computation apparatus 103 calculates a PPFD value equivalent to the smaller ETR (this amount as a transport ETR flows in the plant and contributes to the growth of the plant) as an effective PPFD value according to the bottleneck decided in the process of step S104. The effective PPFD value can be calculated by the following Equation (1).

$$\text{Effective PPFD value} = \text{transport ETR} / (\text{fAPAR} \times m \times \Phi \text{PSII}) \quad (1)$$

Here, m in Equation (1) denotes a distribution ratio for PSII in the light (sunlight) applied to the plant and indicates a value of approximately 0.5.

Note that the processes of steps S104 and S105 are processes equivalent to the third procedure illustrated in FIG. 5.

In step S106, the control unit 172 of the effective index computation apparatus 103 displays, on the display unit 164, the data regarding the effective PPFD value calculated in the process of step S105.

Here, the effective PPFD value as well as, for example, various types of data related to the effective PPFD value, such as the photosystem reaction maximum ETR, the carbon reduction reaction maximum ETR, the transport ETR, and the PPFE value, can be displayed in various display modes. Note that display examples of the effective PPFD value and the like will be described later with reference to FIGS. 22 to 25.

In step S107, whether to end the process is determined. If it is determined not to end the process in step S107, the process returns to step S101, and the process of steps S101 to S106 is repeated. If it is determined to end the process in step S107, the effective PPFD value calculation process of FIG. 10 ends.

The flow of the effective PPFD value calculation process has been described.

Figure 10:
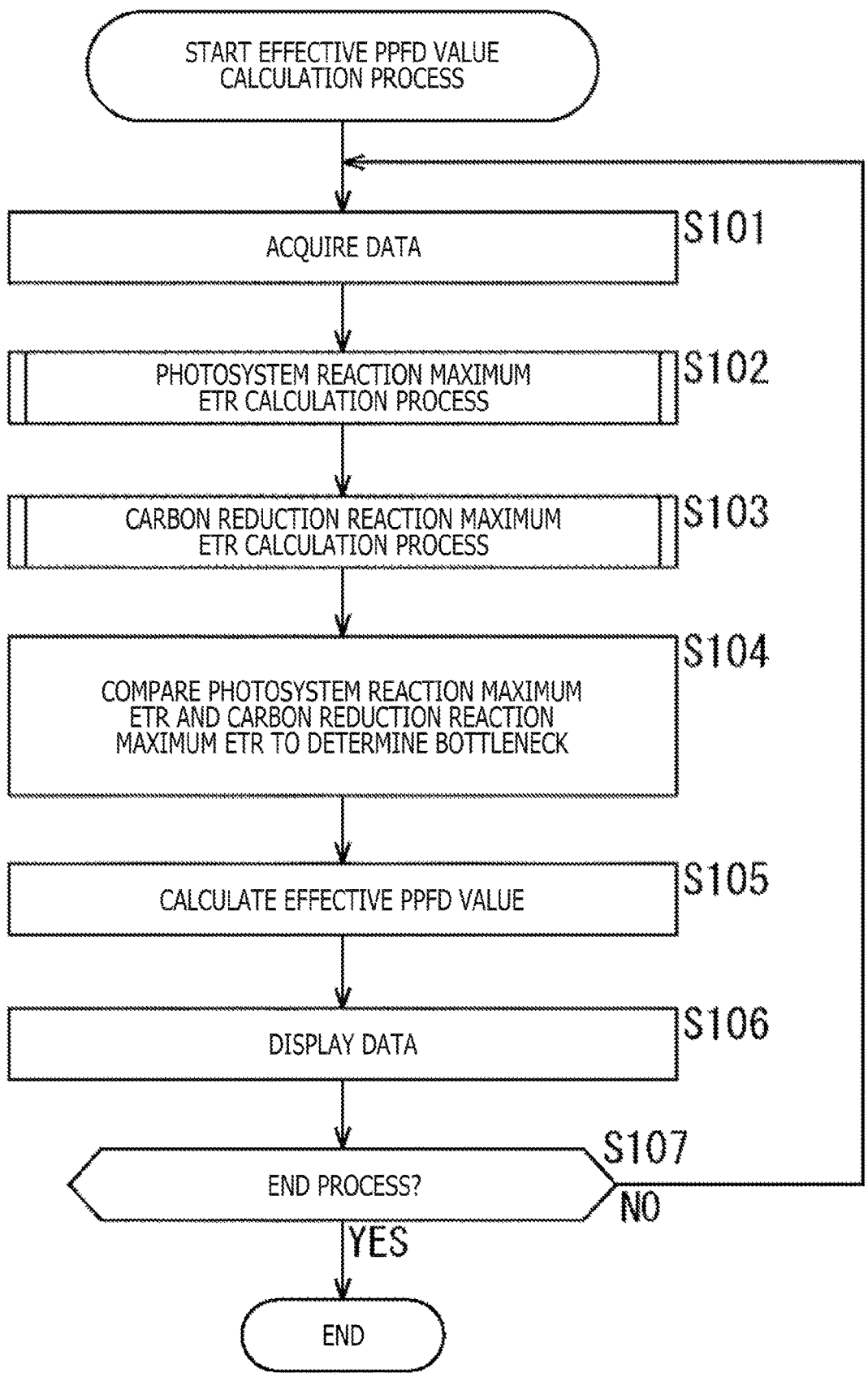
FIG. 10 is a flow chart describing a flow of an effective PPFD value calculation process.

Note that although the process of step S101 is executed by the sensing apparatus 101 and the environment sensor 102, and the process of steps S102 to S106 is executed by the effective index computation apparatus 103 in the description of FIG. 10, the process of steps S102 to S106 may be executed by an apparatus other than the effective index computation apparatus 103.

For example, although described in detail later, indices, such as a PPFD value and an NDVI value, need to be obtained in the process of step S102, and the sensing apparatus 101 may execute the process of obtaining the indices. Furthermore, in the case where the configuration of the effective index computation system 11 (FIG. 9) as a cloud environment is adopted instead of the configuration of the effective index computation system 10 (FIG. 6) as a local environment, the server 109 can execute the process of steps S102 to S106, for example.

(2) Measurement Example of Sensing Apparatus

Next, an example of measuring a measured object executed by the sensing apparatus 101 will be described with reference to FIGS. 11 to 14.

(Configuration Example in Measurement by Sensing Apparatuses)

Figure 11:
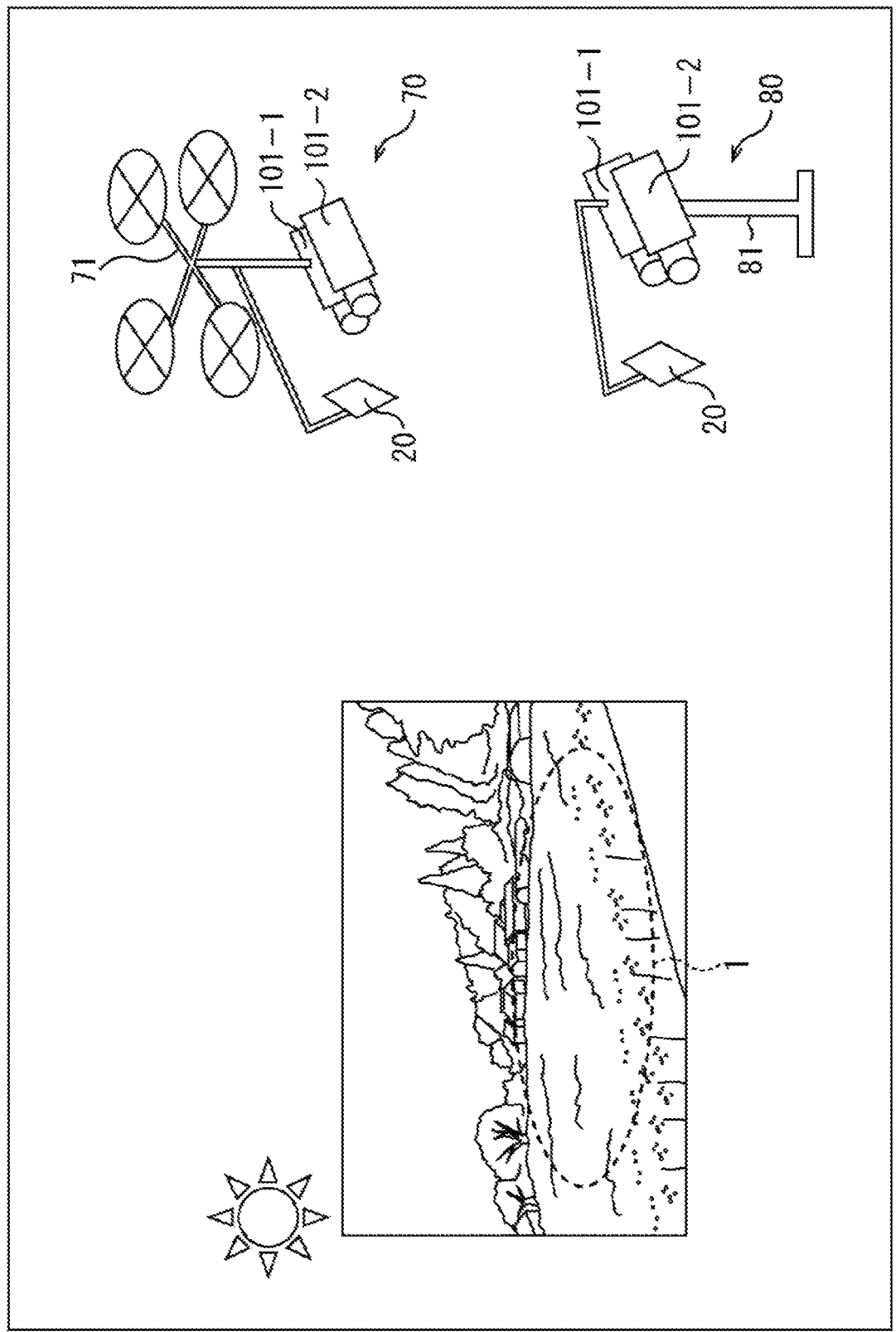
FIG. 11 is a diagram illustrating an example of measurement by the sensing apparatus.

FIG. 11 illustrates measurement apparatuses that measure the measured object, the apparatuses including a mobile measurement apparatus 70 that performs mobile observation and a fixed-point measurement apparatus 80 that performs fixed-point observation.

The mobile measurement apparatus 70 is, for example, an unmanned aerial vehicle (UAV) that flies on the basis of rotation of a propeller-type rotary wing 71 and that senses a measured object 1, such as a plant in a field, from the sky (aerial photography).

The mobile measurement apparatus 70 includes a sensing apparatus 101-1 that measures a PPFD value and a sensing apparatus 101-2 that measures an NDVI value. In addition, a reference reflection plate 20 in a predetermined shape (for example, rectangular shape) is installed in front of the sensing apparatus 101-1 and the sensing apparatus 101-2.

In this way, the measured object 1, such as a plant in a field, and the reference reflection plate 20 as objects (subjects) sensed by the sensing apparatus 101-1 and the sensing apparatus 101-2 exist in the same angle of view in the mobile measurement apparatus 70. For example, a gray reflection plate with constant reflectance can be used as the reference reflection plate 20.

Note that for example, a flight route may be stored in advance as coordinate data, and the mobile measurement apparatus 70 may use position information of a GPS (Global Positioning System) or the like for autonomous flight instead of the wireless control. In addition, although the mobile measurement apparatus 70 is a rotary-wing aircraft including the rotary wing 71 in the description of FIG. 11, the mobile measurement apparatus 70 may be a fixed-wing aircraft.

A fixed leg 81 is used to fix the fixed-point measurement apparatus 80 at a position that allows sensing the measured object 1 such as a plant in a field. The fixed-point measurement apparatus 80 includes the sensing apparatus 101-1 that measures the PPFD value and the sensing apparatus 101-2 that measures the NDVI value as in the mobile measurement apparatus 70, and the reference reflection plate 20 in a predetermined shape is installed in front of the fixed-point measurement apparatus 80.

Therefore, the sensing apparatus 101-1 and the sensing apparatus 101-2 are provided as part of the mobile measurement apparatus 70 or the fixed-point measurement apparatus 80. The sensing apparatus 101-1 and the sensing apparatus 101-2 can sense the measured object 1 and output index measurement data obtained as a result of the sensing.

Figure 12:
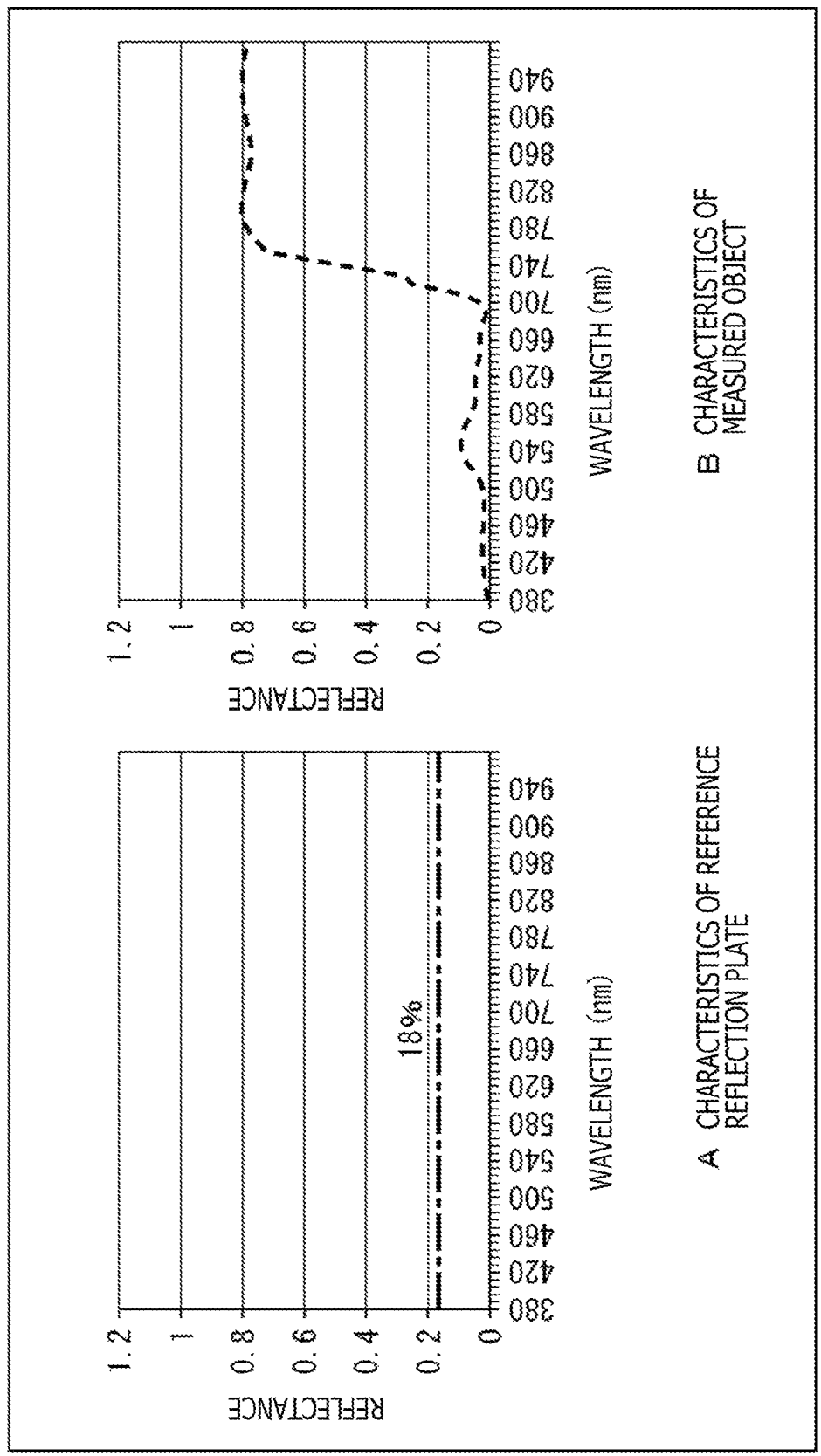
FIG. 12 is a diagram illustrating an example of characteristics of a reference reflection plate and a measured object.

Here, A of FIG. 12 illustrates an example of characteristics of the reference reflection plate 20 (FIG. 11), in which the horizontal axis indicates the wavelength (nm), and the vertical axis indicates the reflectance. As illustrated in A of FIG. 12, the reflectance of the reference reflection plate 20 is constant at approximately 0.18, and the characteristics of the spectral reflectance are flat.

B of FIG. 12 illustrates an example of characteristics of the measured object 1 (FIG. 11), in which the horizontal axis indicates the wavelength (nm), and the vertical axis indicates the reflectance. As illustrated in B of FIG. 12, the reflectance of the measured object 1, such as a plant in a field, indicates values close to 0 until around 700 nm. The reflectance then rises at around 700 nm and indicates values close to approximately 0.8 (80%) in a range exceeding 700 nm.

In addition, the sensing apparatus 101-1 outputs index measurement data for measuring the PPFD value of the reference reflection plate 20, and RGB signals are necessary to calculate the PPFD value. Therefore, the sensing apparatus 101-1 is provided with filters 143-1 that are RGB filters with characteristics illustrated in A of FIG. 13 (hereinafter, referred to as RGB filters 143-1).

Figure 13:
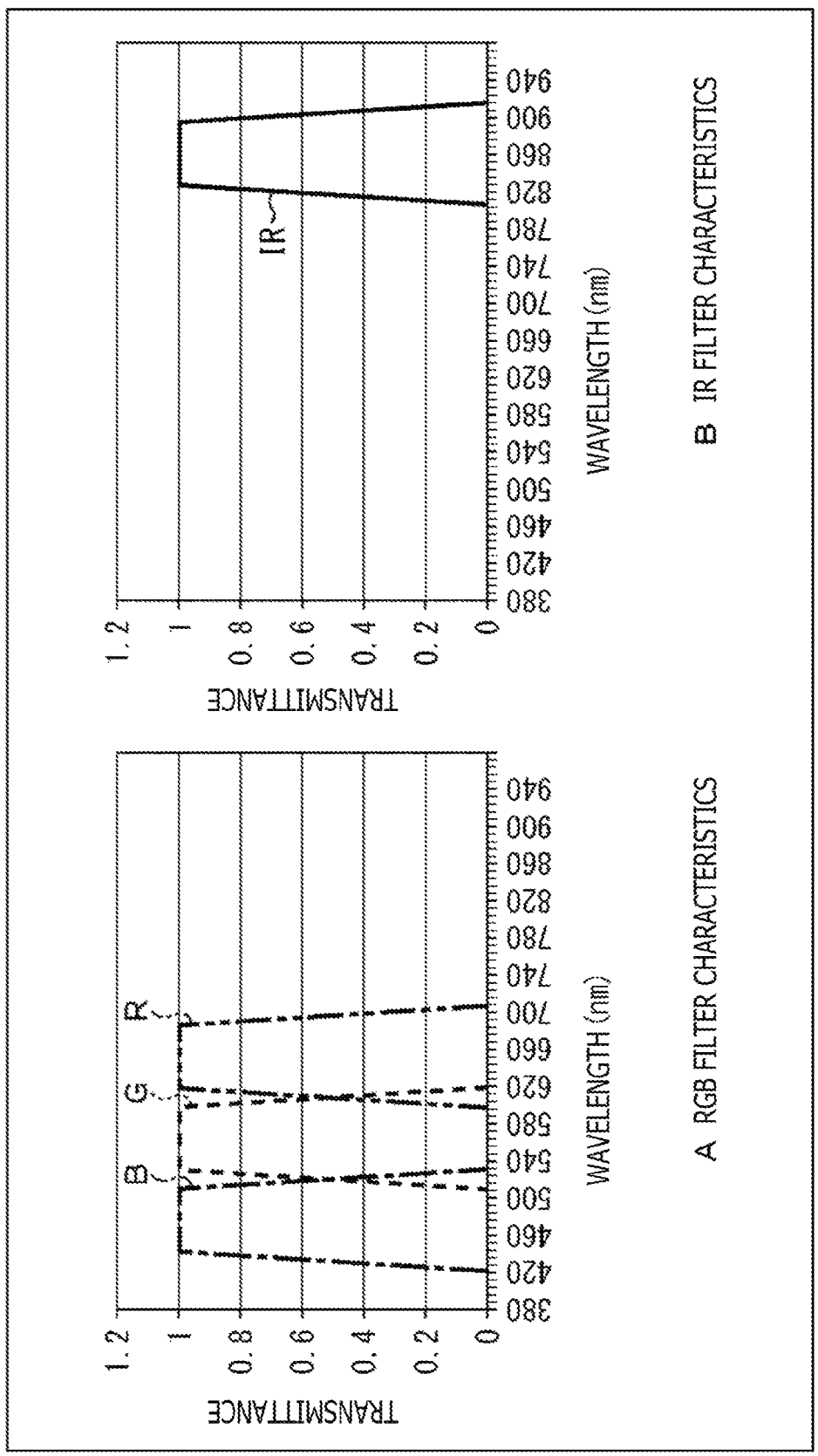
FIG. 13 is a diagram illustrating an example of characteristics of RGB filters and an IR filter.

A of FIG. 13 illustrates an example of characteristics of the RGB filter 143-1, in which the horizontal axis indicates the wavelength (nm), and the vertical axis indicates the transmittance. As illustrated in A of FIG. 13, the RGB filters 143-1 include, for example, a B filter that transmits blue (B) light at wavelengths of 450 to 495 nm, a G filter that transmits green (G) light at wavelengths of 495 to 570 nm, and an R filter that transmits red (R) light at wavelengths of 620 to 750 nm.

On the other hand, the sensing apparatus 101-2 outputs index measurement data for measuring the NDVI value of the measured object 1 such as a plant in a field, and an IR signal in addition to an R signal are necessary to calculate the NDVI value. Therefore, the sensing apparatus 101-2 is provided with a filter 143-2 that is an IR filter with characteristics illustrated in B of FIG. 13 (hereinafter, referred to as IR filter 143-2).

B of FIG. 13 illustrates an example of characteristics of the IR filter 143-2, in which the horizontal axis indicates the wavelength (nm), and the vertical axis indicates the transmittance. As illustrated in B of FIG. 13, the IR filter 143-2 transmits, for example, infrared region (IR) light at wavelengths of 800 to 940 nm.

(Flow of Signal Processing in Measurement by Sensing Apparatuses)

Next, flows of signals processed by the sensing apparatus 101-1 and the sensing apparatus 101-2 in the case where the reference reflection plate 20, the measured object 1, the RGB filters 143-1, and the IR filter 143-2 have characteristics illustrated in FIGS. 12 and 13 will be described with reference to FIG. 14.

Figure 14:
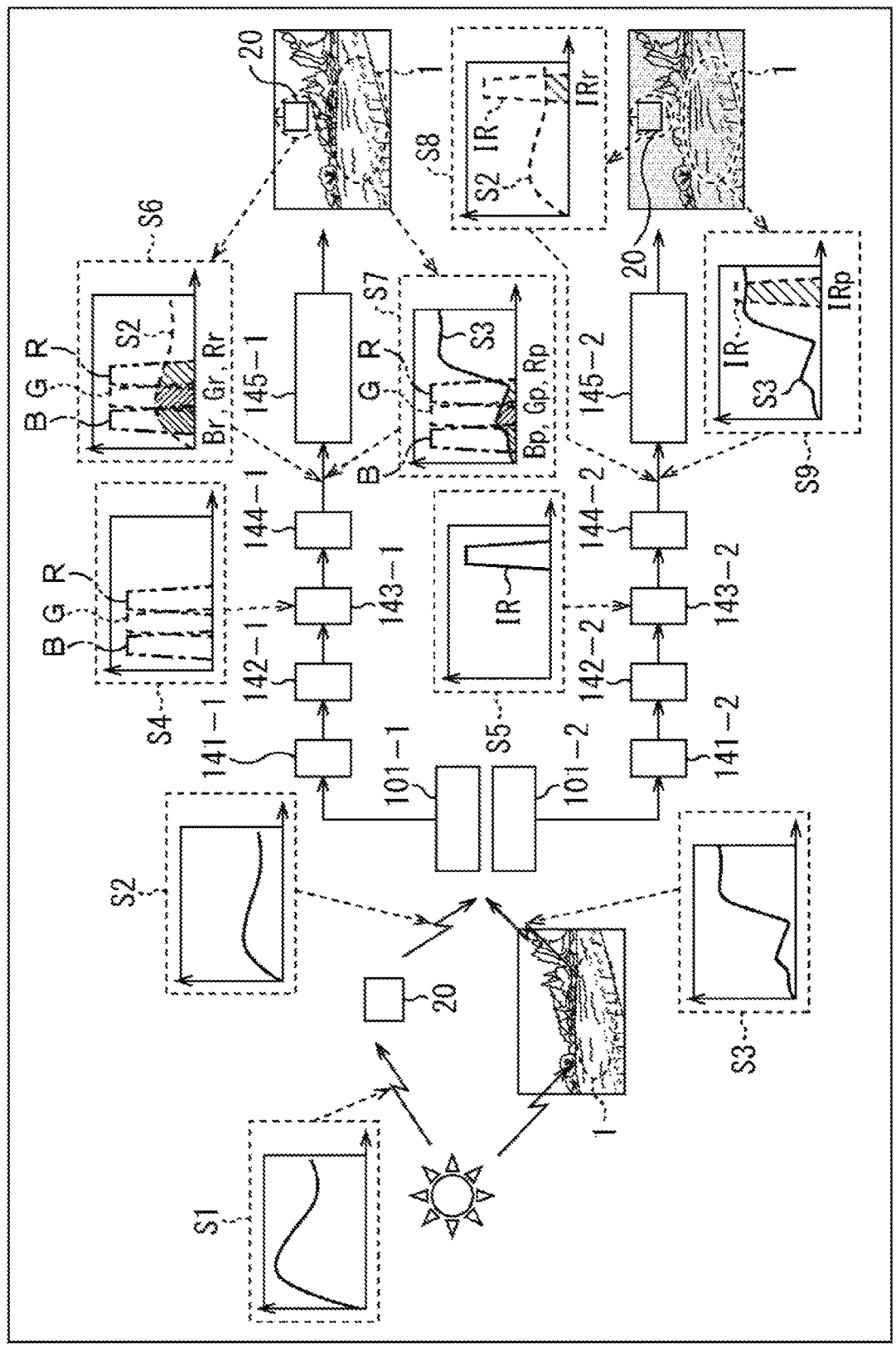
FIG. 14 is a diagram illustrating a flow of signal processing of the sensing apparatus.

Note that in FIG. 14, an upper sequence illustrates flows of signals processed by the sensing apparatus 101-1 provided with the RGB filters 143-1 with respect to the reflected light from the reference reflection plate 20 or the measured object 1, and a lower sequence illustrates flows of signals processed by the sensing apparatus 101-2 provided with the IR filter 143-2.

In FIG. 14, sunlight (ambient light) is reflected by the reference reflection plate 20, and the reflected light enters the sensing apparatus 101-1 and the sensing apparatus 101-2. Spectral characteristics S1 represent the spectral characteristics of the sunlight. In addition, spectral characteristics S2 represent the spectral characteristics of the reflected light of the reference reflection plate 20. That is, the reference reflection plate 20 has the flat reflection characteristics illustrated in A of FIG. 12, and the spectral characteristics of the reflected light of the reference reflection plate 20 are as indicated by the spectral characteristics S2.

In addition, the sunlight is reflected by the measure object 1, such as a plant in a field, and the reflected light enters the sensing apparatus 101-1 and the sensing apparatus 101-2. Spectral characteristics S3 represent the spectral characteristics of the reflected light of the measured object 1. That is, the measured object S1 has the reflection characteristics in the shape illustrated in B of FIG. 12, and the spectral characteristics of the reflected light of the measured object 1 are as indicated by the spectral characteristics S3.

In the sensing apparatus 101-1, the reflected light of the reference reflection plate 20 and the measured object 1 enters a lens 141-1 and passes through the RGB filters 143-1 to form an image on the sensor surface of a sensor 144-1.

In the sensing apparatus 101-1, spectral characteristics S4 represent the characteristics of the RGB filters 143-1. The spectral characteristics S4 correspond to the transmission characteristics of the RGB filters illustrated in A of FIG. 13. The sensor 144-1 then outputs the light received on the sensor surface as levels of Br, Gr, and Rr components as indicated by spectral characteristics S6 in which the spectral characteristics S2 of the reflected light of the reference reflection plate 20 and the spectral characteristics S4 of the RGB filters 143-1 are placed on top of each other. That is, signals corresponding to the Br, Gr, and Rr levels are RGB data (RGB signals) obtained by sensing the reference reflection plate 20 performed by the sensing apparatus 101-1.

In addition, the sensor 144-1 outputs the light received on the sensor surface as levels of Bp, Gp, and Rp components as indicated by spectral characteristics S7 in which the spectral characteristics S3 of the reflected light of the measured object 1 and the spectral characteristics S4 of the RGB filters 143-1 are placed on top of each other. That is, signals corresponding to the Bp, Gp, and Rp levels are RGB data (RGB signals) obtained by sensing the measured object 1 (plant in field) performed by the sensing apparatus 101-1.

A signal processing unit 145-1 executes a process, such as a process of sorting the data from the sensor 144-1, and outputs, through an I/F unit 146-1, the data obtained as a result of the process.

On the other hand, in the sensing apparatus 101-2, the reflected light of the reference reflection plate 20 and the measured object 1 enters a lens 141-2 and passes through the IR filter 143-2 to form an image on the sensor surface of a sensor 144-2.

In the sensing apparatus 101-2, spectral characteristics S5 represent the characteristics of the IR filter 143-2. The spectral characteristics S5 correspond to the transmission characteristics of the IR filter illustrated in B of FIG. 13. The sensor 144-2 then outputs the light received on the sensor surface as levels of IRr components as indicated by spectral characteristics S8, in which the spectral characteristics S2 of the reflected light of the reference reflection plate 20 and the spectral characteristics S5 of the IR filter 143-2 are placed on top of each other. That is, signals corresponding to the IRr levels are IR data (IR signals) obtained by sensing the reference reflection plate 20 performed by the sensing apparatus 101-2.

In addition, the sensor 144-2 outputs the light received on the sensor surface as levels of IRp components as indicated by spectral characteristics S9, in which the spectral characteristics S3 of the reflected light of the measured object 1 and the spectral characteristics S5 of the IR filter 143-2 are placed on top of each other. That is, signals corresponding to the IRp levels are IR data (IR signals) obtained by sensing the measured object 1 (plant in field) performed by the sensing apparatus 101-2.

A signal processing unit 145-2 executes a process, such as a process of sorting data from the sensor 144-2, and outputs, through an I/F unit 146-2, the data obtained as a result of the process.

In this way, the sensing apparatus 101-1 and the sensing apparatus 101-2 perform the sensing, and the RGB data (RGB signals) and the IR data (IR signals) of the sensing images including the measured object 1 and the reference reflection plate 20 are acquired as index measurement data.

Note that two sensing apparatuses including the sensing apparatus 101-1 and the sensing apparatus 101-2 are provided in the example described in FIGS. 11 to 14, the number of sensing apparatuses 101 is not limited to two. For example, the sensor 144 in the sensing apparatus 101 can include the pixel array of the array pattern 144C (FIG. 7) to acquire the IR signals in addition to the RGB signals, and the number of sensing apparatuses 101 can be one in the case where such a sensor 144 is used. However, the combination of the RGB filters and the IR cut filter can be used as the filter 143 as in the sensing apparatus 101-1, and the configuration can be similar to the configuration of a normal camera.

(3) Photosystem Reaction Maximum ETR Calculation Process (Flow of Photosystem Reaction Maximum ETR Calculation Process)

Next, details of the photosystem reaction maximum ETR calculation process corresponding to step S102 of FIG. 10 will be described with reference to a flow chart of FIG. 15.

In step S121, the processing unit 162 of the effective index computation apparatus 103 acquires, as index measurement data, the RGB data obtained by the sensing of the sensing apparatus 101-1 (FIG. 11) and the IR data obtained by the sensing of the sensing apparatus 101-2 (FIG. 11). That is, image data of the RGB data and the IR data is introduced into the processing unit 162 here.

In step S122, the calculation unit 171 of the effective index computation apparatus 103 refers to the coefficient calculation LUT (LUT1) stored in the storage unit 163 on the basis of the RGB data acquired in the process of step S121 and acquires a coefficient W1, a coefficient W2, and a coefficient W3 necessary to calculate the PPFD value.

Specifically, Br signals, Gr signals, and Rr signals obtained from the pixels corresponding to the regions of the reference reflection plate 20 in the RGB data (sensing image corresponding to the RGB data) are first averaged to obtain a Br-ave signal, a Gr-ave signal, and an Rr-ave signal, respectively. Next, a ratio of the Br-ave signal to the Rr-ave signal or a ratio of the Br-ave signal to the Gr-ave signal is calculated on the basis of the Br-ave signal, the Gr-ave signal, and the Rr-ave signal obtained in the averaging process to obtain a Br-ave/Rr-ave value or a Br-ave/Gr-ave value.

Figure 16:
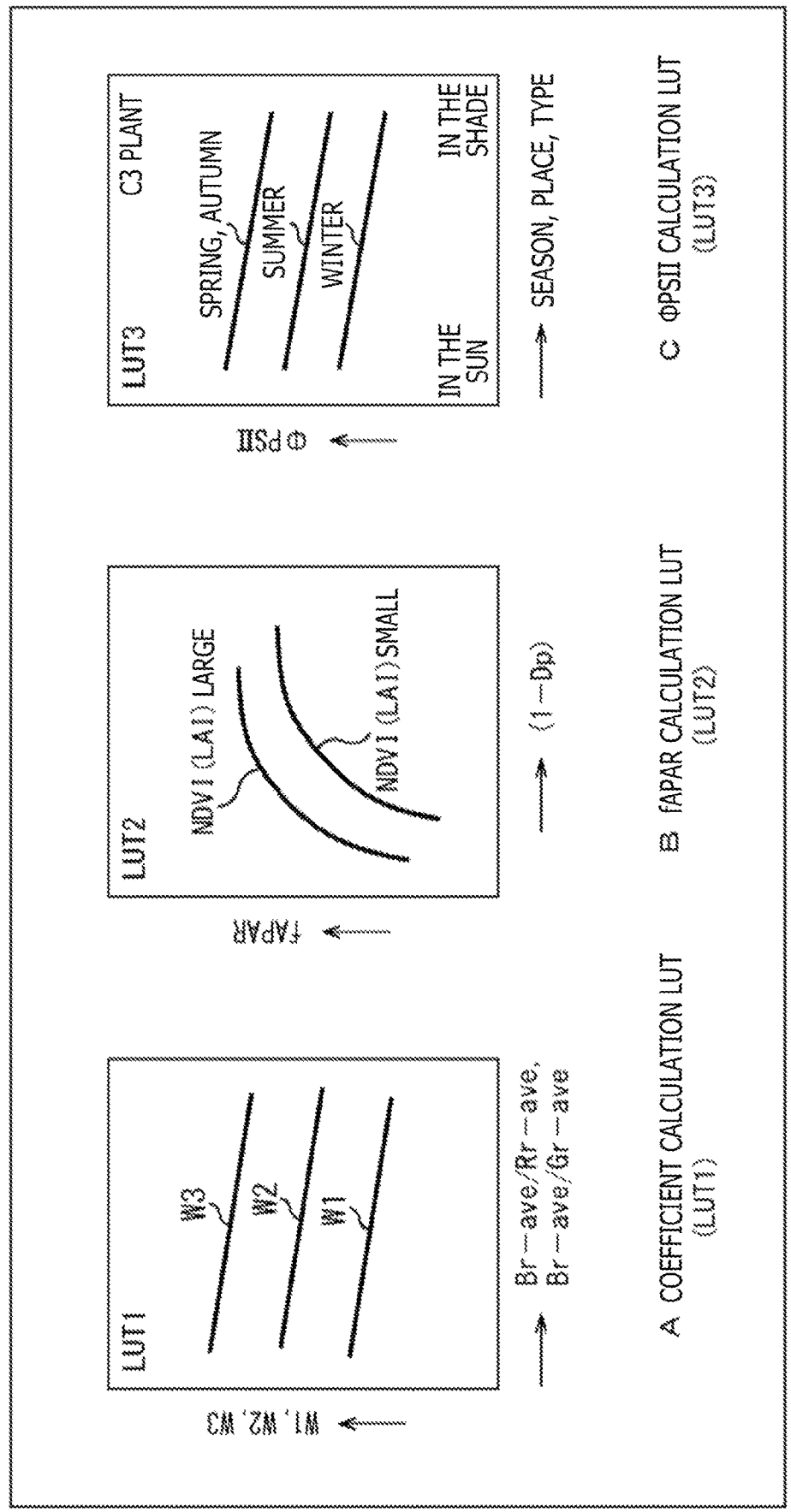
FIG. 16 is a diagram illustrating an example of a coefficient calculation LUT, an fAPAR calculation LUT, and a ΦPSII calculation LUT.

Here, A of FIG. 16 illustrates an example of the coefficient calculation LUT (LUT1). As illustrated in A of FIG. 16, the Br-ave/Rr-ave value or the Br-ave/Gr-ave value is associated with the coefficient W1, the coefficient W2, and the coefficient W3 in the coefficient calculation LUT (LUT1). Therefore, the coefficient W1, the coefficient W2, and the coefficient W3 corresponding to the slope of the spectral characteristics predicted from the Br-ave/Rr-ave value or the Br-ave/Gr-ave value can be acquired from the coefficient calculation LUT (LUT1).

The relationship can be expressed as in the following Equation (2).

$$W1, W2, W3 = \text{LUT1}(Br\text{-ave}/Rr\text{-ave}, Br\text{-ave}/Gr\text{-ave}) \quad (2)$$

Note that although the ratio of the Br-ave signal to the Rr-ave signal or the ratio of the Br-ave signal to the Gr-ave signal is used in referencing the coefficient calculation LUT (LUT1) in the case described here, a ratio of the Gr-ave signal to the Rr-ave signal, that is, a Gr-ave/Rr-ave signal, may also be used.

Figure 15:
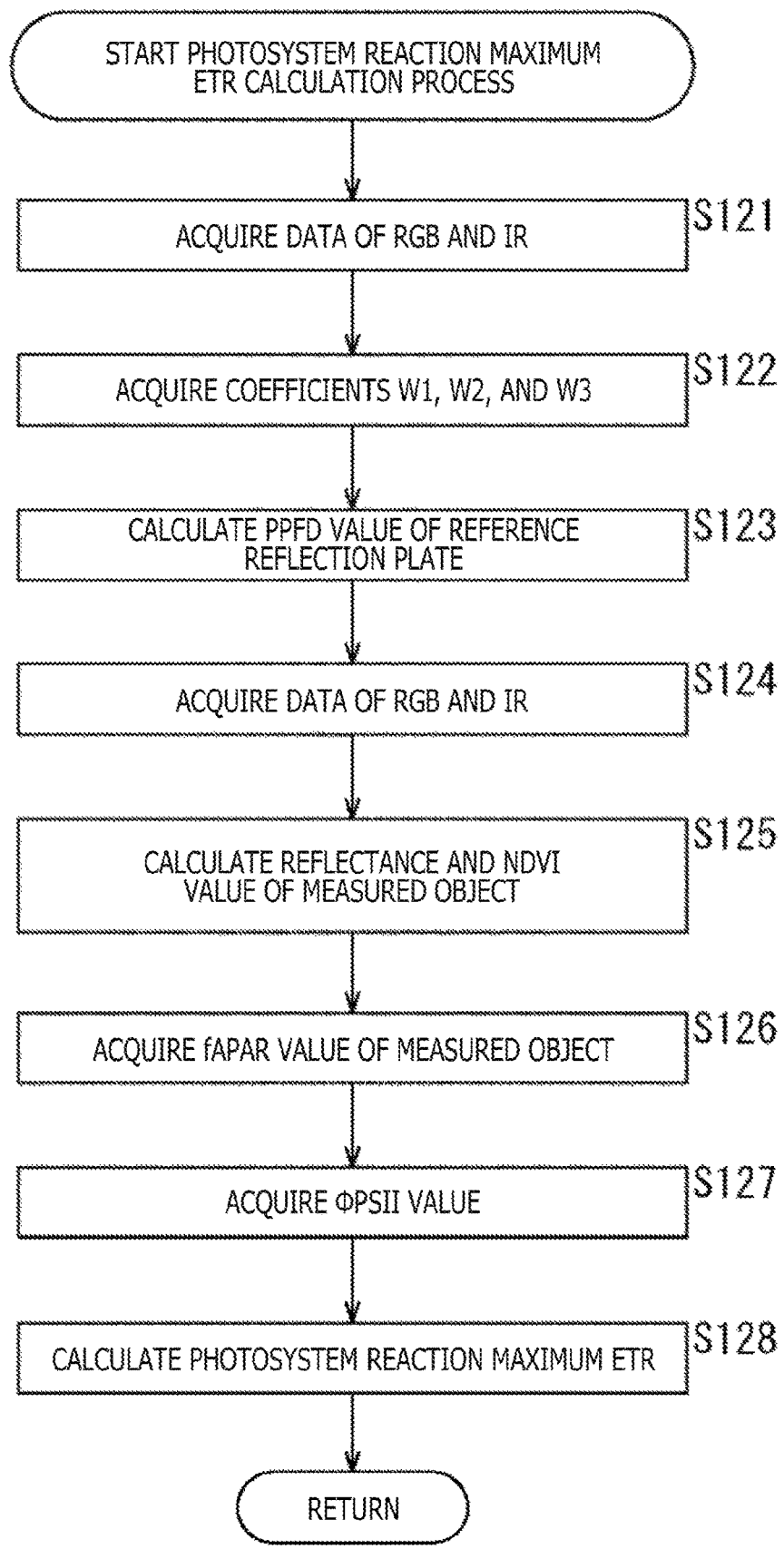
FIG. 15 is a flow chart describing a flow of a photosystem reaction maximum ETR calculation process.

Returning to the description of FIG. 15, in step S123, the calculation unit 171 of the effective index computation apparatus 103 calculates the PPFD value of the reference reflection plate 20 on the basis of the RGB data obtained in the process of step S121 and the coefficients W obtained in the process of step S122.

Here, as indicated in the following Equation (3), the Br-ave signal, the Gr-ave signal, and the Rr-ave signal can be multiplied by the coefficient W1, the coefficient W2, and the coefficient W3, respectively, to obtain a PPFD value of B signal (PPFD(b)), a PPFD value of G signal (PPFD(g)), and a PPFD value of R signal (PPFD(r)).

$$\text{PPFD}(b) = W1 \times Br\text{-ave}$$

$$\text{PPFD}(g) = W2 \times Gr\text{-ave}$$

$$\text{PPFD}(r) = W3 \times Rr\text{-ave} \quad (3)$$

The reason for calculating the PPFD values of the reference reflection plate 20 in this way is as follows. That is, the PPFD value is not changed by the reflectance of the measured object 1, and the PPFD value applied to the reference reflection plate 20 and the PPFD value applied to the measured object 1 are the same values in the sun. Here, on the basis of this premise, the reflected light of the reference reflection plate 20 with no change in the reflectance is captured to obtain the PPFD value of the reference reflection plate 20. Note that details of the calculation method of the PPFD value calculated in the process of steps S122 and S123 will be described later with reference to FIGS. 18 and 19.

In step S124, the processing unit 162 of the effective index computation apparatus 103 acquires, as index measurement data, the RGB data obtained by the sensing of the sensing apparatus 101-1 (FIG. 11) and the IR data obtained by the sensing of the sensing apparatus 101-2 (FIG. 11). That is, the image data of the RGB data and the IR data is introduced into the processing unit 162 here.

In step S125, the calculation unit 171 of the effective index computation apparatus 103 calculates the reflectance and the NDVI value of the measured object 1 on the basis of the RGB data and the IR data acquired in the process of step S124.

Here, the reflectance of the reference reflection plate 20 is known, that is, it is known that the reflectance of each component of B, G, R, and IR is the same at 18%. Therefore, ratios of a Bp-ave signal, a Gp-ave signal, an Rp-ave signal, and an IRp-ave signal to a Br-ave signal, a Gr-ave signal, an Rr-ave signal, and an IRr-ave signal equivalent to the reflected light of the measured object 1 can be calculated with respect to the value of the reflectance to obtain the reflectance of the measured object 1.

Note that the Bp-ave signal, the Gp-ave signal, the Rp-ave signal, and the IRp-ave signal can be obtained by averaging Bp signals, Gp signals, Rp signals, and IRp signals, respectively, obtained from the pixels corresponding to the regions of the measured object 1 in the RGB data (sensing image corresponding to the RGB data). In addition, the Br-ave signal, the Gr-ave signal, the Rr-ave signal, and the IRr-ave signal can be obtained by averaging Br signals, Gr signals, Rr signals, and IRr signals, respectively, obtained from the pixels corresponding to the regions of the reference reflection plate 20 in the RGB data (sensing image corresponding to the RGB data).

That is, the reflectance of each component of B, G, R, and IR with respect to the measured object 1 can be obtained by the following Equation (4).

$$Dp(b)=Dr(18\%) \times Bp\text{-ave}/Br\text{-ave}$$

$$Dp(g)=Dr(18\%) \times Gp\text{-ave}/Gr\text{-ave}$$

$$Dp(r)=Dr(18\%) \times Rp\text{-ave}/Rr\text{-ave}$$

$$Dp(ir)=Dr(18\%) \times IRp\text{-ave}/IRr\text{-ave} \quad (4)$$

Furthermore, the values obtained by Equation (4) can be used to obtain the NDVI value based on the following Equation (5).

$$\text{NDVI value}=(Dp(ir)-Dp(r))/(Dp(ir)+Dp(r)) \quad (5)$$

Here, Dp(ir) in Equation (5) represents the reflectance of the infrared region, and Dp(r) represents the reflectance of red (R) in the visible region. The NDVI value (normalized difference vegetation index) is an index indicating the distribution condition and the activity of the plant in the field as the measured object 1.

Note that the Bp-ave signal and the like may be calculated from the entire region including the plant as a measurement target in the sensing image (photographic image) obtained by sensing, or the region may be divided into a plurality of subregions to calculate the Bp-ave signal and the like for each subregion. By dividing the region into subregions in this way, a distribution map for each region of the plant can be generated when, for example, two-dimensional information is to be displayed.

However, to execute the process, a process of recognizing the region of the plant included in the sensing image (photographic image) obtained by sensing is necessary. Here, a publicly known image recognition process can be used as the process for recognizing the region of the plant. Furthermore, instead of the image recognition process, the user may specify the region of the plant from the sensing image.

In step S126, the calculation unit 171 of the effective index computation apparatus 103 refers to the fAPAR calculation LUT (LUT2) stored in the storage unit 163 on the basis of the reflectance and the NDVI value of the measured object 1 calculated in the process of step S125 to acquire the fraction of absorbed photosynthetically active radiation (fAPAR) of the measured object 1.

Here, the light applied to the plant (vegetation) is separated into the reflected light, the transmitted light, and the absorbed light, and only the absorbed light among them is utilized for the photosynthesis. This can be expressed by a relationship between the reflectance, the transmittance, and the absorptance of the plant as in the following Equation (6).

$$1=(\text{reflectance})+(\text{transmittance})+(\text{absorptance}) \quad (6)$$

In general, the reflectance and the transmittance of a leaf of a plant are substantially the same, and the remaining light is absorbed. However, if the leaf area index (LAI) is approximately 2 or 3, the leaves overlap with each other. The reflection and the absorption of the transmitted light are repeated, and the relationship approaches the following Equation (7). Note that the leaf area index (LAI) represents a total value of the leaf area per unit ground surface area.

$$1=(\text{reflectance})+(\text{absorptance}) \quad (7)$$

In addition, it is known that a change in the leaf area index (LAI) is correlated with the normalized difference vegetation index (NDVI). Therefore, a look-up table is prepared as the fAPAR calculation LUT (LUT2), in which the horizontal axis indicates 1-Dp (reflectance), and the fraction of absorbed photosynthetically active radiation (fAPAR) changes according to the magnitude of the NDVI value.

B of FIG. 16 illustrates the fAPAR calculation LUT (LUT2). In the fAPAR calculation LUT (LUT2), a look-up table (LUT) of a case with a large NDVI value (leaf area index (LAI)) and a look-up table (LUT) of a case with a small NDVI value (leaf area index (LAI)) are prepared. Therefore, the fraction of absorbed photosynthetically active radiation (fAPAR) of the measured object 1 can be acquired from the fAPAR calculation LUT (LUT2) according to the reflectance and the NDVI value of the measured object 1.

The relationship can be expressed as in the following Equation (8), in which fAPAR(b), fAPAR(g), and fAPAR(r) represent fractions of absorbed photosynthetically active radiation (fAPAR) of the B, G, and R components with respect to the measured object 1, respectively.

$$\text{fAPAR}(b)=\text{LUT2}(1-Dp(b))$$

$$\text{fAPAR}(g)=\text{LUT2}(1-Dp(g))$$

$$\text{fAPAR}(r)=\text{LUT2}(1-Dp(r)) \quad (8)$$

Note that as described above, the reference information for calculating the value of fAPAR is not limited to the fAPAR calculation LUT (LUT2). For example, a value can be assigned to a function for calculating the value of fAPAR to directly obtain the value of fAPAR from the NDVI value.

Figure 17:
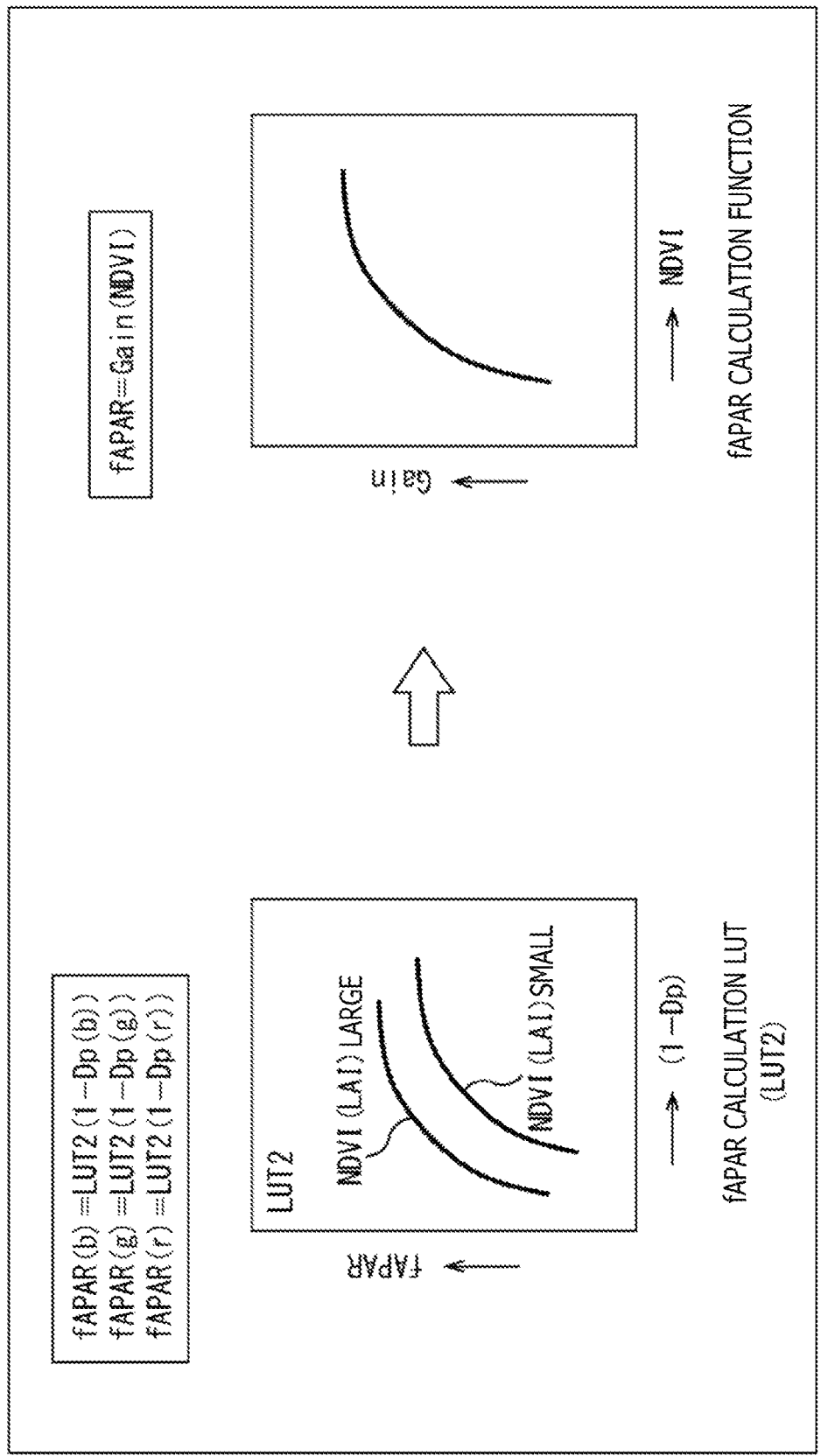
FIG. 17 is a diagram illustrating an example of an fAPAR calculation function.

FIG. 17 illustrates an fAPAR calculation function. In the fAPAR calculation function, the value of fAPAR can be directly calculated from the NDVI value as indicated in the following Equation (8A).

$$\text{fAPAR}=\text{Gain}(\text{NDVI}) \quad (8A)$$

Here, there is a relationship of fAPAR(b)=fAPAR(g)=fAPAR(r) in Equation (8A). In addition, the value of Dp is not used in Equation (8A), and the accuracy may be slightly reduced compared to the case of using the value of Dp and the NDVI value as in the fAPAR calculation LUT (LUT2). However, the process for obtaining the value of fAPAR can be simplified.

Returning to the description of FIG. 15, the calculation unit 171 of the effective index computation apparatus 103 refers to the ΦPSII calculation LUT (LUT3) stored in the storage unit 163 to acquire the quantum yield (ΦPSII) of the photosystem reaction in the measured object 1 in step S127.

Here, chlorophyll fluorescence measurement can be performed to observe the condition of the quantum yield (ΦPSII) of the photosystem reaction. That is, the quantum yield (efficiency) of the photosystem reaction varies depending on the place and the environment where the plant has grown, the season, and the like. Therefore, periodical chlorophyll fluorescence measurement is performed for the target plant, and an LUT is prepared as the ΦPSII calculation LUT (LUT3), in which the ΦPSII changes according to the place, the environment, and the season.

C of FIG. 16 illustrates the ΦPSII calculation LUT (LUT3). In the ΦPSII calculation LUT (LUT3), a look-up table is prepared for a C3 plant according to each season, such as spring and autumn, summer, and winter, for each place, for example. Therefore, in the case where the measured object 1 is, for example, a C3 plant, the quantum yield (ΦPSII) of the photosystem reaction in the measured object 1 can be acquired from the ΦPSII calculation LUT (LUT3) according to the measurement period, the measurement place, and the like.

The relationship can be expressed as in the following Equation (9).

$$\Phi PSII = LUT3 \text{ (season, place, type)} \quad (9)$$

Note that the C3 plant is classified according to the type of organic matter with which the carbon dioxide ($CO_2$) absorbed in the photosynthesis is synthesized first in the plant body. The C3 plant is a plant that performs photosynthetic carbon assimilation on the basis of only the reductive pentose phosphate cycle. In addition, there are also a C4 plant, a CAM plant, and the like in addition to the C3 plant in the classification, and for example, a ΦPSII calculation LUT (LUT3) for C4 plant needs to be prepared to measure the C4 plant.

In addition, for example, data according to the season and the place can be stored for each plant, and a database can be formed. The data stored in the database can be used to create the ΦPSII calculation LUT (LUT3) to prepare more optimal ΦPSII calculation LUT (LUT3). However, parameters other than the type of plant, the season, and the place may be included. In addition, machine learning may be performed for the data stored in the database.

Returning to the description of FIG. 15, in step S128, the calculation unit 171 of the effective index computation apparatus 103 calculates the photosystem reaction maximum ETR in the measured object 1 on the basis of the data obtained in the process of steps S121 to S127.

Here, as for the calculation method of the photosystem reaction maximum ETR, the PPFD value obtained in the process of step S123 is first multiplied by the fAPAR obtained in the process of step S126 to obtain an amount of photons effectively absorbed by the plant (amount of photons actually contributed to the growth of the plant) in the amount of photons (PPFD value) applied to the plant.

Next, the value obtained by multiplying the PPFD value by the fAPAR is multiplied by a distribution ratio m for the PSII (generally assumed to be 0.5) in the light applied to the plant and multiplied by the quantum yield (ΦPSII) of the photosystem reaction obtained in the process of step S127. As a result, the photosystem reaction maximum ETR is calculated.

That is, the photosystem reaction maximum ETR defined as ETR1 can be obtained by computing the following Equation (10) and Equation (11), in which ETR1(b), ETR1(g), and ETR1(r) represent the photosystem reaction maximum ETR of the B, G, and R components with respect to the measured object 1, respectively.

$$ETR1(b) = PPFD(b) \times fAPAR(b) \times m \times \Phi PSII$$

$$ETR1(g) = PPFD(g) \times fAPAR(g) \times m \times \Phi PSII$$

$$ETR1(r) = PPFD(r) \times fAPAR(r) \times m \times \Phi PSII \quad (10)$$

$$ETR1 = ETR1(b) + ETR1(g) + ETR1(r) \quad (11)$$

Note that in the field of plant physiology, the ΦPSII denotes the photosystem reaction efficiency in a state in which the reaction rate of the photosystem in a bright state and the carbon reduction reaction rate are balanced. That is, the photosystem reaction efficiency also changes according to the carbon reduction reaction rate. On the other hand, the ΦPSII defined in the present technique is the reaction efficiency of the photosystem in the bright state with an infinite carbon reduction reaction rate on the basis of the amount of photons (PPFD value) applied to and absorbed by the plant.

When the process of step S128 is finished, the process returns to step S102 of FIG. 10, and the subsequent process is executed.

The flow of the photosystem reaction maximum ETR calculation process has been described. In the photosystem reaction maximum ETR calculation process, the electron transport rate (ETR) equivalent to the energy output from the photosystem reaction is calculated as the photosystem reaction maximum ETR.

Note that in the photosystem reaction maximum ETR calculation process, the look-up table used for obtaining the effective PPFD value may be switched for each region of plant in a case where there are a plurality of types of plants in the photographic image obtained as a result of sensing (imaging). This allows to present appropriate effective PPFD values at the same time in the case where there are a plurality of plants in one screen.

(Details of Calculation Method of PPFD Value)

Here, the details of the calculation method of the PPFD value calculated in the process of steps S122 and S123 of FIG. 15 will be described with reference to FIGS. 18 and 19.

(Configuration of Processing Unit of Effective Index Computation Apparatus)

Figure 18:
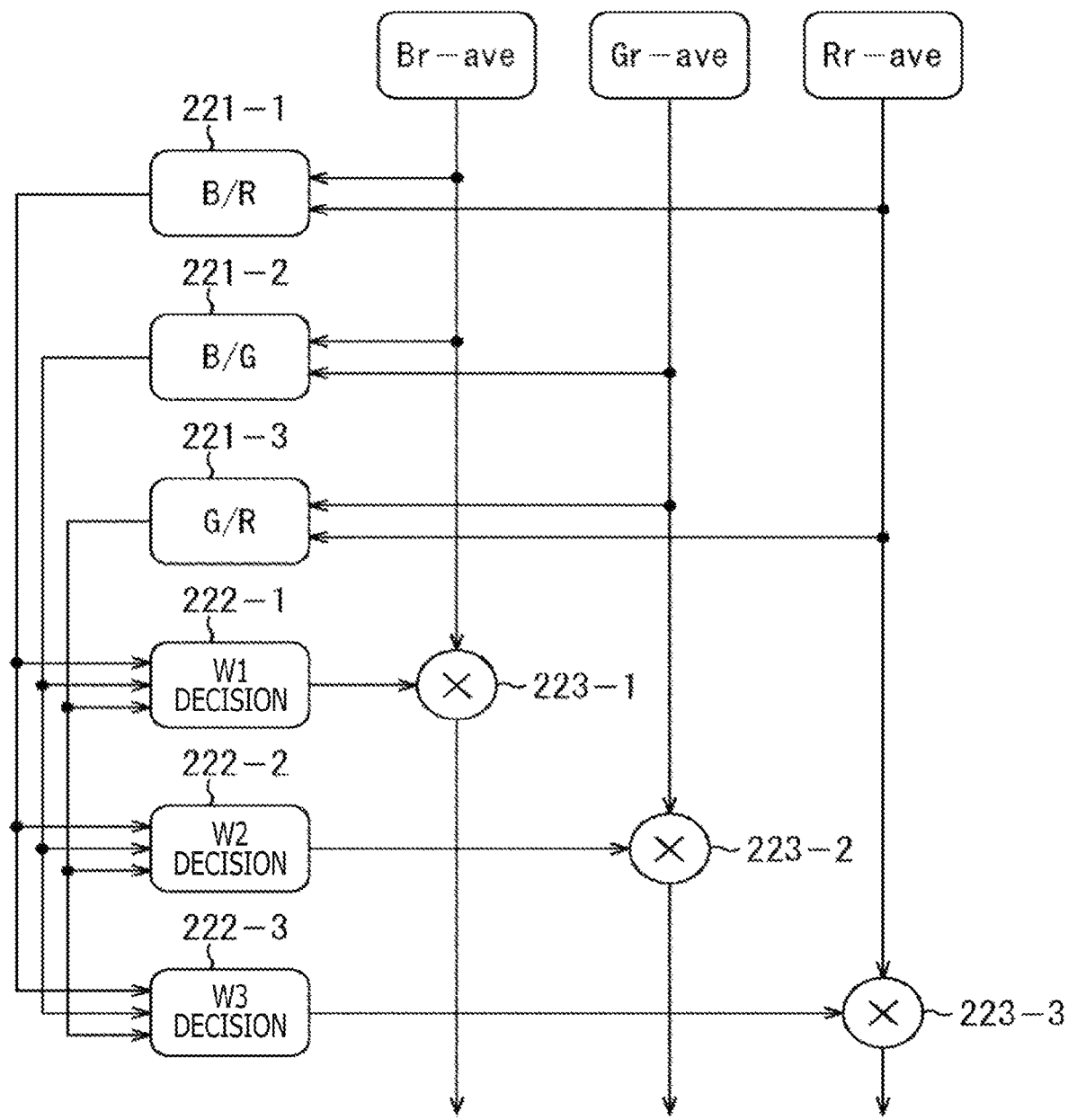
FIG. 18 is a diagram illustrating a detailed configuration example of a processing unit.

FIG. 18 is a diagram illustrating a detailed configuration example of the processing unit 162 (calculation unit 171 of the processing unit 162) of the effective index computation apparatus 103 of FIG. 8.

In FIG. 18, the calculation unit 171 of the effective index computation apparatus 103 includes a B/R value calculation unit 221-1, a B/G value calculation unit 221-2, a G/R value calculation unit 221-3, a W1 decision unit 222-1, a W2 decision unit 222-2, a W3 decision unit 222-3, a multiplier 223-1, a multiplier 223-2, and a multiplier 223-3 to calculate the PPFD value.

In the calculation unit 171, the Br-ave signal among the Br-ave signal, the Gr-ave signal, and the Rr-ave signal obtained from the RGB data input from the sensing apparatus 101-1 is input to the B/R value calculation unit 221-1, the B/G value calculation unit 221-2, and the multiplier 223-1. In addition, the Gr-ave signal is input to the B/G value calculation unit 221-2, the G/R value calculation unit 221-3, and the multiplier 223-2, and the Rr-ave signal is input to the B/R value calculation unit 221-1, the G/R value calculation unit 221-3, and the multiplier 223-3.

The B/R value calculation unit 221-1 divides the Br-ave signal input to the B/R value calculation unit 221-1 by the Rr-ave signal and outputs the Br-ave/Rr-ave value obtained as a result of the division to each unit from the W1 decision unit 222-1 to the W3 decision unit 222-3.

The B/G value calculation unit 221-2 divides the Br-ave signal input to the B/G value calculation unit 221-2 by the Gr-ave signal and outputs the Br-ave/Gr-ave value obtained as a result of the division to each unit from the W1 decision unit 222-1 to the W3 decision unit 222-3.

The G/R value calculation unit 221-3 divides the Gr-ave signal input to the G/R value calculation unit 221-3 by the Rr-ave signal and outputs the Gr-ave/Rr-ave value obtained as a result of the division to each unit from the W1 decision unit 222-1 to the W3 decision unit 222-3.

The W1 decision unit 222-1 decides the coefficient W1 according to the Br-ave/Rr-ave value, the Br-ave/Gr-ave value, or the Gr-ave/Rr-ave value input to the W1 decision unit 222-1 and outputs the coefficient W1 to the multiplier 223-1. The multiplier 223-1 multiplies the Br-ave signal input to the multiplier 223-1 by the coefficient W1 from the W1 decision unit 222-1.

The W2 decision unit 222-2 decides the coefficient W2 according to the Br-ave/Rr-ave value, the Br-ave/Gr-ave value, or the Gr-ave/Rr-ave value input to the W2 decision unit 222-2 and outputs the coefficient W2 to the multiplier 223-2. The multiplier 223-2 multiplies the Gr-ave signal input to the multiplier 223-2 by the coefficient W2 from the W2 decision unit 222-2.

The W3 decision unit 222-3 decides the coefficient W3 according to the Br-ave/Rr-ave value, the Br-ave/Gr-ave value, or the Gr-ave/Rr-ave input to the W3 decision unit 222-3 and outputs the coefficient W3 to the multiplier 223-3. The multiplier 223-3 multiplies the Rr-ave signal input to the multiplier 223-3 by the coefficient W3 from the W3 decision unit 222-3.

Here, the reason that the values of the B signal (Br-ave signal), the G signal (Gr-ave signal), and the (Rr-ave signal) are multiplied by the coefficient W1, the coefficient W2, and the coefficient W3, respectively, will be described. FIG. 19 illustrates a relationship between the PPFD values and the values of the color components of RGB. A of FIG. 19 illustrates spectral characteristics of sunlight outdoors. In addition, B of FIG. 19 illustrates RGB signals output from a sensor of a normal camera.

Figure 19:
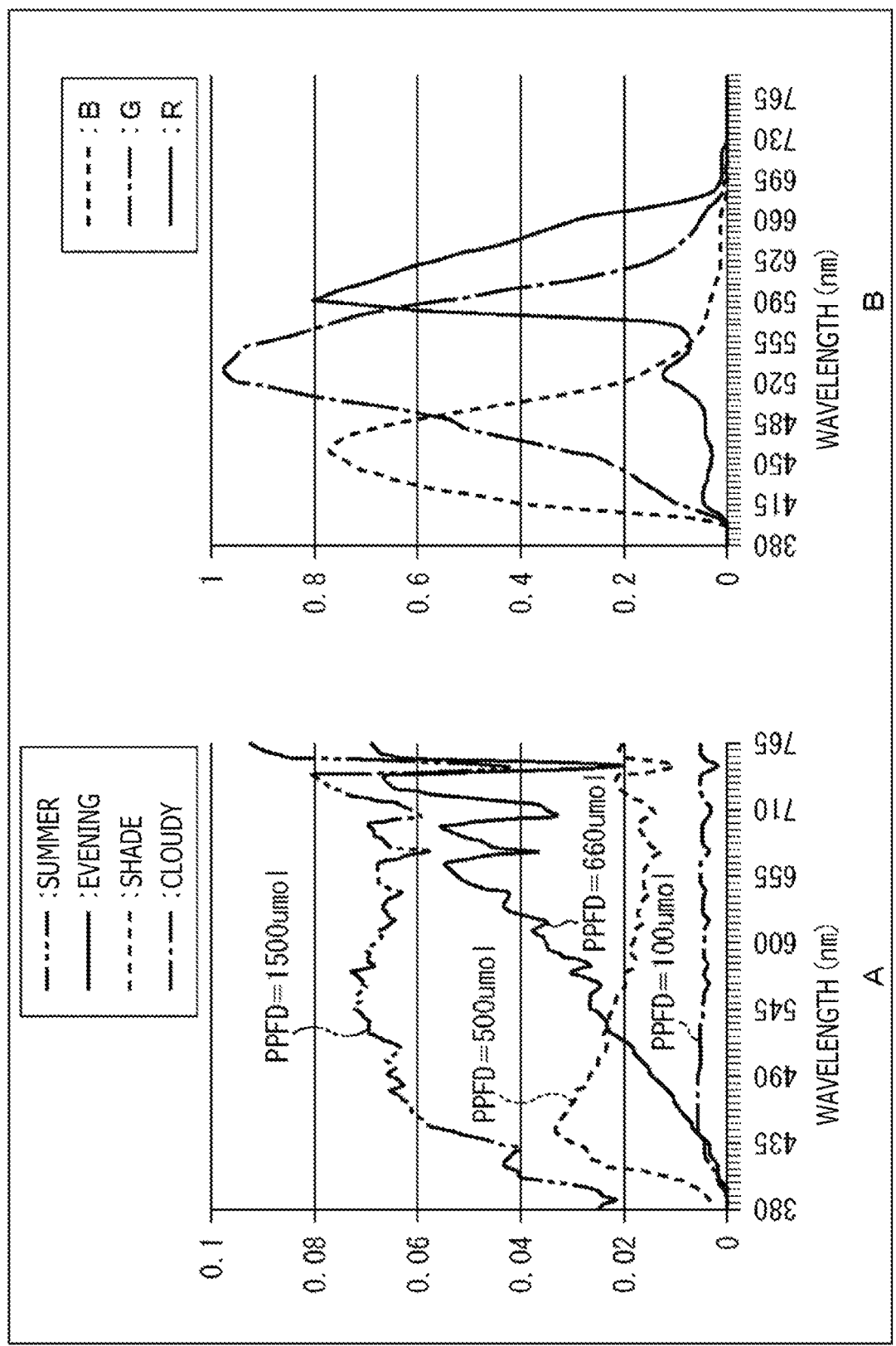
FIG. 19 is a diagram illustrating a relationship between PPFD values and values of color components of RGB.

A of FIG. 19 illustrates spectral characteristics of sunlight in the summer, sunlight in the evening, sunlight in the shade, and sunlight in cloudy weather that are spectral characteristics of sunlight according to conditions, such as time, season, and weather. In this case, the PPFD value can be obtained as an integrated value of values obtained by multiplying the level of each wavelength of sunlight by each wavelength. That is, the PPFD value is calculated by the following Equation (12).

[Math. 1]

$$PPFD = C1 \times \Sigma_{\lambda=400nm}^{700nm}(A \times \lambda \text{ (nm)}) \qquad (12)$$

Note that in Equation (12), A represents the level of wavelength, and λ(nm) represents the wavelength. In addition, λ=400 nm to 700 nm corresponds to the absorption wavelength of chlorophyll of the photosynthetic photon flux density (PPFD). Furthermore, C1 is a coefficient.

The PPFD value of the sunlight in the summer calculated in A of FIG. 19 is 1500 umol, the PPFD value of the sunlight in the evening is 660 umol, the PPFD value of the sunlight in the shade is 500 umol, and the PPFD value of the sunlight in cloudy weather is 100 umol. In this way, the PPFD value significantly varies depending on the slope of the spectral characteristics of the sunlight.

Meanwhile, as illustrated in B of FIG. 19, the incident light is divided into bands of B, G, and R in the normal camera, and the values obtained by integrating the signals in the regions are output from the sensor. Here, to obtain the PPFD values from the RGB signals output from the sensor of the normal camera, the coefficient W1, the coefficient W2, and the coefficient W3 can be controlled so that results equivalent to the values to be obtained as the PPFD values can be obtained by multiplying the values of the B signal, the G signal, and the R signal by the coefficient W1, the coefficient W2, and the coefficient W3, respectively.

Here, the filter 143-1 includes the RGB filters (RGB filters 143-1) and the IR cut filter in the sensing apparatus 101-1, and the output from the sensor 144-1 is the RGB signals as in the normal camera.

Therefore, the calculation unit 171 of the effective index computation apparatus 103 that processes the RGB data from the sensing apparatus 101-1 can also control the coefficient W1, the coefficient W2, and the coefficient W3 so that the results equivalent to the values to be obtained as the PPFD values can be obtained by multiplying the values of the B signal (Br-ave signal), the G signal (Gr-ave signal), and the R signal (Rr-ave signal) by the coefficient W1, the coefficient W2, and the coefficient W3, respectively.

That is, it can be stated that the calculation unit 171 of the effective index computation apparatus 103 can control the coefficient W1, the coefficient W2, and the coefficient W3 to satisfy the relationship of the following Equation (13).

$$PPFD = C2 \times (W1 \times B + W2 \times G + W3 \times R) \qquad (13)$$

Note that in Equation (13), B, G, and R represent the values of the B signal (Br-ave signal), the G signal (Gr-ave signal), and the R signal (Rr-ave signal), respectively, and W1, W2, and W3 represent the coefficient W1, the coefficient W2, and the coefficient W3, respectively. In addition, C2 is a coefficient.

Here, in the calculation unit 171 of FIG. 18, the W1 decision unit 222-1 decides the coefficient W1 according to the Br-ave/Rr-ave value, the Br-ave/Gr-ave value, or the Gr-ave/Rr-ave value. Similarly, the W2 decision unit 222-2 decides the coefficient W2 according to the Br-ave/Rr-ave value, the Br-ave/Gr-ave value, or the Gr-ave/Rr-ave value, and the W3 decision unit 222-3 decides the coefficient W3 according to the Br-ave/Rr-ave value, the Br-ave/Gr-ave value, or the Gr-ave/Rr-ave value.

That is, the units from the W1 decision unit 222-1 to the W3 decision unit 222-3 can calculate the ratio of the Br-ave signal to the Rr-ave signal, the ratio of the Br-ave signal to the Gr-ave signal, or the ratio of the Gr-ave signal to the Rr-ave signal from the values of the Br-ave signal, the Gr-ave signal, and the Rr-ave signal obtained from the RGB data from the sensing apparatus 101-1 to predict the slope of the spectral characteristics of the sunlight from the value of the ratio (Br-ave/Rr-ave value, Br-ave/Gr-ave value, or Gr-ave/Rr-ave value).

Furthermore, in the effective index computation apparatus 103, the coefficient calculation LUT (LUT1) associating the slope of the spectral characteristics of the sunlight (slope of spectral characteristics predicted from Br-ave/Rr-ave value, Br-ave/Gr-ave value, or Gr-ave/Rr-ave value) with the coefficient W1, the coefficient W2, and the coefficient W3 can be stored in the storage unit 163. Therefore, the units from the W1 decision unit 222-1 to the W3 decision unit 222-3 of the calculation unit 171 can decide the coefficients W1 to W3 according to the slope of the spectral characteristics predicted from the Br-ave/Rr-ave value, the Br-ave/Gr-ave value, or the Gr-ave/Rr-ave value on the basis of the coefficient calculation LUT (LUT1).

That is, the W1 decision unit 222-1 refers to the coefficient calculation LUT (LUT1) to decide the coefficient W1 according to the slope of the spectral characteristics predicted from the Br-ave/Rr-ave value or the like. As a result, the multiplier 223-1 multiplies the Br-ave signal by the coefficient W1 decided by the W1 decision unit 222-1 to obtain the PPFD value of the B signal (W1×Br-ave).

In addition, the W2 decision unit 222-2 refers to the coefficient calculation LUT (LUT1) to decide the coefficient W2 according to the slope of the spectral characteristics predicted from the Br-ave/Rr-ave value or the like. As a result, the multiplier 223-2 multiplies the Gr-ave signal by the coefficient W2 decided by the W2 decision unit 222-2 to obtain the PPFD value of the G signal (W2×Gr-ave).

In addition, the W3 decision unit 222-3 refers to the coefficient calculation LUT (LUT1) to decide the coefficient W3 according to the slope of the spectral characteristics predicted from the Br-ave/Rr-ave value or the like. As a result, the multiplier 223-3 multiplies the Rr-ave signal by the coefficient W3 decided by the W3 decision unit 222-3 to obtain the PPFD value of the R signal (W3×Rr-ave).

The calculation unit 171 then adds the output from the multiplier 223-1 (W1×Br-ave), the output from the multiplier 223-2 (W2×Gr-ave), and the output from the multiplier 223-3 (W3×Rr-ave) according to Equation (13) to calculate the PPFD value (W1×Br-ave+W2×Gr-ave+W3×Rr-ave).

The details of the calculation method of the PPFD value has been described.

Note that the reference reflection plate with flat spectral reflection characteristics, such as a gray reflection plate, is used in the example described here. However, in a case where a region with non-flat spectral reflection characteristics (for example, en-tout-cas in stadium) is used as the reference reflection plate (reference reflection region), the RGB data output from the sensing apparatus 101-1 is different from RGB data in the case of using the gray reflection plate or the like due to the reflection by the reference reflection region. However, a coefficient calculation LUT (LUT1) according to the reference reflection region with non-flat spectral reflection characteristics, such as en-tout-cas, can be prepared in this case, and in the calculation of the PPFD value, the coefficient calculation LUT (LUT1) can be used to obtain the same result as the PPFD value in the case of using the reference reflection plate with flat spectral reflection characteristics, such as a gray reflection plate.

(4) Carbon Reduction Reaction Maximum ETR Calculation Process

The carbon reduction reaction is reaction with three reaction processes in the Calvin cycle (Calvin Circuit). The first reaction process is carboxylation reaction that binds the carbon dioxide ($CO_2$) to the carbon skeleton of the $CO_2$ receptor. The second reaction process is reduction reaction that uses the photochemically produced nicotinamide adenine dinucleotide phosphate (NADPH) and energy of adenosine triphosphate (ATP) as well as the reducing power to generate carbohydrate (sugar or starch). The third reaction process is reproduction reaction that generates ribulose-1,5-diphosphate as a $CO_2$ receptor.

The reaction rate of the reaction significantly varies depending on the $CO_2$ concentration, the temperature, the humidity, and the type of plant. Note that the characteristics of plants vary according to not only the classification of C3 plant, C4 plant, and CAM plant, but also the type of plant, for example. Although it is difficult to comprehensively comprehend these elements, the type of plant can be fixed, and the change can be measured within a limited environment.

A gas exchange measurement method is generally used as a measurement method of this type. The light, the $CO_2$ concentration, the temperature, and the humidity can be controlled, and the change in the $CO_2$ concentration can be obtained to measure the photosynthetic rate of the carbon reduction reaction. In addition, the measurement method can be used to create the $CO_2$-limited photosynthetic rate LUT (LUT4), the temperature correction coefficient LUT (LUT5), and the humidity correction coefficient LUT (LUT6). Note that the vapor pressure deficit may be used here instead of the humidity. For example, opening and closing of pores of the plant significantly affect the vapor pressure deficit. When the pores are closed due to drying, the $CO_2$ absorption is inhibited, and the carbon reduction reaction is reduced.

For example, the photosynthetic rate (ETR) of the carbon reduction reaction dependent on the $CO_2$ concentration (not limited by photosystem reaction) can be measured at certain temperature and humidity for each type of plant, season, and place to create the $CO_2$-limited photosynthetic rate LUT (LUT4) associating the $CO_2$ concentration and the photosynthetic rate. Similarly, in a case where the temperature and the humidity are changed for each type of plant, season, and place, the amounts of change can be set as a correction coefficient T and a correction coefficient F, respectively. This can create the temperature correction coefficient LUT (LUT5) associating the temperature and the correction coefficient T and create the humidity correction coefficient LUT (LUT6) associating the humidity and the correction coefficient F.

(Flow of Carbon Reduction Reaction Maximum ETR Calculation Process)

Here, the details of the carbon reduction reaction maximum ETR calculation process corresponding to step S103 of FIG. 10 will be described with reference to a flow chart of FIG. 20.

In step S141, the processing unit 162 of the effective index computation apparatus 103 acquires the data of the $CO_2$ concentration, the temperature, and the humidity as environment measurement data obtained by the sensing of the environment sensor 102 (FIG. 6).

In step S142, the calculation unit 171 of the effective index computation apparatus 103 refers to the $CO_2$-limited photosynthetic rate LUT (LUT4) stored in the storage unit 163 to acquire the photosynthetic rate limited by the $CO_2$ concentration obtained in the process of step S141.

Figure 21:
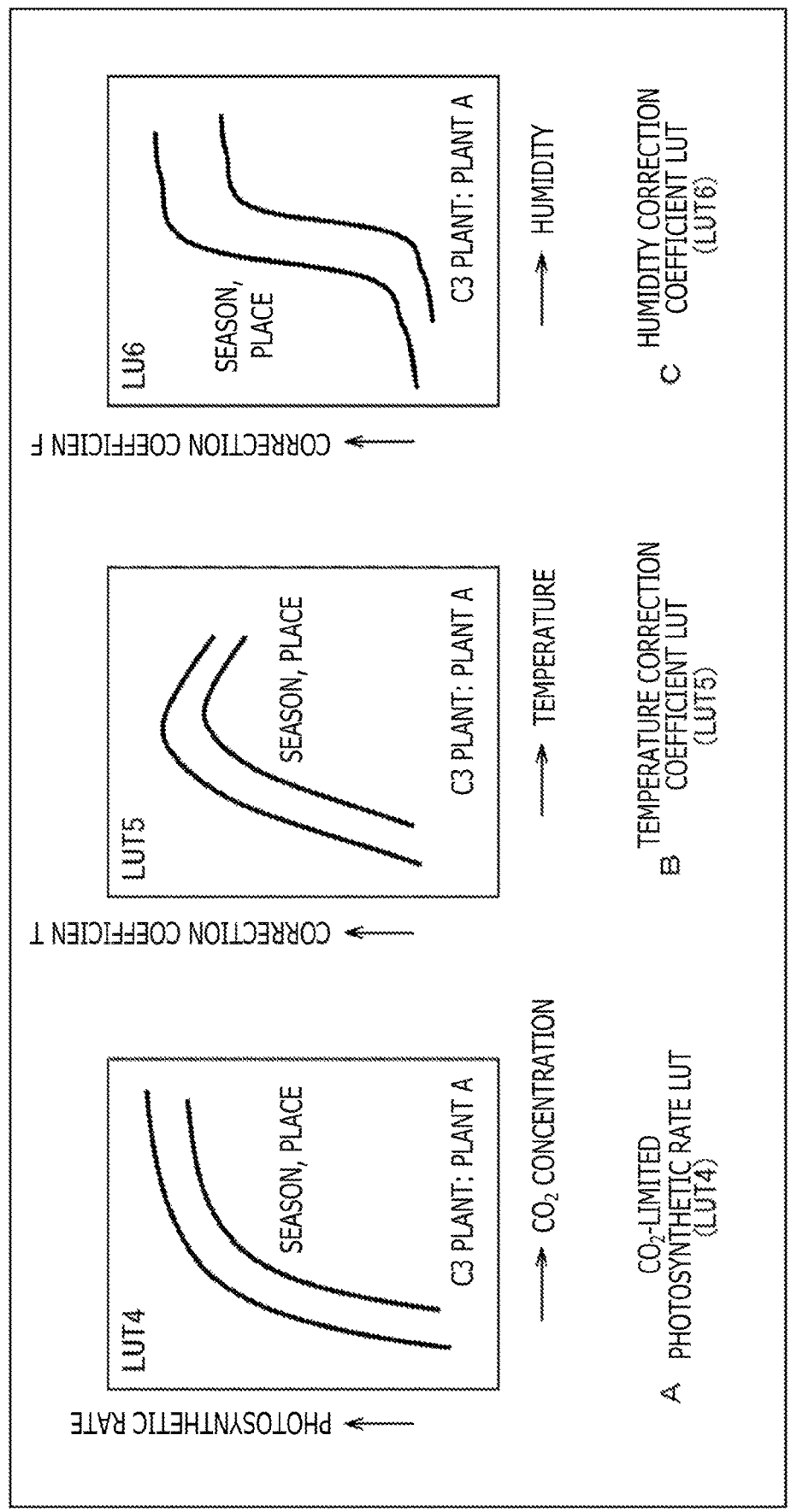
FIG. 21 is a diagram illustrating an example of a $CO_2$-limited synthesis LUT, a temperature correction coefficient LUT, and a humidity correction coefficient LUT.

A of FIG. 21 illustrates the $CO_2$-limited photosynthetic rate LUT (LUT4). In the $CO_2$-limited photosynthetic rate LUT (LUT4), a plurality of look-up tables associating, for example, the $CO_2$ concentration and the photosynthetic rate for each season and place are prepared for a plant A of C3 plant. Therefore, for example, in a case where the measured object 1 is the plant A of C3 plant, the photosynthetic rate (ETR) limited by the measured $CO_2$ concentration can be acquired from the $CO_2$-limited photosynthetic rate LUT (LUT4) according to the measurement period, the measurement place, and the like.

The relationship can be expressed as in the following Equation (14).

$$\text{ETR@}CO_2 = \text{LUT4}(CO_2 \text{ concentration}) \quad (14)$$

Figure 20:
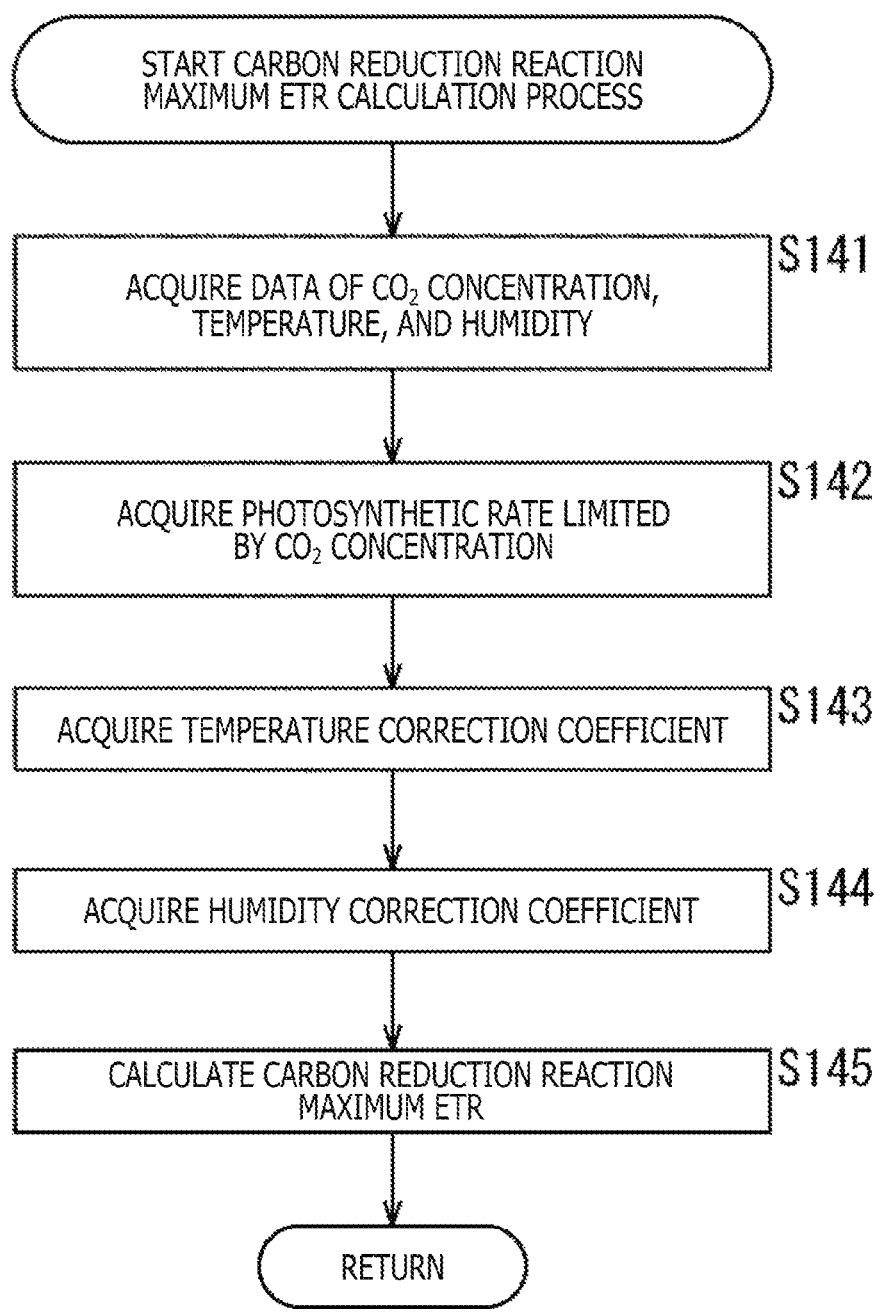
FIG. 20 is a flow chart describing a flow of a carbon reduction reaction maximum ETR calculation process.

Returning to the description of FIG. 20, in step S143, the calculation unit 171 of the effective index computation apparatus 103 refers to the temperature correction coefficient LUT (LUT5) stored in the storage unit 163 to acquire the correction coefficient T according to the temperature obtained in the process of step S141.

B of FIG. 21 illustrates the temperature correction coefficient LUT (LUT5). In the temperature correction coefficient LUT (LUT5), a plurality of look-up tables associating, for example, the temperature and the correction coefficient T for each season and place are prepared for the plant A of C3 plant. Therefore, for example, in the case where the measured object 1 is the plant A of C3 plant, the correction coefficient T corresponding to the measured temperature can be acquired from the temperature correction coefficient LUT (LUT5) according to the measurement period and the measurement place.

The relationship can be expressed as in the following Equation (15).

$$T = LUT5 \text{ (temperature)} \quad (15)$$

Returning to the description of FIG. 20, in step S144, the calculation unit 171 of the effective index computation apparatus 103 refers to the humidity correction coefficient LUT (LUT6) stored in the storage unit 163 to acquire the correction coefficient F corresponding to the humidity obtained in the process of step S141.

C of FIG. 21 illustrates the humidity correction coefficient LUT (LUT6). In the humidity correction coefficient LUT (LUT6), a plurality of look-up tables associating, for example, the humidity and the correction coefficient F for each season and place are prepared for the plant A of C3 plant. Therefore, for example, in the case where the measured object 1 is the plant A of C3 plant, the correction coefficient F corresponding to the measured humidity can be acquired from the humidity correction coefficient LUT (LUT6) according to the measurement period and the measurement place.

The relationship can be expressed as in the following Equation (16).

$$F = LUT6 \text{ (temperature)} \quad (16)$$

Returning to the description of FIG. 20, in step S145, the calculation unit 171 of the effective index computation apparatus 103 calculates the carbon reduction reaction maximum ETR in the measured object 1 on the basis of the data obtained in the process of steps S141 to S144.

Here, as for the calculation method of the carbon reduction reaction maximum ETR, the photosynthetic rate (ETR) limited by the $CO_2$ concentration can be multiplied by the correction coefficient T of the temperature and the correction coefficient F of the humidity to obtain the carbon reduction reaction maximum ETR. That is, the carbon reduction reaction maximum ETR can be obtained by computing the following Equation (17), in which ETR2 represents the carbon reduction reaction maximum ETR.

$$ETR2 = ETR@CO_2 \times T \times F \quad (17)$$

When the process of step S145 is finished, the process returns to step S103 of FIG. 10, and the subsequent process is executed.

The flow of the carbon reduction reaction maximum ETR calculation process has been described. In the carbon reduction reaction maximum ETR calculation process, the electron transport rate (ETR) equivalent to the maximum photosynthetic rate of the carbon reduction reaction decided from the environment and the type of plant is calculated as the carbon reduction reaction maximum ETR.

Note that in the carbon reduction reaction maximum ETR calculation process, the look-up table used for obtaining the effective PPFD value can be switched for each region of the plant in the case where there are a plurality of types of plants in the photographic image obtained as a result of sensing (imaging), as in the photosystem reaction maximum ETR calculation process. This allows to present appropriate effective PPFD values at the same time in the case where there are a plurality of plants in one screen.

(5) Display Examples of Effective PPFD Value and the Like

Next, display examples of the data regarding the effective PPFD value displayed in the process of step S106 of FIG. 10 will be described with reference to FIGS. 22 to 25.

The inventor of the present technique has conducted a simulation (hereinafter, referred to as first simulation) in the following environments of (a) to (d) to check how the PPFD value and the effective PPFD value of the measured object 1, such as a plant in a field, change in different environments in an actual day.

(a) Environment A: in the sun, average temperature of one day is 15 degrees
(b) Environment B: in the shade, average temperature of one day is 15 degrees
(c) Environment C: in the sun, average temperature of one day is 3 degrees
(d) Environment D: in the shade, average temperature of one day is 3 degrees Hereinafter, data obtained as a result of the simulation in the environments A to D will be illustrated. Here, the measured object 1 is a plant.

(5-1) Display Example of Environment A (in the Sun, Average Temperature of 15 Degrees)

Figure 22:
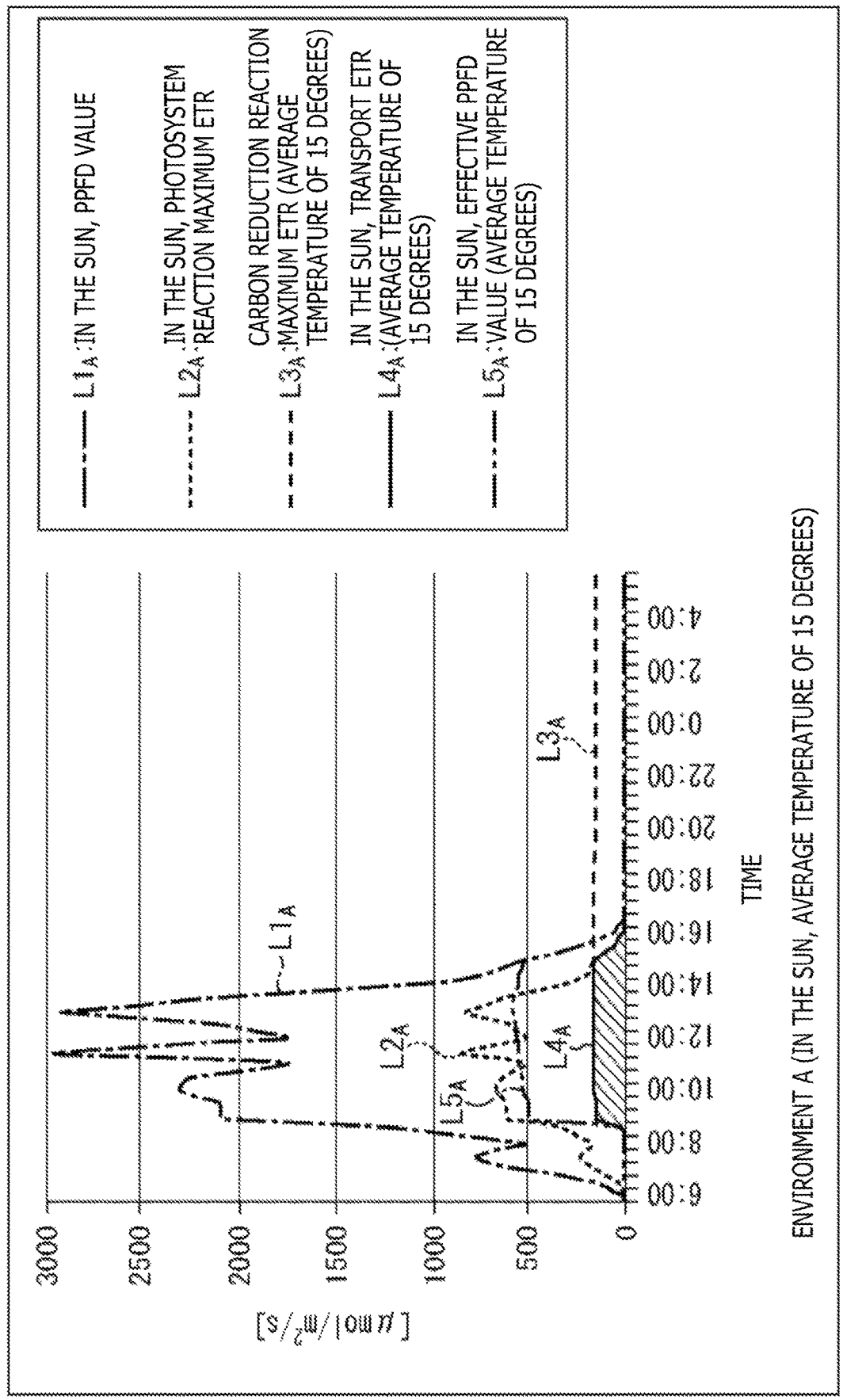
FIG. 22 is a diagram illustrating a display example of the PPFD value, the effective PPFD value, and the like in an environment A.

FIG. 22 is a diagram illustrating a display example of the PPFD value, the effective PPFD value, and the like in the environment A.

In FIG. 22, the horizontal axis indicates time, and the scale is marked every 30 minutes for 24 hours from 6:00 in the morning of a day to 6:00 of the next day. The vertical axis indicates values of data obtained as a result of the simulation in the environment A indicated by different types of lines L1 to L5, and the unit of the values is umol/m²/s. Note that the relationship between the axes is also similar in FIGS. 23 to 25 described later.

In the environment A, the plant is in the sun, and the average temperature of one day around the plant is 15 degrees. As a result of the simulation in the environment, a line $L1_A$ indicates a change in the PPFD value of the sunlight applied to a part of the plant in the sun (in the sun, PPFD value). A line $L2_A$ indicates a change in the photosystem reaction maximum ETR when the sunlight applied to the part of the plant in the sun is converted into energy by the photosystem reaction of the plant (in the sun, photosystem reaction maximum ETR).

A line $L3_A$ indicates a change in the carbon reduction reaction maximum ETR of the plant decided according to the environment such as average temperature of 15 degrees (carbon reduction reaction maximum ETR (average temperature of 15 degrees)). A line $L4_A$ indicates a change in the transport ETR in the environment A (in the sun, transport ETR (average temperature of 15 degrees)). That is, "in the sun, photosystem reaction maximum ETR" indicated by the line $L2_A$ and "carbon reduction reaction maximum ETR (average temperature of 15 degrees)" indicated by the line $L3_A$ are compared. The one with a smaller value is determined as the bottleneck, and the transport ETR for the transport in the plant is decided.

Here, the value of "carbon reduction reaction maximum ETR (average temperature of 15 degrees)" is smaller than the value of "in the sun, photosystem reaction maximum ETR." Therefore, "carbon reduction reaction maximum ETR (average temperature of 15 degrees)" is determined as the bottleneck and set as "in the sun, transport ETR (average temperature of 15 degrees)." As a result, the line $L4_A$ overlaps with part of the line $L3_A$ in FIG. 22.

Furthermore, the line $L4_A$ indicates "in the sun, transport ETR (average temperature of 15 degrees)" and indicates values actually contributed to the growth of the plant. The area of the part inside the line $L4_A$ (part indicated by diagonal lines in FIG. 22) is proportional to the amount of growth of the plant. To be more precise, the growth of the plant is also affected by the mechanism of translocation of sugar, such as a light compensation point and a light saturation point.

A line $L5_A$ indicates a change in the effective PPFD value in the environment A (in the sun, effective PPFD value (average temperature of 15 degrees)). "In the sun, effective PPFD value (average temperature of 15 degrees)" indicated by the line $L5_A$ is obtained by converting the value of "in the sun, transport ETR (average temperature of 15 degrees)" indicated by the line $L4_A$ into the amount of sunlight applied to the part of the plant in the sun.

(5-2) Display Example of Environment B (in the Shade, Average Temperature of 15 Degrees)

Figure 23:
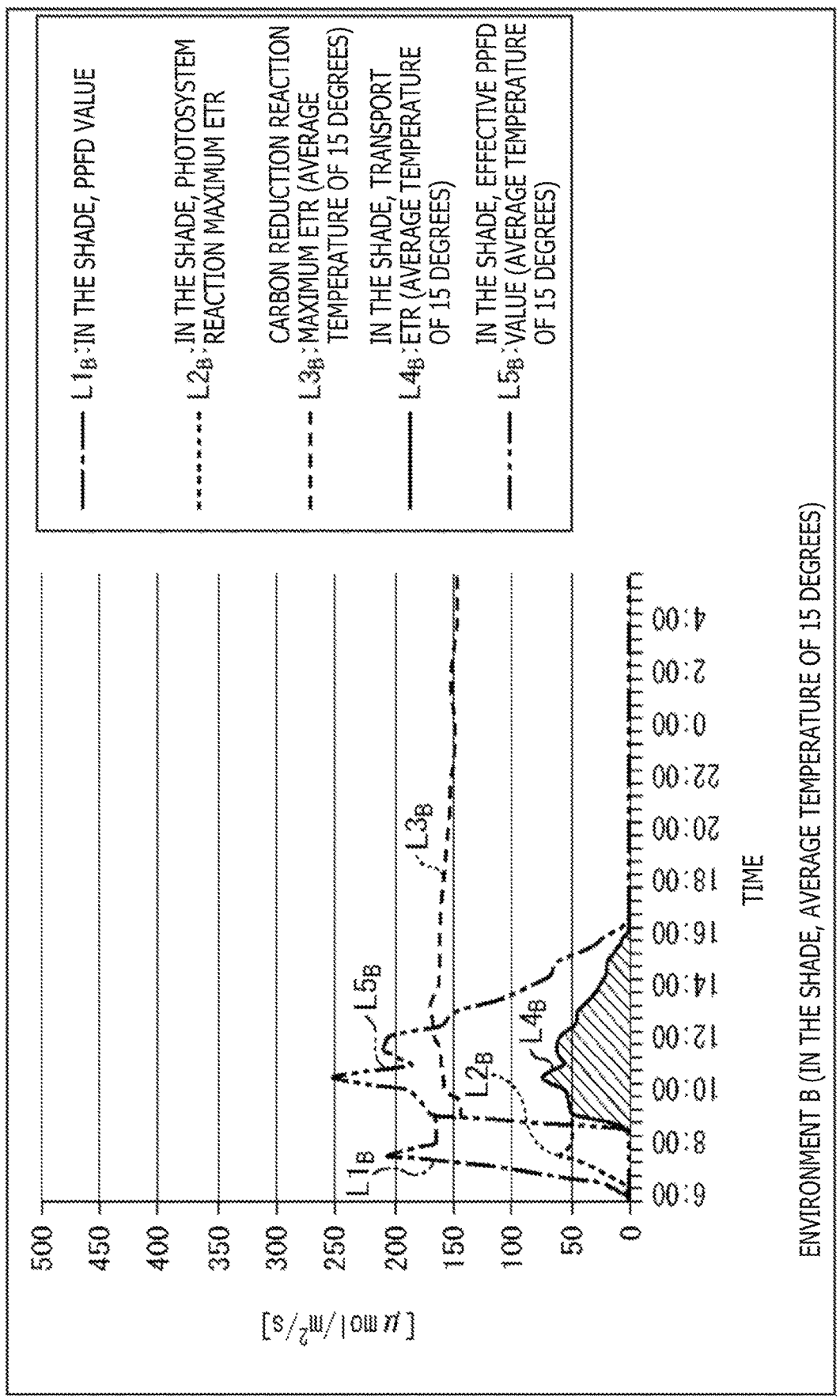
FIG. 23 is a diagram illustrating a display example of the PPFD value, the effective PPFD value, and the like in an environment B.

FIG. 23 is a diagram illustrating a display example of the PPFD value, the effective PPFD value, and the like in the environment B.

In the environment B, the plant is in the shade, and the average temperature of one day around the plant is 15 degrees. As a result of the simulation in the environment, a line $L1_B$ indicates a change in the PPFD value of the sunlight applied to a part of the plant in the shade (in the shade, PPFD value). A line $L2_B$ indicates a change in the photosystem reaction maximum ETR when the sunlight applied to the part of the plant in the shade is converted into energy by the photosystem reaction of the plant (in the shade, photosystem reaction maximum ETR).

A line $L3_B$ indicates a change in the carbon reduction reaction maximum ETR of the plant decided according to the environment such as average temperature of 15 degrees (carbon reduction reaction maximum ETR (average temperature of 15 degrees)). A line $L4_B$ indicates a change in the transport ETR in the environment B (in the shade, transport ETR (average temperature of 15 degrees)). That is, the value of "in the shade, photosystem reaction maximum ETR" is smaller than the value of "carbon reduction reaction maximum ETR (average temperature of 15 degrees)" here. Therefore, "in the shade, photosystem reaction maximum ETR" is determined as the bottleneck and set as "in the shade, transport ETR (average temperature of 15 degrees)." As a result, the line $L4_B$ overlaps with part of the line $L2_B$ in FIG. 23.

Furthermore, the line $L4_B$ indicates "in the shade, transport ETR (average temperature of 15 degrees)" and indicates values actually contributed to the growth of the plant. The area of the part inside the line $L4_B$ (part indicated by diagonal lines in FIG. 23) is proportional to the amount of growth of the plant. A line $L5_B$ indicates a change in the effective PPFD value in the environment B (in the shade, effective PPFD value (average temperature of 15 degrees)) that is obtained by converting the value of "in the shade, transport ETR (average temperature of 15 degrees)" indicated by the line $L4_B$ into the amount of sunlight applied to the part of the plant in the shade.

Note that the reason that the carbon reduction reaction ETR indicated by the line $L3_B$ and the like is rapidly reduced in a time zone of early morning in the example of the data obtained as a result of the simulation is that the vapor pressure deficit condition is also taken into account for the calculation conditions of the carbon reduction reaction ETR. That is, a stadium as a measurement target is sprinkled with water in the early morning, and the stadium becomes excessively humid. The vapor pressure deficit condition is taken into account to reflect the fact that the pores of the plant (grass) are closed.

(5-3) Display Example of Environment C (in the Sun, Average Temperature of 3 Degrees)

Figure 24:
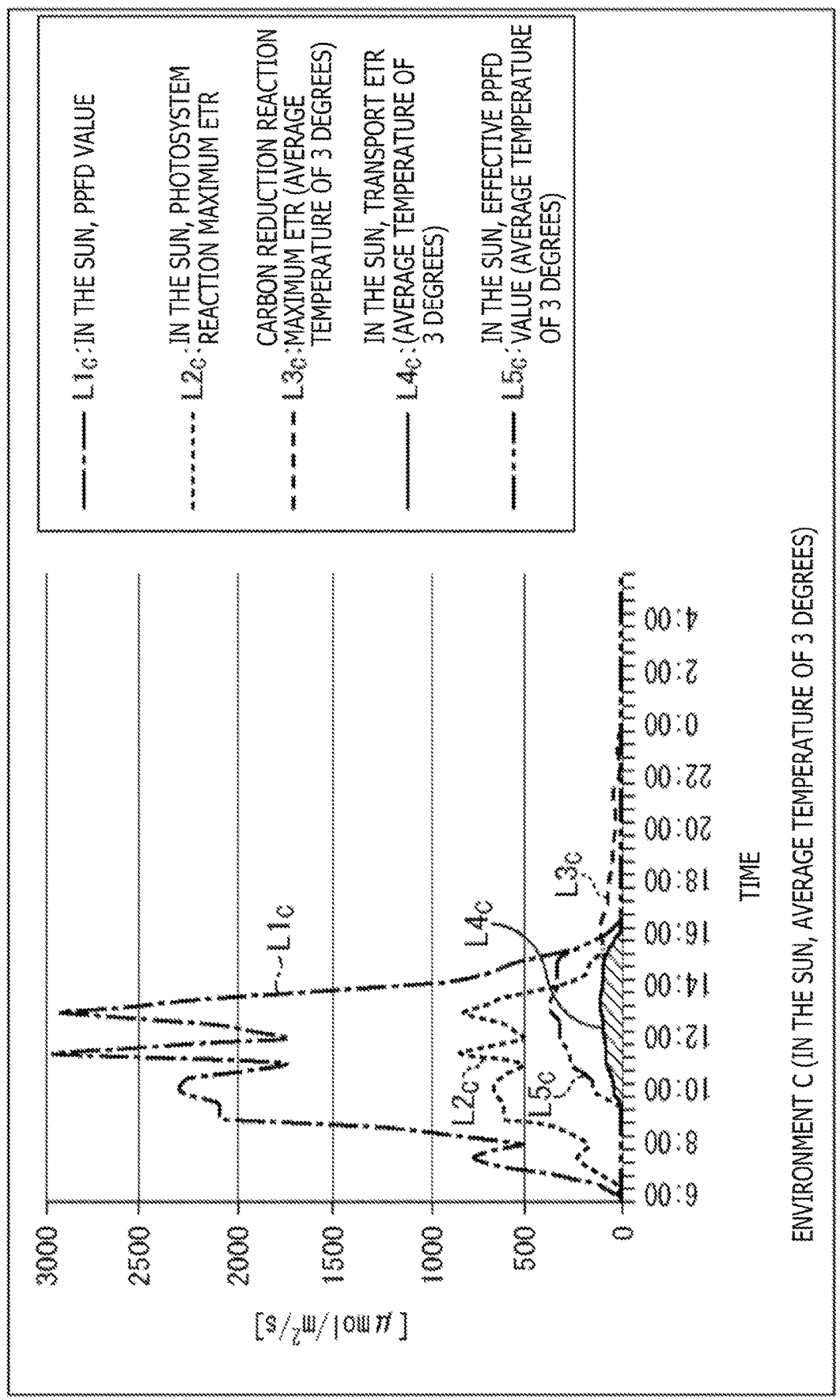
FIG. 24 is a diagram illustrating a display example of the PPFD value, the effective PPFD value, and the like in an environment C.

FIG. 24 is a diagram illustrating a display example of the PPFD value, the effective PPFD value, and the like in the environment C.

In the environment C, the plant is in the sun, and the average temperature of one day around the plant is 3 degrees. As a result of the simulation in the environment, a line $L1_C$ indicates a change in the PPFD value of the sunlight applied to a part of the plant in the sun (in the sun, PPFD value). A line $L2_C$ indicates a change in the photosystem reaction maximum ETR when the sunlight applied to the part of the plant in the sun is converted into energy by the photosystem reaction of the plant (in the sun, photosystem reaction maximum ETR).

A line $L3_C$ indicates a change in the carbon reduction reaction maximum ETR of the plant decided according to the environment such as average temperature of 3 degrees (carbon reduction reaction maximum ETR (average temperature of 3 degrees)). A line $L4_C$ indicates a change in the transport ETR in the environment C (in the sun, transport ETR (average temperature of 3 degrees)). That is, the value of "carbon reduction reaction maximum ETR (average temperature of 3 degrees)" is smaller than the value of "in the sun, photosystem reaction maximum ETR" here. Therefore, "carbon reduction reaction maximum ETR (average temperature of 3 degrees)" is determined as the bottleneck and set as "in the sun, transport ETR (average temperature of 3 degrees)." As a result, the line $L4_C$ overlaps with part of the line $L3_C$ in FIG. 24.

Furthermore, the line $L4_C$ indicates "in the sun, transport ETR (average temperature of 3 degrees)" and indicates values actually contributed to the growth of the plant. The area of the part inside the line $L4_C$ (part indicated by diagonal lines in FIG. 24) is proportional to the amount of growth of the plant. A line $L5_C$ indicates a change in the effective PPFD value in the environment C (in the sun, effective PPFD value (average temperature of 3 degrees)) that is obtained by converting the value of "in the sun, transport ETR (average temperature of 3 degrees)" indicated by the line $L4_C$ into the amount of sunlight applied to the part of the plant in the sun.

(5-4) Display Example of Environment D (in the Shade, Average Temperature of 3 Degrees)

Figure 25:
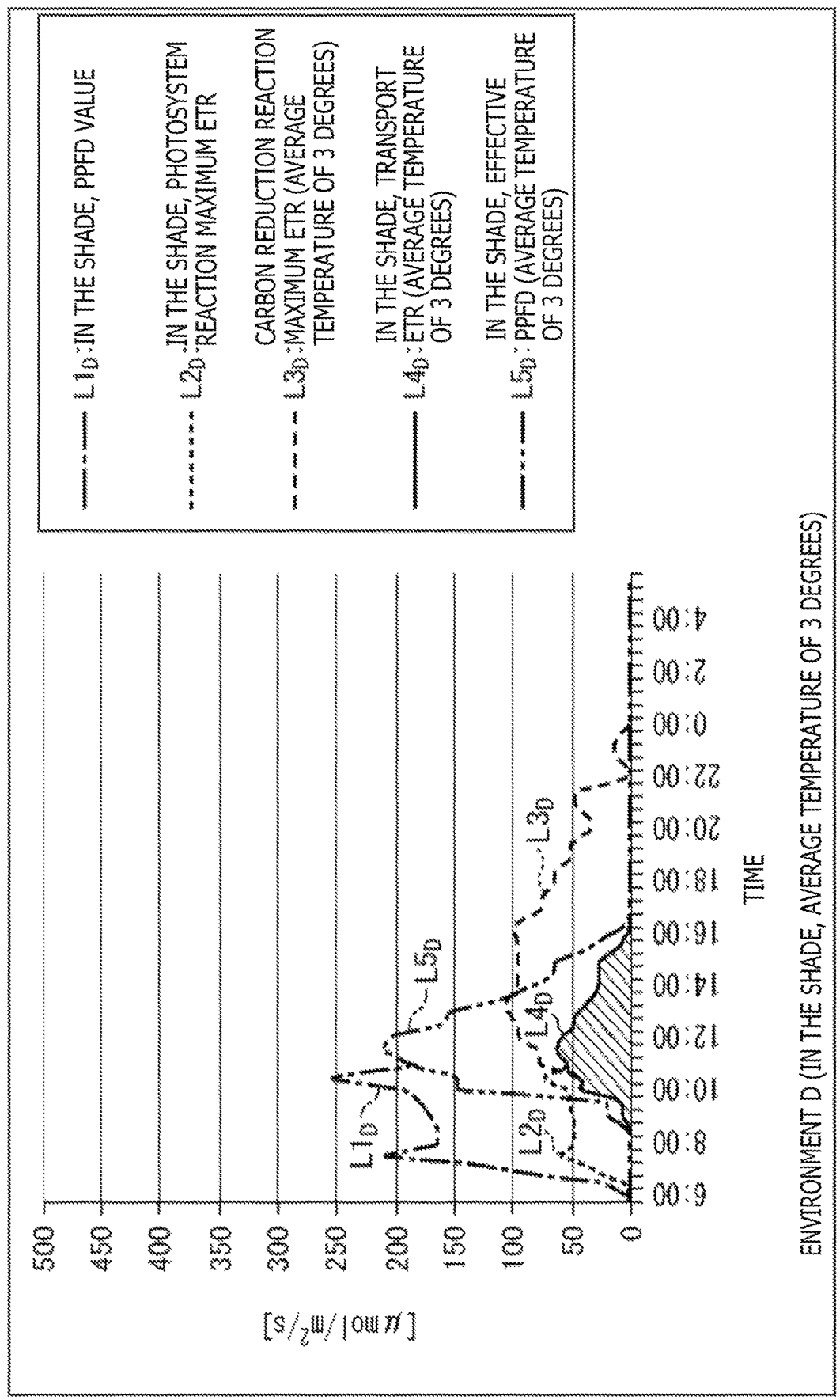
FIG. 25 is a diagram illustrating a display example of the PPFD value, the effective PPFD value, and the like in an environment D.

FIG. 25 is a diagram illustrating a display example of the PPFD value, the effective PPFD value, and the like in the environment D.

In the environment D, the plant is in the shade, and the average temperature of one day around the plant is 3 degrees. As a result of the simulation in the environment, a line $L1_D$ indicates a change in the PPFD value of the sunlight applied to a part of the plant in the shade (in the shade, PPFD value). A line $L2_D$ indicates a change in the photosystem reaction maximum ETR when the sunlight applied to the part of the plant in the shade is converted into energy by the photosystem reaction of the plant (in the shade, photosystem reaction maximum ETR).

A line $L3_D$ indicates a change in the carbon reduction reaction maximum ETR of the plant decided according to the environment such as average temperature of 3 degrees (carbon reduction reaction maximum ETR (average temperature of 3 degrees)). A line $L4_D$ indicates a change in the transport ETR in the environment D (in the shade, transport ETR (average temperature of 3 degrees)). That is, the value of "in the shade, photosystem reaction maximum ETR" is smaller than the value of "carbon reduction reaction maximum ETR (average temperature of 3 degrees)" here. Therefore, "in the shade, photosystem reaction maximum ETR" is determined as the bottleneck and set as "in the shade, transport ETR (average temperature of 3 degrees)." As a result, the line $L4_D$ overlaps with part of the line $L2_D$ in FIG. 25.

Furthermore, the line $L4_D$ indicates "in the shade, transport ETR (average temperature of 3 degrees)" and indicates values actually contributed to the growth of the plant. The area of the part inside the line $L4_D$ (part indicated by diagonal lines in FIG. 25) is proportional to the amount of growth of the plant. A line LSD indicates a change in the effective PPFD value in the environment D (in the shade, effective PPFD value (average temperature of 3 degrees)) that is obtained by converting the value of "in the shade, transport ETR (average temperature of 3 degrees)" indicated by the line $L4_D$ into the amount of sunlight applied to the part of the plant in the shade.

(Comparison of First Simulation Results)

Here, the following is comparison of the first simulation results illustrated in FIGS. 22 to 25.

That is, the PPFD value and the photosystem reaction maximum ETR are decided according to the sunlight applied to the plant, and the environment is in the sun in both of the environment A in FIG. 22 and the environment C in FIG. 24. Therefore, "in the sun, PPFD values" (line $L1_A$ and line $L1_C$) coincide, and "in the sun, photosystem reaction maximum ETRs" (line $L2_A$ and line $L2_C$) coincide.

On the other hand, the carbon reduction reaction maximum ETR is affected by the temperature, and the average temperatures of 15 degrees and 3 degrees are different in the environment A of FIG. 22 and the environment C of FIG. 24. Therefore, "carbon reduction reaction maximum ETR (average temperature of 15 degrees)" indicated by the line $L3_A$ and "carbon reduction reaction maximum ETR (average temperature of 3 degrees)" indicated by the line $L3_C$ are different.

The environment is in the shade in both of the environment B in FIG. 23 and the environment D in FIG. 25. Therefore, "in the shade, PPFD values" (line LIB and line $L1_D$) coincide, and "in the shade, photosystem reaction maximum ETRs" (line $L2_B$ and line $L2_D$) coincide. Note that the unit of the scale of the vertical axis in the environment B of FIG. 23 and the environment D of FIG. 25 and the unit of the scale of the vertical axis in the environment A of FIG. 22 and the environment C of FIG. 24 are different, and the PPFD value and the photosystem reaction maximum ETR of the environment in the shade are smaller than those of the environment in the sun.

On the other hand, the average temperatures of 15 degrees and 3 degrees are different in the environment B of FIG. 23 and the environment D of FIG. 25. Therefore, "carbon reduction reaction maximum ETR (average temperature of 15 degrees)" indicated by the line $L3_B$ and "carbon reduction reaction maximum ETR (average temperature of 3 degrees)" indicated by the line $L3_D$ are different.

In addition, the average temperature is 15 degrees in both of the environment A in FIG. 22 and the environment B in FIG. 23, and the units of the scale of the vertical axis are different. However, "carbon reduction reaction maximum ETR (average temperature of 15 degrees)" indicated by the line $L3_A$ and "carbon reduction reaction maximum ETR (average temperature of 15 degrees)" indicated by the line $L3_B$ coincide with each other. Similarly, the average temperature is 3 degrees in both of the environment C in FIG. 24 and the environment D in FIG. 25, and the units of the scale of the vertical axis are different. However, "carbon reduction reaction maximum ETR (average temperature of 3 degrees)" indicated by the line $L3_C$ and "carbon reduction reaction maximum ETR (average temperature of 3 degrees)" indicated by the line $L3_D$ coincide with each other.

Here, the following is comparison of the effective PPFD values indicated by the line $L5_A$, the line $L5_B$, the line $L5_C$, and the line $L5_D$ in the environments A to D of FIGS. 22 to 25. That is, the value of "in the sun, effective PPFD value (average temperature of 15 degrees)" indicated by the line $L5_A$ in the environment A of FIG. 22 is the largest, indicating a value over 500 (umol/m$^2$/s). On the other hand, the value of "in the shade, effective PPFD value (average temperature of 3 degrees)" indicated by the line $L5_D$ in the environment D of FIG. 25 is the smallest value.

<4. Utilization Method of Effective PPFD Value>

Incidentally, the effective PPFD value can be utilized for various uses. In an example of utilizing the effective PPFD value described here, the effective PPFD value obtained by measuring the plant in the field as the measured object 1 is used to improve the environment, such as the light applied to the plant as well as the temperature, the humidity, and the carbon dioxide concentration ($CO_2$ concentration) in the air around the plant. The environment can be improved by the environment improvement control, and the amount of growth of the plant can be increased.

Hereinafter, real-time environment control for improving the environment in real time and predicted environment control for improving the environment by using prepared prediction information will be sequentially described as the environment improvement control using the effective PPFD value.

(1) Real-Time Environment Control

First, the real-time environment control will be described.

(Configuration of Environment Control System)

Figure 26:
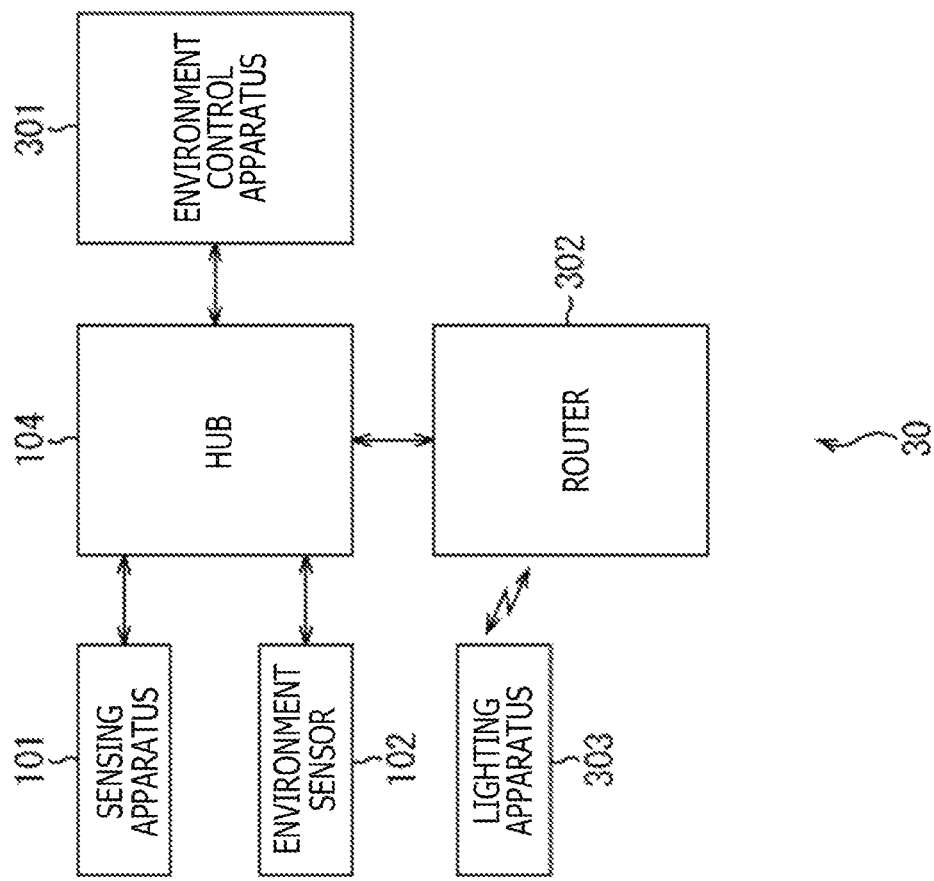
FIG. 26 is a diagram illustrating a configuration of an embodiment of an environment control system according to the present technique.

FIG. 26 is a diagram illustrating a configuration of an embodiment of an environment control system according to the present technique.

An environment control system 30 of FIG. 26 is a system for performing real-time environment control for improving the environment in real time. That is, in a case where a plant (for example, plant in field or grass in stadium) is set as the measured object 1 to calculate the effective PPFD value as an effective index of the plant, the environment control system 30 uses the effective PPFD value to perform control for improving the environment, such as the light applied to the plant, in real time.

In FIG. 26, the environment control system 30 includes the sensing apparatus 101, the environment sensor 102, the hub 104, an environment control apparatus 301, a router 302, and a lighting apparatus 303.

In the environment control system 30 of FIG. 26, the same reference signs are provided to the parts corresponding to the effective index computation system 10 of FIG. 6, and the description will be appropriately omitted. That is, compared to the effective index computation system 10 of FIG. 6, the environment control system 30 of FIG. 26 includes the environment control apparatus 301 in place of the effective index computation apparatus 103, and the router 302 and the lighting apparatus 303 are newly added.

The environment control apparatus 301 is an apparatus with a computation function and a control function of a circuit, such as a CPU and an FPGA. The environment control apparatus 301 is configured as a personal computer, a dedicated terminal apparatus, or the like. Similar to the effective index computation apparatus 103 (FIG. 6), the environment control apparatus 301 has a function of computing the effective PPFD value and has a function for controlling the environment improvement using the effective PPFD value.

That is, the index measurement data from the sensing apparatus 101 and the environment measurement data from the environment sensor 102 are input to the environment control apparatus 301 through the hub 104. The environment control apparatus 301 calculates the effective PPFD value on the basis of the index measurement data and the environment measurement data. Here, the processes equivalent to the procedures 1 to 3 illustrated in FIG. 5 can be executed to calculate the effective PPFD value as an effective index for an index that is a PPFD value.

The environment control apparatus 301 also uses the calculated effective PPFD value to decide a target for actually improving the environment (hereinafter, referred to as environment improvement target) from candidates for improving the environment (hereinafter, referred to as environment improvement candidates) and controls the environment improvement based on the environment improvement target. In the environment control system 30, the lighting apparatus 303 that can apply light to the measured object 1 is provided as a function of improving the environment (hereinafter, referred to as environment improvement function).

In a case where the environment control apparatus 301 decides the light as the environment improvement target on the basis of the environment improvement candidates and the environment improvement function, the environment control apparatus 301 calculates a maximum amount of supplemental lighting as a value used for further improving the environment on the basis of the environment improvement target (hereinafter, referred to as amount of environment improvement). The environment control apparatus 301 can control the lighting apparatus 303 connected to the router 302 through the hub 104 on the basis of the maximum amount of supplemental lighting as an amount of environment improvement to control the environment improvement based on the light.

Note that the detailed configuration of the environment control apparatus 301 will be described later with reference to FIG. 27.

The lighting apparatus 303 includes an LED (Light Emitting Diode) or the like as a light source and applies light to the measured object 1, such as a plant. Note that the light source in the lighting apparatus 303 is not limited to the LED, and for example, artificial light, such as fluorescent light, can be used.

The lighting apparatus 303 has a wireless communication function and can communicate with the environment control apparatus 301 connected to the hub 104 through the router 302. The lighting apparatus 303 adjusts the amount of light applied to the measured object 1 according to the control from the environment control apparatus 301.

Note that the detailed configuration of the lighting apparatus 303 will be described later with reference to FIG. 28.

The environment control system 30 is configured in this way.

(Configuration of Environment Control Apparatus)

Figure 27:
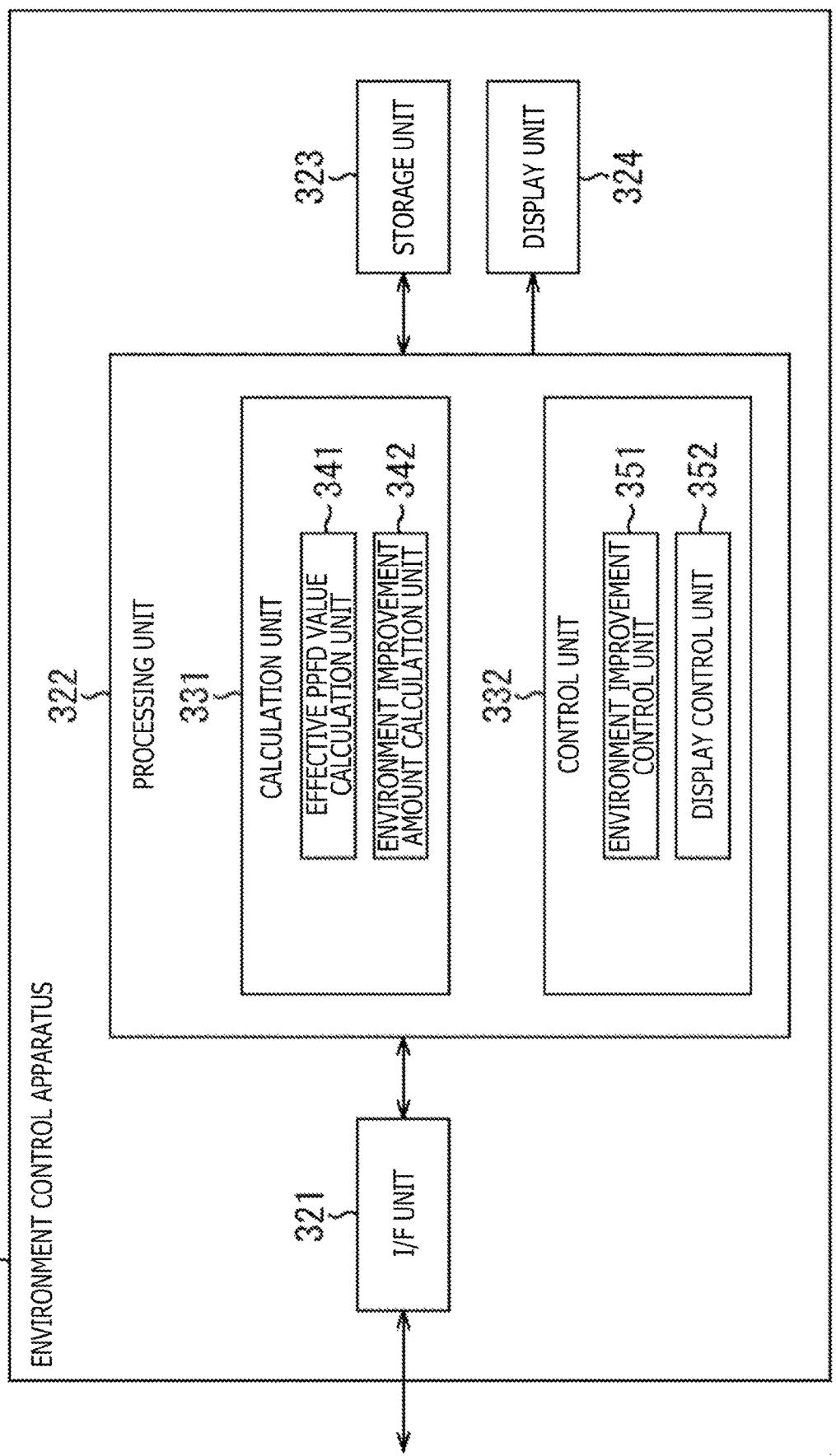
FIG. 27 is a diagram illustrating a configuration example of an environment control apparatus.

FIG. 27 is a diagram illustrating a configuration example of the environment control apparatus 301 of FIG. 26.

In FIG. 27, the environment control apparatus 301 includes an I/F unit 321, a processing unit 322, a storage unit 323, and a display unit 324. Note that in the environment control apparatus 301 of FIG. 27, the I/F unit 321, the storage unit 323, and the display unit 324 correspond to the I/F unit 161, the storage unit 163, and the display unit 164 of FIG. 8.

The I/F unit 321 includes an external input interface circuit or the like. The I/F unit 321 supplies the index measurement data input from the sensing apparatus 101 and the environment measurement data input from the environment sensor 102 to the processing unit 322. The I/F unit 321 can also connect to the router 302 through the hub 104 to communicate with the lighting apparatus 303 according to the control from the processing unit 322.

The processing unit 322 includes a circuit, such as a CPU and an FPGA. The processing unit 322 includes a calculation unit 331 and a control unit 332.

The calculation unit 331 executes a computation process necessary for performing the real-time environment control of the effective PPFD value, the amount of environment improvement, and the like. The calculation unit 331 includes an effective PPFD value calculation unit 341 and an environment improvement amount calculation unit 342.

The effective PPFD value calculation unit 341 refers to the look-up table (LUT) stored in the storage unit 323 to apply predetermined signal processing to the index measurement data and the environment measurement data supplied from the I/F unit 321 to calculate the effective PPFD value. Note that in the signal processing, the effective PPFD value calculation process illustrated in FIG. 10 (process of steps S101 to S105) is executed as a process equivalent to the procedures 1 to 3 illustrated in FIG. 5 to calculate the effective PPFD value.

The environment improvement amount calculation unit 342 decides the environment improvement target from the environment improvement candidates corresponding to the effective PPFD value calculated by the effective PPFD value calculation unit 341 and calculates the amount of environment improvement used for improving the environment on the basis of the environment improvement target. Although the details of the signal processing will be described later, the lighting apparatus 303 is prepared in the environment control system 30. Therefore, in the case where the light is decided as the environment improvement target, the maximum amount of supplemental lighting is calculated as the amount of environment improvement.

The control unit 332 executes a control process necessary in performing the real-time environment control, such as environment improvement control and display control. The control unit 332 includes an environment improvement control unit 351 and a display control unit 352.

The environment improvement control unit 351 performs the environment improvement control on the basis of the amount of environment improvement calculated by the environment improvement amount calculation unit 342. Here, the lighting apparatus 303 is prepared in the environment control system 30. Therefore, the environment improvement control unit 351 can control the lighting apparatus 303 on the basis of the maximum amount of supplemental lighting as an amount of environment improvement to apply the light to the measured object 1, such as a plant, according to the maximum amount of supplemental lighting.

The display control unit 352 controls display of various types of data, such as numeric data and image data, displayed on the display unit 324.

The storage unit 323 includes, for example, a semiconductor memory or the like. The look-up table (LUT) for calculating the effective PPFD value is stored in advance in the storage unit 323.

The display unit 324 includes, for example, a display, such as an LCD and an OLED. The display unit 324 displays data (for example, numeric data and image data) and the like regarding the effective PPFD value calculated by the calculation unit 331 according to the control from the display control unit 352.

Note that although the storage unit 323 and the display unit 324 are provided inside of the environment control apparatus 301 in the description of FIG. 27, a storage apparatus and a display apparatus may be provided outside of the environment control apparatus 301.

The environment control apparatus 301 is configured in this way.

(Configuration of Lighting Apparatus)

Figure 28:
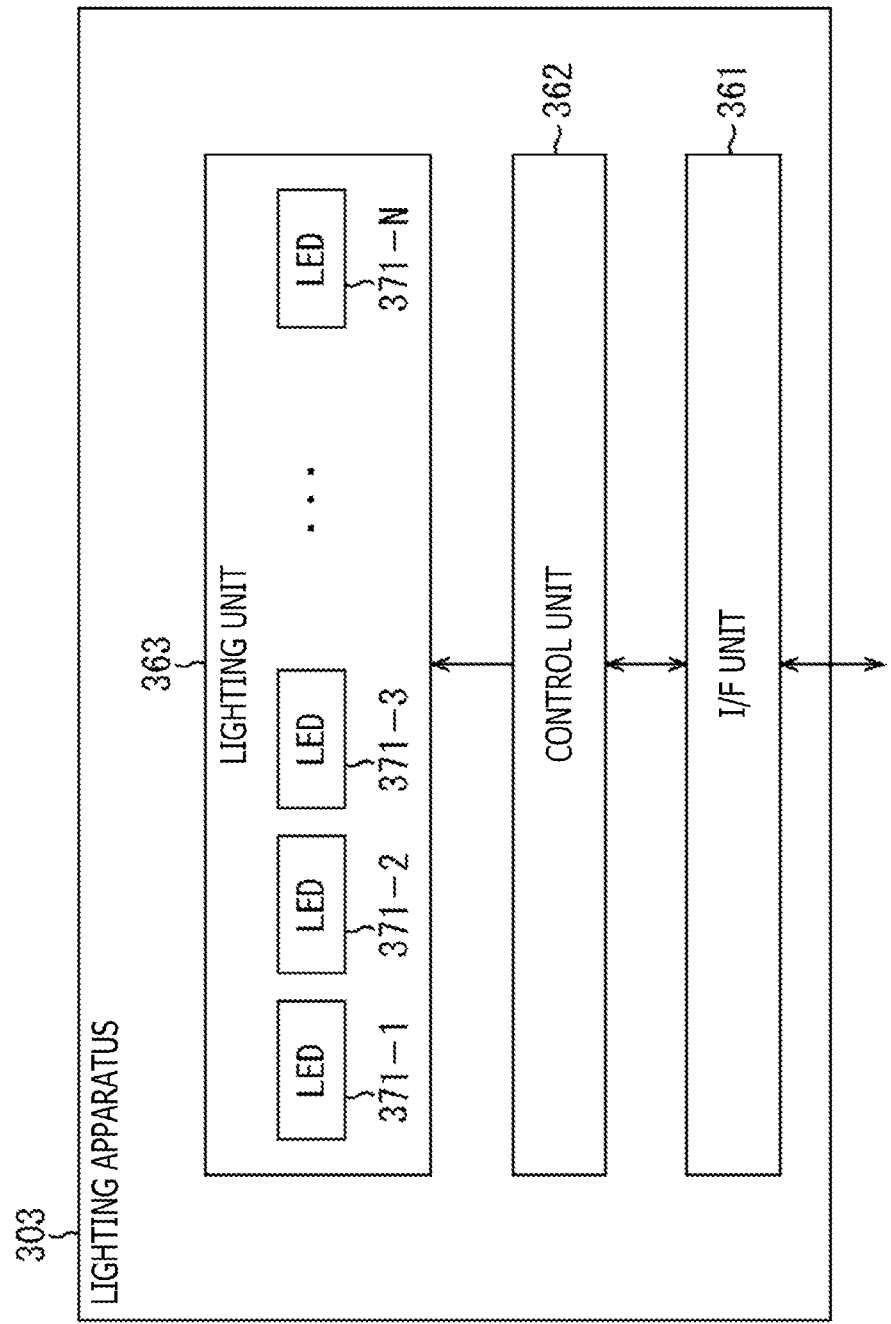
FIG. 28 is a diagram illustrating a configuration example of a lighting apparatus.

FIG. 28 is a diagram illustrating a configuration example of the lighting apparatus 303 of FIG. 26.

The lighting apparatus 303 uses an LED or the like as a light source to apply light to the measured object 1, such as a plant in a field and grass of a stadium. In this case, the lighting apparatus 303 (light source of the lighting apparatus 303) is installed, for example, above the measured object 1 to apply light corresponding to the maximum amount of supplemental lighting to the measured object 1 from above according to the control from the environment control apparatus 301 (environment improvement control unit 351 of the environment control apparatus 301).

In FIG. 28, the lighting apparatus 303 includes an I/F unit 361, a control unit 362, and a lighting unit 363.

The I/F unit 361 includes a communication I/F circuit for wireless communication or the like. The I/F unit 361 communicates with the environment control apparatus 301 connected to the hub 104 through the router 302. The I/F unit 361 supplies the data indicating the maximum amount of supplemental lighting transmitted from the environment control apparatus 301 to the control unit 362.

The control unit 362 includes a circuit, such as a CPU and a microprocessor, or the like. The control unit 362 controls the operation of each unit of the lighting apparatus 303. The control unit 362 controls the amount of light applied from the lighting unit 363 on the basis of the data indicating the maximum amount of supplemental lighting supplied from the I/F unit 361.

The lighting unit 363 includes LEDs 371-1 to 371-N (N: integer equal to or greater than 1). The lighting unit 363 applies light in an amount corresponding to the maximum amount of supplemental lighting according to the control from the control unit 362.

For example, the LEDs 371-1 to 371-N are linearly or planarly arranged in the lighting unit 363, and the LEDs 371-1 to 371-N apply the light to the measured object 1 in lines or in planes.

Note that the region where the lighting apparatus 303 (LEDs 371-1 to 371-N of the lighting apparatus 303) can apply light at a time is limited. Therefore, for example, in a case where a wide region, such as plants in a field and grass in a stadium, is the target, the lighting apparatus 303 may not be able to cover the wide region alone.

In that case, for example, a plurality of lighting apparatuses 303 can be used at the same time, or the lighting apparatus 303 can be provided with a movement function to allow the lighting apparatus 303 to move above the region to be applied with light. In this way, a wide region, such as plants in a field and grass in a stadium, can be covered. In this case, the user may manually move the lighting apparatus 303, or the lighting apparatus 303 may be automatically moved according to the control from the environment control apparatus 301.

In addition, an example of light applied from the LEDs 371-1 to 371-N in the lighting apparatus 303 includes light at a specific wavelength, such as red (wavelength of 660 nm) or blue (wavelength of 450 nm) optimal for the photosynthesis of a plant. In that case, the lighting apparatus 303 may change the control of the light according to each wavelength of the light.

The lighting apparatus 303 is configured in this way.

(Another Configuration of Environment Control System)

Incidentally, although the real-time environment control is performed in a local environment in the environment control system 30 illustrated in FIG. 26, the real-time environment control may be performed in a cloud environment.

Figure 29:
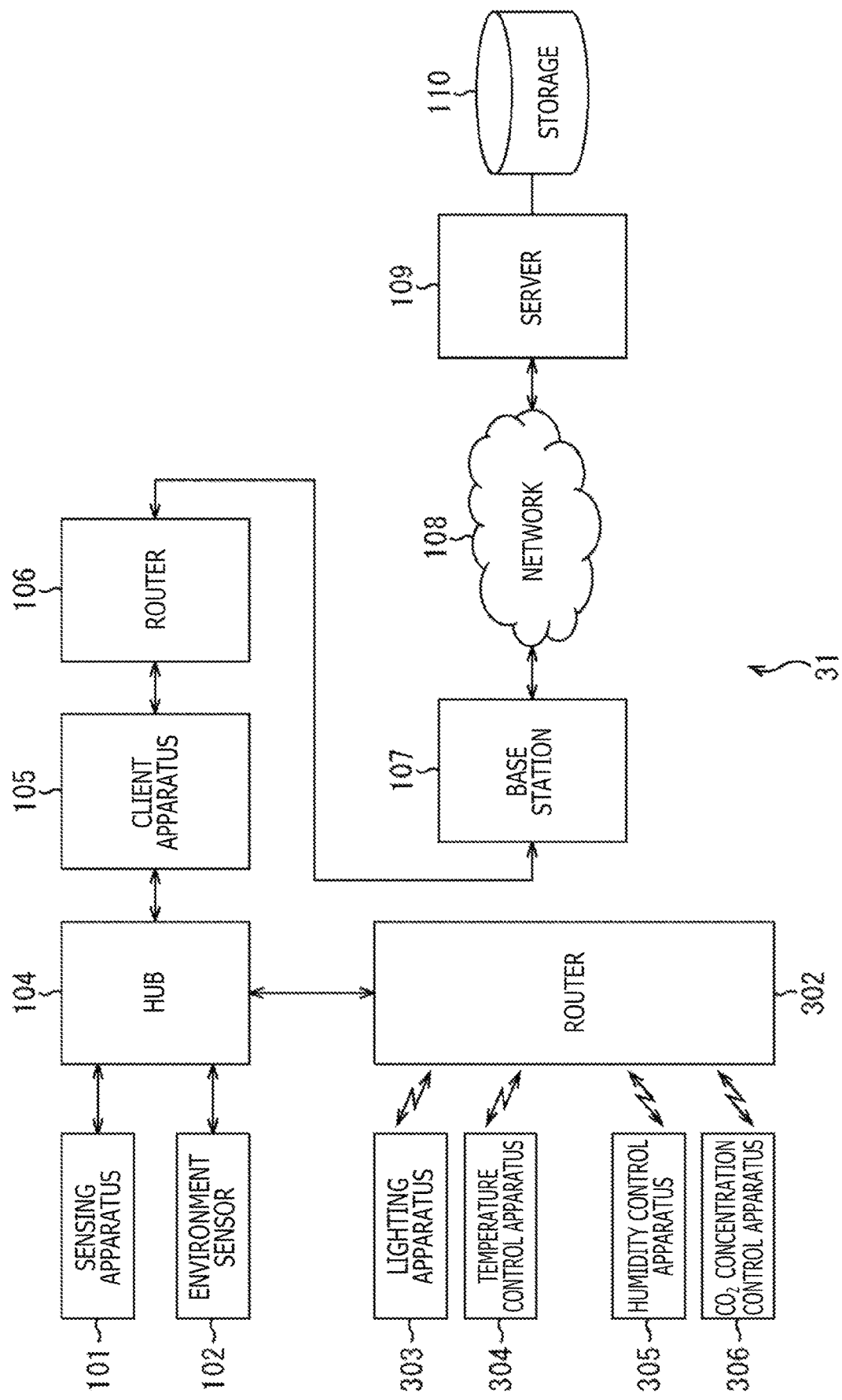
FIG. 29 is a diagram illustrating another configuration example of the environment control system.

FIG. 29 illustrates another configuration example of the environment control system, illustrating a configuration example of an environment control system 31 corresponding to the cloud environment.

In the environment control system 31 of FIG. 29, the same reference signs are provided to the parts corresponding to the effective index computation system 11 of FIG. 9, and the description will be appropriately omitted. That is, compared to the effective index computation system 11 of FIG. 9, the router 302, the lighting apparatus 303, a temperature control apparatus 304, a humidity control apparatus 305, and a $CO_2$ concentration control apparatus 306 are newly added to the environment control system 31 of FIG. 29.

The client apparatus 105 includes a personal computer or the like and outputs the index measurement data and the environment measurement data input from the sensing apparatus 101 and the environment sensor 102 to the router 106 through the hub 104.

The server 109 receives the index measurement data and the environment measurement data transmitted from the client apparatus 105 through the network 108. Here, the server 109 has functions similar to at least the processing unit 322 and the storage unit 323 among the functions of the environment control apparatus 301 illustrated in FIG. 27.

That is, the effective PPFD value calculation unit 341 of the processing unit 322 in the server 109 refers to the look-up table stored in the storage unit 323 to apply the effective PPFD value calculation process (process from steps S101 to S105) illustrated in FIG. 10 to the index measurement data and the environment measurement data received from the client apparatus 105 to calculate the effective PPFD value.

In addition, the environment improvement amount calculation unit 342 of the processing unit 322 in the server 109 decides the environment improvement target from the environment improvement candidates corresponding to the effective PPFD value calculated by the effective PPFD value calculation unit 341 and calculates the amount of environment improvement used for improving the environment on the basis of the environment improvement target.

Here, environment improvement functions prepared for the environment control system 31 include, in addition to the lighting apparatus 303 that improves the environment of the light: the temperature control apparatus 304 that improves the environment of the temperature; the humidity control apparatus 305 that improves the environment of the humidity; and the $CO_2$ concentration control apparatus 306 that improves the environment of the carbon dioxide concentration.

Furthermore, in the case where the light is decided as the environment improvement target, the environment improvement amount calculation unit 342 calculates, as the amount of environment improvement, the maximum amount of supplemental lighting of the light applied by the lighting apparatus 303. In addition, the environment improvement control unit 351 can control the lighting apparatus 303 through the network 108 or the like on the basis of the maximum amount of supplemental lighting calculated by the environment improvement amount calculation unit 342 to apply light corresponding to the maximum amount of supplemental lighting to the measured object 1.

Furthermore, in the case where the temperature, the humidity, or the carbon dioxide concentration ($CO_2$ concentration) is decided as the environment improvement target, the environment improvement amount calculation unit 342 calculates environment improvement temperature, environment improvement humidity, or environment improvement $CO_2$ concentration as the amount of environment improvement. The environment improvement control unit 351 then controls the temperature control apparatus 304, the humidity control apparatus 305, or the $CO_2$ concentration control apparatus 306 through the network 108 or the like on the basis of the environment improvement temperature, the environment improvement humidity, or the environment improvement $CO_2$ concentration calculated by the environment improvement amount calculation unit 342.

Here, the temperature control apparatus 304 includes an apparatus, such as a heater, that can change the temperature in the air around the measured object 1. The temperature control apparatus 304 improves the temperature in the air around the measured object 1 according to the control from the server 109 (environment improvement control unit 351 of the server 109).

In addition, the humidity control apparatus 305 includes an apparatus that can change the humidity in the air around the measured object 1. The humidity control apparatus 305 improves the humidity in the air around the measured object 1 according to the control from the server 109 (environment improvement control unit 351 of the server 109).

In addition, the $CO_2$ concentration control apparatus 306 includes an apparatus that can change the carbon dioxide concentration in the air around the measured object 1. The $CO_2$ concentration control apparatus 306 improves the carbon dioxide concentration in the air around the measured object 1 according to the control from the server 109 (environment improvement control unit 351 of the server 109).

Note that the environment improvement functions illustrated here include the lighting apparatus 303 that improves the environment of the light, the temperature control apparatus 304 that improves the environment of the temperature, the humidity control apparatus 305 that improves the environment of the humidity, and the $CO_2$ concentration control apparatus 306 that improves the environment of the carbon dioxide concentration. However, other functions can be added as long as the functions can improve the environment that affects the calculation of the effective PPFD value.

For example, nutrients, such as nitrogen (N), potassium (K), and phosphoric acid (P), are also related to the rate of photosynthesis and can be added as environment improvement candidates. Furthermore, in the case where the nutrients are added to the environment improvement candidates, an apparatus that improves the environment of the nutrients can be provided to control the environment improvement from the server 109 (environment improvement control unit 351 of the server 109), for example.

However, although the apparatus, such as the temperature control apparatus 304 and the humidity control apparatus 305, automatically improves the environment in the illustrated configuration of the environment control system 31 of FIG. 29, the user may manually improve the environment. In that case, for example, the server 109 (display control unit 352 of the server 109) may display details of the environment improvement to notify the user of the details.

Note that in the environment control system 30 (FIG. 26), not all of the environment improvement functions, such as the lighting apparatus 303, the temperature control apparatus 304, the humidity control apparatus 305, and the $CO_2$ concentration control apparatus 306 illustrated in FIG. 29, need to be provided, as in the configuration in which only the lighting apparatus 303 that improves the environment of the light is provided as the environment improvement function. The types of environment improvement functions to be used are decided according to the operation.

Furthermore, in a case where the server 109 includes the display unit 324 or a case where the server 109 and the display unit 324 can communicate with each other in FIG. 29, various types of data, such as numeric data and image data, obtained by the signal processing of the calculation unit 331 can be displayed on the display unit 324. The various types of data, such as numeric data and image data, may also be stored in the storage 110. The server 109 can also read the various types of data stored in the storage 110 and display the data on the display unit 324.

The environment control system 31 is configured in this way.

(Flow of Real-Time Environment Control Process)

Next, a flow of a real-time environment control process executed by the environment control apparatus 301 of the environment control system 30 in FIG. 26 will be described with reference to a flow chart of FIG. 30.

In step S201, the environment improvement amount calculation unit 342 acquires the effective PPFD value calculated by the effective PPFD value calculation unit 341.

That is, the effective PPFD value calculation unit 341 executes the effective PPFD value calculation process (FIG. 10) to obtain the effective PPFD value according to the photosystem reaction maximum ETR obtained in the photosystem reaction maximum ETR calculation process (S102) and according to the carbon reduction reaction maximum ETR obtained in the carbon reduction reaction maximum ETR calculation process (S103). The environment improvement amount calculation unit 342 acquires the effective PPFD value obtained in this way.

In step S202, the environment improvement amount calculation unit 342 checks the bottleneck with respect to the effective PPFD value obtained in the process of step S201.

Here, the bottleneck is decided according to the comparison result of the photosystem reaction maximum ETR and the carbon reduction reaction maximum ETR. That is, in the case where the photosystem reaction maximum ETR is smaller than the carbon reduction reaction maximum ETR, the photosystem reaction limits the rate, and the photosystem reaction maximum ETR is the bottleneck. On the other hand, in the case where the carbon reduction reaction maximum ETR is smaller than the photosystem reaction maximum ETR, the carbon reduction reaction limits the rate, and the carbon reduction reaction maximum ETR is the bottleneck.

In step S203, the environment improvement amount calculation unit 342 executes an environment improvement amount calculation process on the basis of the check result of the bottleneck obtained in the process of step S202.

In the environment improvement amount calculation process, an environment improvement target is decided on the basis of the environment improvement candidates selected according to the check result of the bottleneck and on the basis of the environment improvement function prepared in the environment control system 30. An amount of environment improvement regarding the decided environment improvement target is then calculated in the environment improvement amount calculation process.

Note that details of the environment improvement amount calculation process will be described later with reference to a flow chart of FIG. 31.

The amount of environment improvement may also be decided according to the purpose, the time (allowed time), and the like of the user. For example, there may be a case in which the user performs the environment improvement within a predetermined period, such as three days and one week, and the amount of environment improvement may be able to be set according to the period.

Specifically, in the case where the measured object 1 is grass of a stadium, the period that allows improving the environment may vary depending on the intervals of the games of the team that uses the stadium, and the amount of environment improvement may be able to be set according to the period. Furthermore, in the case where the measured object 1 is a plant, the details of the environment improvement may vary, such as a case of promoting the growth of the leaves to change only the appearance and a case of strongly growing the root, and the environment improvement target and the amount of environment improvement may be able to be set according to the purpose.

Here, modes according to the purpose, the time, and the like can be prepared in the environment control system 30, and a setting screen (UI: User Interface) can be presented to the user to allow the user to select a desirable mode. As a result, the environment control system 30 performs the environment improvement control according to the mode manually set by the user. In addition, the user may be able to manually set the modes while viewing the results of simulation described later.

In step S204, the environment improvement control unit 351 performs the environment improvement control on the basis of the amount of environment improvement obtained in the process of step S203.

Here, for example, in the case where the light is selected as an environment improvement candidate, and the lighting apparatus 303 that improves the environment of the light is prepared as an environment improvement function, the light is decided as the environment improvement target. Therefore, the maximum amount of supplemental lighting is calculated as the amount of environment improvement (S203). Note that the lighting apparatus 303 is prepared in the environment control system 30 of FIG. 26.

The environment improvement control unit 351 then controls the lighting apparatus 303 through the hub 104 and the router 302 on the basis of the maximum amount of supplemental lighting obtained in the process of step S203 to apply light corresponding to the maximum amount of supplemental lighting to the measured object 1.

In step S205, the display control unit 352 displays, on the display unit 324, the data regarding the effective PPFD value obtained in the process of step S201.

That is, the process of steps S201 to S205 is repeated until it is determined to end the process in the determination process of step S206. Therefore, in the case where the process of steps S201 to S205 is repeated, the effective PPFD value obtained in the process of step S201 is the effective PPFD value obtained after the environment improvement control in the process of step S204.

Therefore, in addition to the effective PPFD value and the like illustrated in FIGS. 22 to 25, the effective PPFD value obtained by applying the environment improvement control (hereinafter, also referred to as environment improvement effective PPFD value) can be displayed in various display modes here as data regarding the effective PPFD value. Note that display examples of the environment improvement effective PPFD value and the like in the real-time environment control will be described later with reference to FIGS. 33 to 40.

In step S206, whether to end the process is determined. In a case where it is determined not to end the process in step S206, the process returns to step S201, and the process of steps S201 to S205 is repeated. In addition, in a case where it is determined to end the process in step S206, the real-time environment control process of FIG. 30 ends.

The flow of the real-time environment control process has been described.

Figure 30:
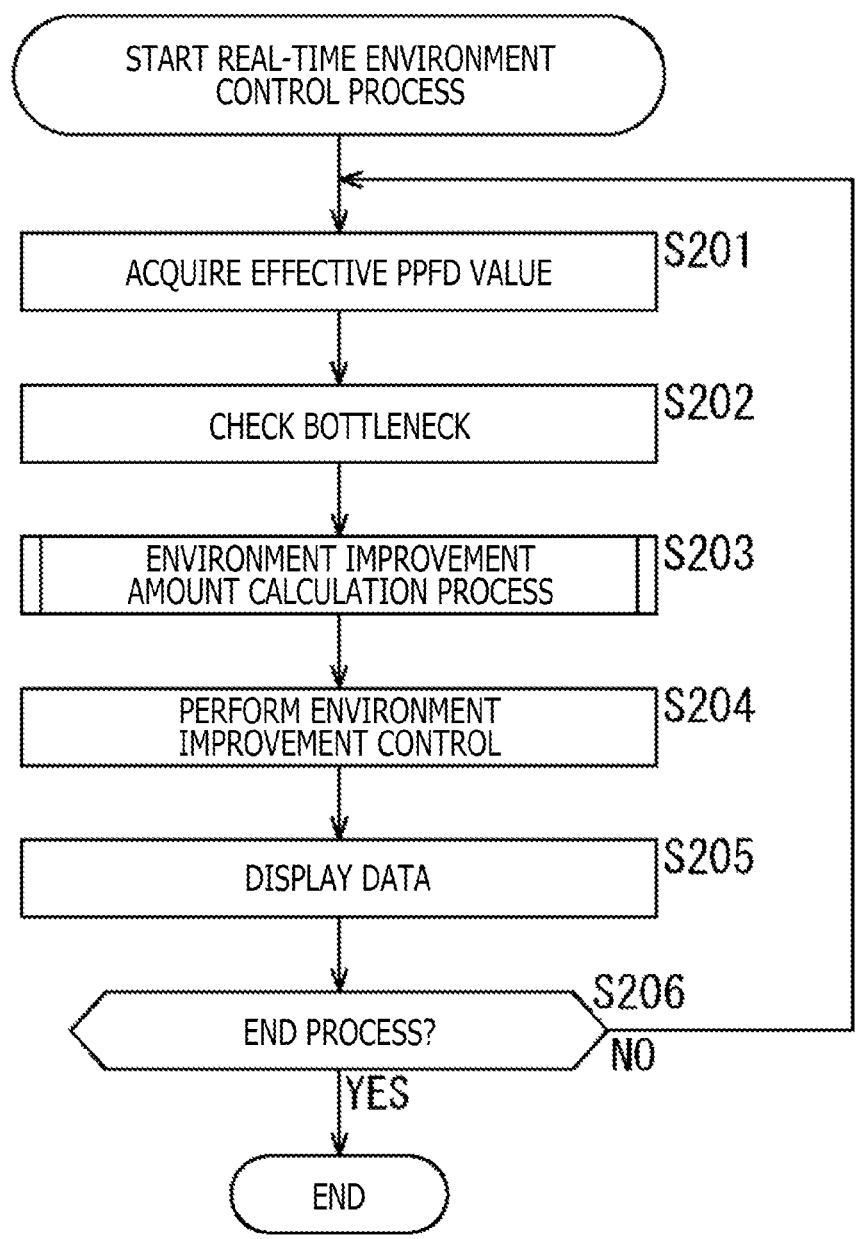
FIG. 30 is a flow chart describing a flow of a real-time environment control process.

Note that in the case where the configuration of the environment control system 31 (FIG. 29) as a cloud environment is adopted instead of the configuration of the environment control system 30 (FIG. 26) as a local environment, the server 109 (processing unit 322 of the server 109) executes the process of steps S201 to S206 of FIG. 30, for example.

(Flow of Environment Improvement Amount Calculation Process)

Next, details of the environment improvement amount calculation process corresponding to step S203 of FIG. 30 will be described with reference to a flow chart of FIG. 31.

In step S221, the magnitude relationship between the photosystem reaction maximum ETR and the carbon reduction reaction maximum ETR is determined on the basis of the check result of the bottleneck obtained in the process of step S202 of FIG. 30.

In a case where it is determined that the photosystem reaction maximum ETR is smaller than the carbon reduction reaction maximum ETR in step S221, the process proceeds to step S222.

In step S222, the photosynthetic rate is limited by the photosystem reaction, and the environment improvement amount calculation unit 342 selects the light as an environment improvement candidate.

In step S223, the environment improvement amount calculation unit 342 recognizes the light as an environment improvement function prepared in the environment control system 30. Here, the environment control system 30 has the configuration illustrated in FIG. 26 and includes the lighting apparatus 303 that improves the environment of the light.

In step S224, the light as an environment improvement candidate selected in the process of step S222 is included in the environment improvement function (light) recognized in the process of step S223, and the environment improvement amount calculation unit 342 decides the light as an environment improvement target.

In step S225, the environment improvement amount calculation unit 342 calculates the maximum amount of supplemental lighting as an amount of environment improvement of the environment improvement target that is the light according to the environment improvement target decided in the process of step S224. The maximum amount of supplemental lighting can be calculated by the following Equation (18).

$$\text{Maximum amount of supplemental lighting} = (\text{carbon reduction reaction maximum ETR} - \text{photosystem reaction maximum ETR}) / (\text{fAPAR} \times m \times \Phi\text{PSII}) \quad (18)$$

Here, m in Equation (18) represents a distribution ratio for PSII in the light applied to the plant and indicates a value of approximately 0.5.

That is, the maximum amount of supplemental lighting calculated in Equation (18) is a maximum value of the amount of light that can obtain the effect of the supplemental lighting in the supplemental lighting for the plant, and this indicates that application of light in a greater amount to the plant is meaningless. However, the lighting apparatus 303 may not only apply the light according to the maximum amount of supplemental lighting, but may also apply light in an amount exceeding the maximum amount of supplemental lighting.

Therefore, in the process of step S204 of FIG. 30, the environment improvement control unit 351 can control the lighting apparatus 303 based on the maximum amount of supplemental lighting to apply the light to the plant according to the maximum amount of supplemental lighting or to apply the light to the plant in an amount exceeding the maximum amount of supplemental lighting.

In this way, in the case where it is determined that the photosystem reaction maximum ETR is smaller than the carbon reduction reaction maximum ETR (carbon reduction reaction maximum ETR−photosystem reaction maximum ETR>0), the photosystem reaction maximum ETR is the bottleneck, and the current photosynthetic rate is limited by the photosystem reaction. Therefore, the lighting apparatus 303 can perform the supplemental lighting to improve the environment. The light is decided as the environment improvement target, and the maximum amount of supplemental lighting is calculated as the amount of environment improvement.

On the other hand, in the case where it is determined that the photosystem reaction maximum ETR is greater than the carbon reduction reaction maximum ETR in step S221, the process proceeds to step S226.

In step S226, the photosynthetic rate is limited by the carbon reduction reaction, and the environment improvement amount calculation unit 342 selects the temperature, the humidity, and the carbon dioxide concentration ($CO_2$ concentration) as environment improvement candidates. Note that for example, nutrients and the like for the plant may also be added as environment improvement candidates as described above.

In step S227, the environment improvement amount calculation unit 342 recognizes the light as an environment improvement function prepared in the environment control system 30. Here, the environment control system 30 has the configuration illustrated in FIG. 26 and includes the lighting apparatus 303.

In step S228, none of the temperature, the humidity, and the carbon dioxide concentration as the environment improvement candidates selected in the process of step S226 is included in the environment improvement function (light) recognized in the process of step S227, and the environment improvement amount calculation unit 342 decides that the environment improvement target is "none." In this case, there is no environment improvement target, and the environment improvement control is not performed. Therefore, the calculation process of the amount of environment improvement is not necessary (nothing is performed, and the process ends).

In this way, in the case where it is determined that the photosystem reaction maximum ETR is greater than the carbon reduction reaction maximum ETR (carbon reduction reaction maximum ETR−photosystem reaction maximum ETR≤0), the carbon reduction reaction maximum ETR is the bottleneck, and the current photosynthetic rate is limited by the carbon reduction reaction. Therefore, the temperature, the humidity, or the carbon dioxide concentration as the environment improvement candidate can be improved to improve the environment. However, the environment control system 30 (FIG. 26) does not have the environment improvement function, and the environment improvement candidates that are the temperature, the humidity, and the carbon dioxide concentration are cancelled.

Figure 31:
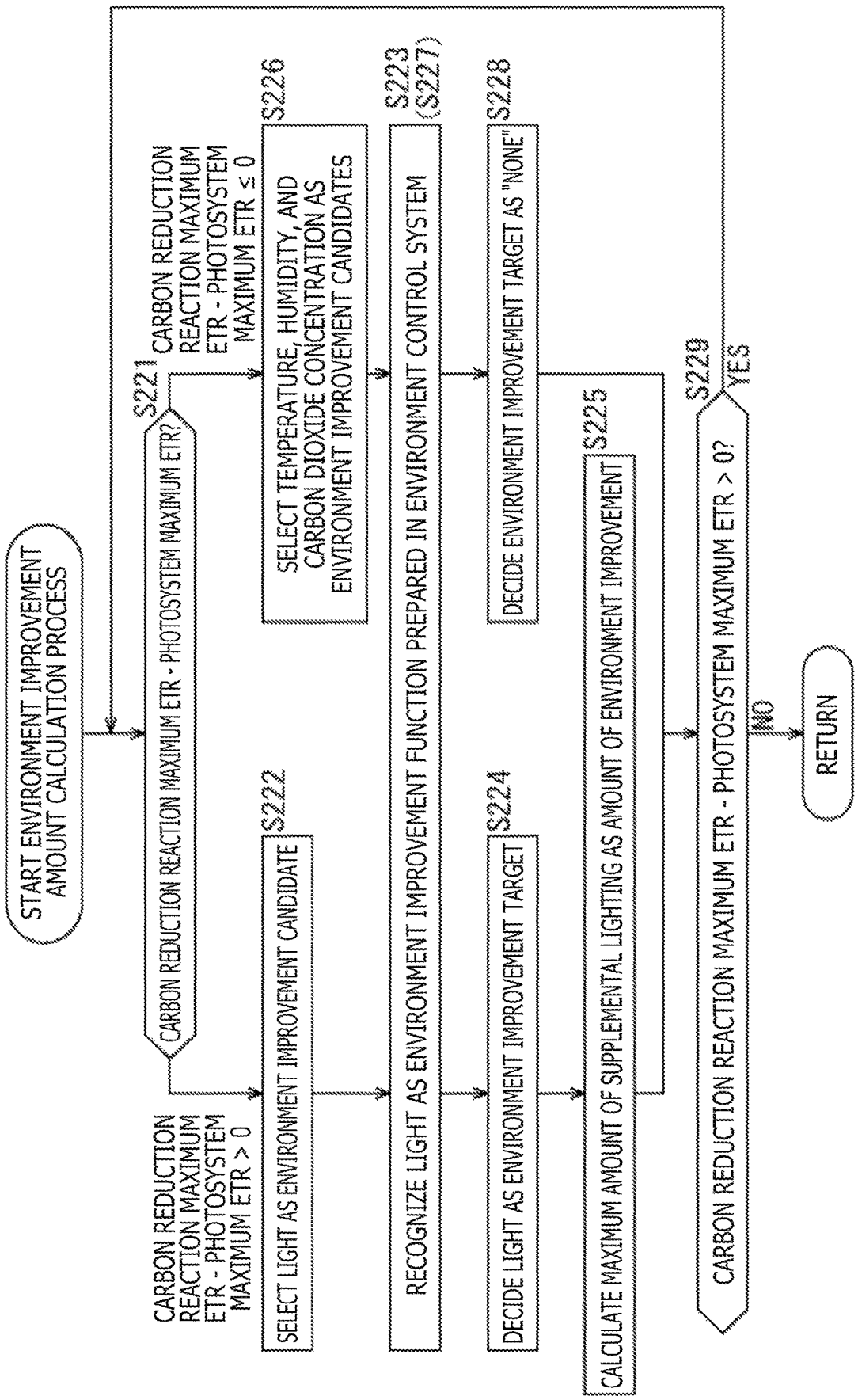
FIG. 31 is a flow chart describing a flow of an environment improvement amount calculation process.

Note that in the example of the process of FIG. 31, the environment control system 30 has the configuration illustrated in FIG. 26 and includes only the lighting apparatus 303 as a target of the control of the environment improvement. Therefore, it is decided that the environment improvement target is "none." Here, if the configuration of the environment control system 31 illustrated in FIG. 29 is the target, the temperature control apparatus 304, the humidity control apparatus 305, and the $CO_2$ concentration control apparatus 306 are included as environment improvement functions in addition to the lighting apparatus 303. Therefore, the temperature, the humidity, or the carbon dioxide concentration is decided as the environment improvement target, and the amount of environment improvement is calculated.

When the process of step S225 or S228 is finished, the process proceeds to step S229.

In step S229, the difference between the carbon reduction reaction maximum ETR and the photosystem reaction maximum ETR is computed, and the magnitude relationship between the photosystem reaction maximum ETR and the carbon reduction reaction maximum ETR is determined according to the computation result.

In a case where it is determined that the photosystem reaction maximum ETR is smaller than the carbon reduction reaction maximum ETR in step S229, the process returns to step S221, and the process is repeated. That is, the photosystem reaction maximum ETR is the bottleneck in this case. The current photosynthetic rate is limited by the photosystem reaction, and there is a room for improving the environment of the light. Therefore, the light is decided as the environment improvement target again, and the maximum amount of supplemental lighting is calculated as the amount of environment improvement.

On the other hand, in a case where it is determined that the photosystem reaction maximum ETR is greater than the carbon reduction reaction maximum ETR in step S229, the environment improvement amount calculation process of FIG. 31 is finished. When the environment improvement amount calculation process of FIG. 31 is finished, the process returns to step S203 of FIG. 30, and the subsequent process is executed.

The flow of the environment improvement amount calculation process has been described.

Note that in the case described in the environment improvement amount calculation process of FIG. 31, the light is set as the environment improvement target to perform the environment improvement control when the current photosynthetic rate is limited by the photosystem reaction in the case where only the environment improvement of the light is possible. However, the temperature or the humidity can be set as the environment improvement target to perform the environment improvement control when the current photosynthetic rate is limited by the carbon reduction reaction in the case where the environment improvement of the temperature or the humidity is possible.

That is, at least one of the environment improvement control based on the environment improvement target corresponding to the photosystem reaction or the environment improvement control based on the environment improvement target corresponding to the carbon reduction reaction can be performed as the environment improvement control of the present technique. Then, for example, if one of the environments is improved by performing one of the environment improvement controls, and the other environment needs to be improved due to the improvement, the other environment improvement control can be further performed.

For example, there may be a situation in which the temperature is improved by the environment improvement control based on the environment improvement target (temperature) corresponding to the carbon reduction reaction, and the light needs to be improved due to the improvement. In that case, the environment improvement control based on the environment improvement target (light) corresponding to the photosystem reaction can be performed. That is, both of the environment improvement control based on the environment improvement target (temperature) corresponding to the carbon reduction reaction and the environment improvement control based on the environment improvement target (light) corresponding to the photosystem reaction can be performed to adjust (balance) the environment.

Next, display examples of the data displayed in the process of step S205 of FIG. 30 will be described with reference to FIGS. 32 to 40.

The inventor of the present technique has conducted a simulation (hereinafter, referred to as second simulation) in predetermined environments to check the changes in the effective PPFD value (environment improvement effective PPFD value) after performing the environment improvement of the light for the measured object 1, such as a plant in a field, in an actual day.

Figure 32:
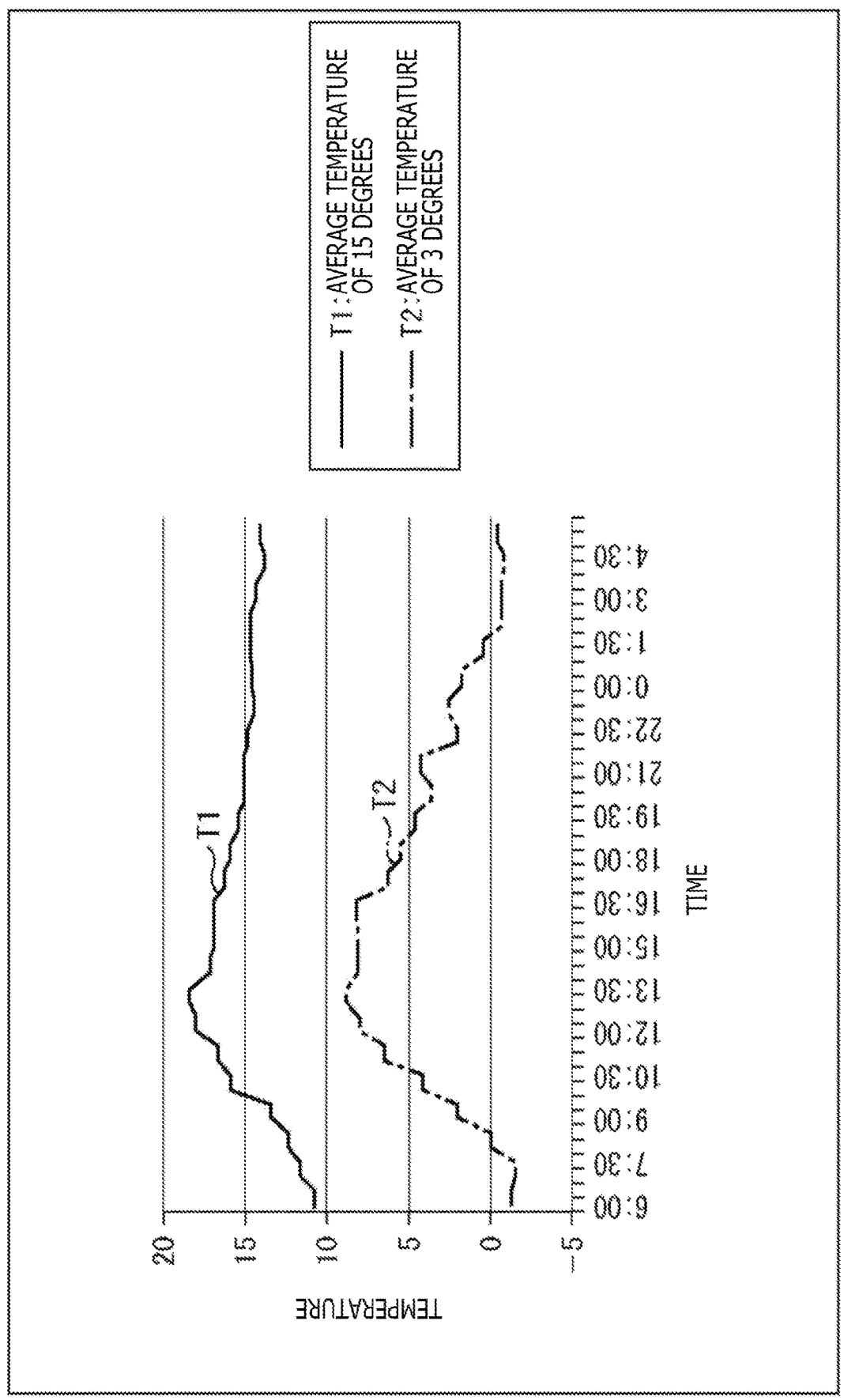
FIG. 32 is a diagram illustrating an example of a change in temperature of one day.

Here, FIG. 32 illustrates an example of a change in temperature of one day as environment data of the second simulation. In FIG. 32, the horizontal axis indicates time, and the scale is marked every 30 minutes for 24 hours from 6:00 in the morning of a day to 6:00 of the next day. The vertical axis indicates the temperature, and one line T1 represents a change in temperature in a case where the average temperature of one day is 15 degrees. In addition, another line T2 represents a change in temperature in a case where the average temperature of one day is 3 degrees.

In the second simulation, changes in the PPFD value, the effective PPFD value, the environment improvement effective PPFD value, and the like are simulated in environments in the sun and in the shade at the average temperatures of 15 degrees and 3 degrees. That is, the simulation is performed in the following environments of (a) to (d) as in FIGS. 22 to 25 described above.

(a) Environment A: in the sun, average temperature of one day is 15 degrees
(b) Environment B: in the shade, average temperature of one day is 15 degrees
(c) Environment C: in the sun, average temperature of one day is 3 degrees
(d) Environment D: in the shade, average temperature of one day is 3 degrees Hereinafter, data obtained as a result of the simulation in the environments A to D will be illustrated. Note that the measured object 1 here is a plant.

Furthermore, in the second simulation, the environment control system 30 (FIG. 26) includes only the lighting apparatus 303 as an environment improvement function. The photosystem reaction maximum ETR is the bottleneck, and the lighting apparatus 303 performs the supplemental lighting to improve the environment.

Therefore, the environment improvement effective PPFD value obtained in the second simulation is an effective PPFD value (hereinafter, referred to as maximum supplemental lighting effective PPFD value) obtained by the supplemental lighting performed by the lighting apparatus 303 according to the maximum amount of supplemental lighting.

(1-1) Display Example of Environment A (in the Sun, Average Temperature of 15 Degrees)

Figure 33:
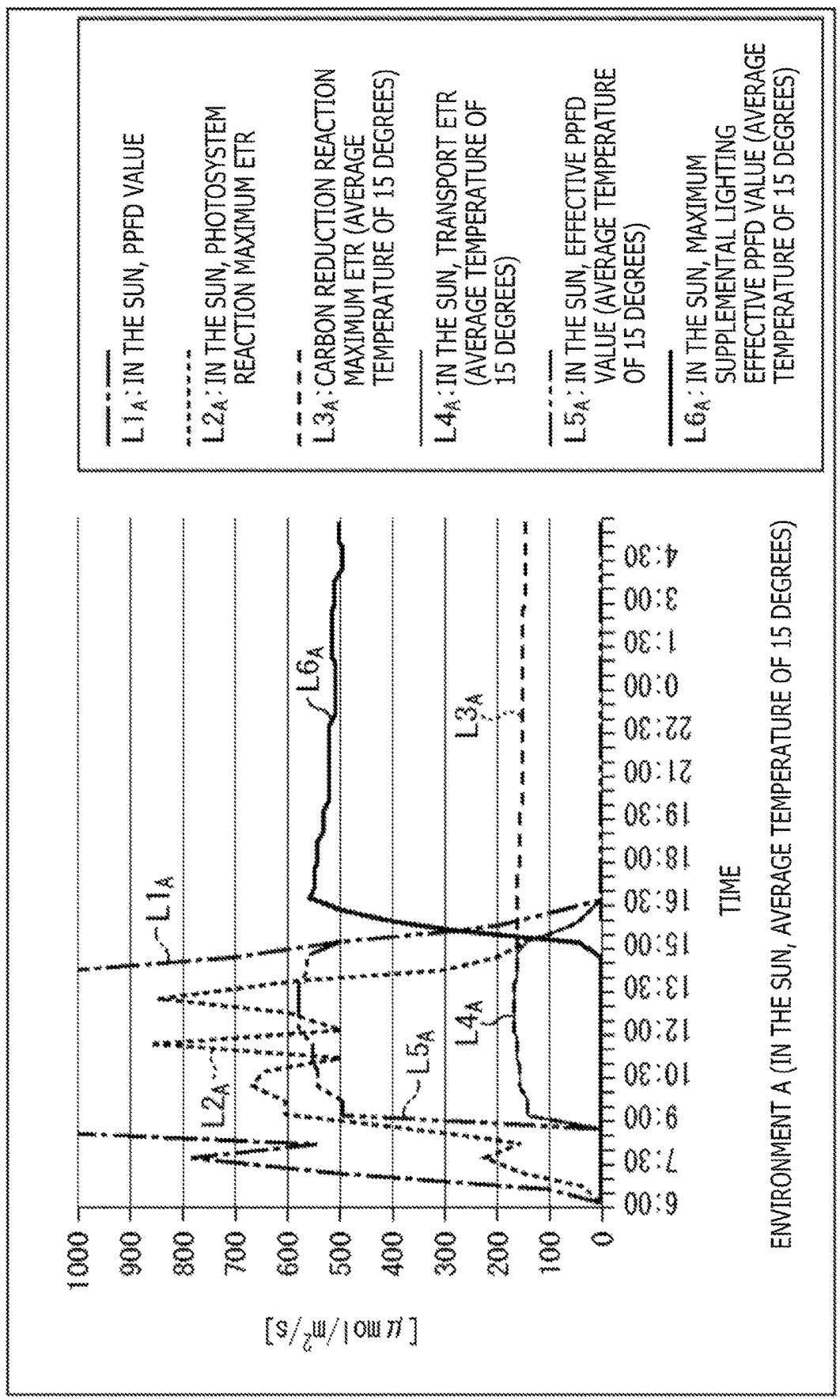
FIG. 33 is a diagram illustrating a display example of a maximum supplemental lighting effective PPFD value (average temperature of 15 degrees) in the environment A.

FIG. 33 is a diagram illustrating a display example of the maximum supplemental lighting effective PPFD value (average temperature of 15 degrees) in the environment A.

In FIG. 33, the horizontal axis indicates time, and the scale is marked every 30 minutes for 24 hours from 6:00 in the morning of a day to 6:00 of the next day as in FIG. 22. The vertical axis indicates values of data obtained as a result of the simulation in the environment A indicated by different types of lines L1 to L6, and the unit of the values is umol/m$^2$/s. Note that the relationship between the axes is also similar in FIGS. 34 to 36 and FIGS. 45 to 48 described later.

In the environment A, the plant is in the sun, and the average temperature of one day around the plant is 15 degrees. As a result of the simulation in the environment, lines $L1_A$ to $L5_A$ indicate "in the sun, PPFD value," "in the sun, photosystem reaction maximum ETR," "carbon reduction reaction maximum ETR (average temperature of 15 degrees)," "in the sun, transport ETR (average temperature of 15 degrees)," and "in the sun, effective PPFD value (average temperature of 15 degrees)" as in the lines $L1_A$ to $L5_A$ illustrated in FIG. 22.

That is, although the unit of the scale of the vertical axis in FIG. 33 is different from that of FIG. 22, the shapes of the lines $L1_A$ to $L5_A$ are similar. Furthermore, in addition to the lines $L1_A$ to $L5_A$, a line $L6_A$ is added in FIG. 33.

In FIG. 33, the line $L6_A$ indicates a change in the environment improvement effective PPFD value obtained by the supplemental lighting performed by the lighting apparatus 303 according to the maximum amount of supplemental lighting in the sun in the environment A (in the sun, maximum supplemental lighting effective PPFD value (average temperature of 15 degrees)).

Here, focusing on "in the sun, effective PPFD value" indicated by the line $L5_A$ and "in the sun, maximum supplemental lighting effective PPFD value" indicated by the line $L6_A$ in FIG. 33, "in the sun, effective PPFD value" becomes zero after the sunset after 16 o'clock. However, the supplemental lighting can be performed according to the maximum amount of supplemental lighting to obtain "in the sun, maximum supplemental lighting effective PPFD value" equivalent to "in the sun, effective PPFD value" even after the sunset. On the other hand, "in the sun, maximum supplemental lighting effective PPFD value" is zero from the sunrise to around the sunset even when the supplemental lighting is performed according to the maximum amount of supplemental lighting.

(1-2) Display Example of Environment B (in the Shade, Average Temperature of 15 Degrees)

Figure 34:
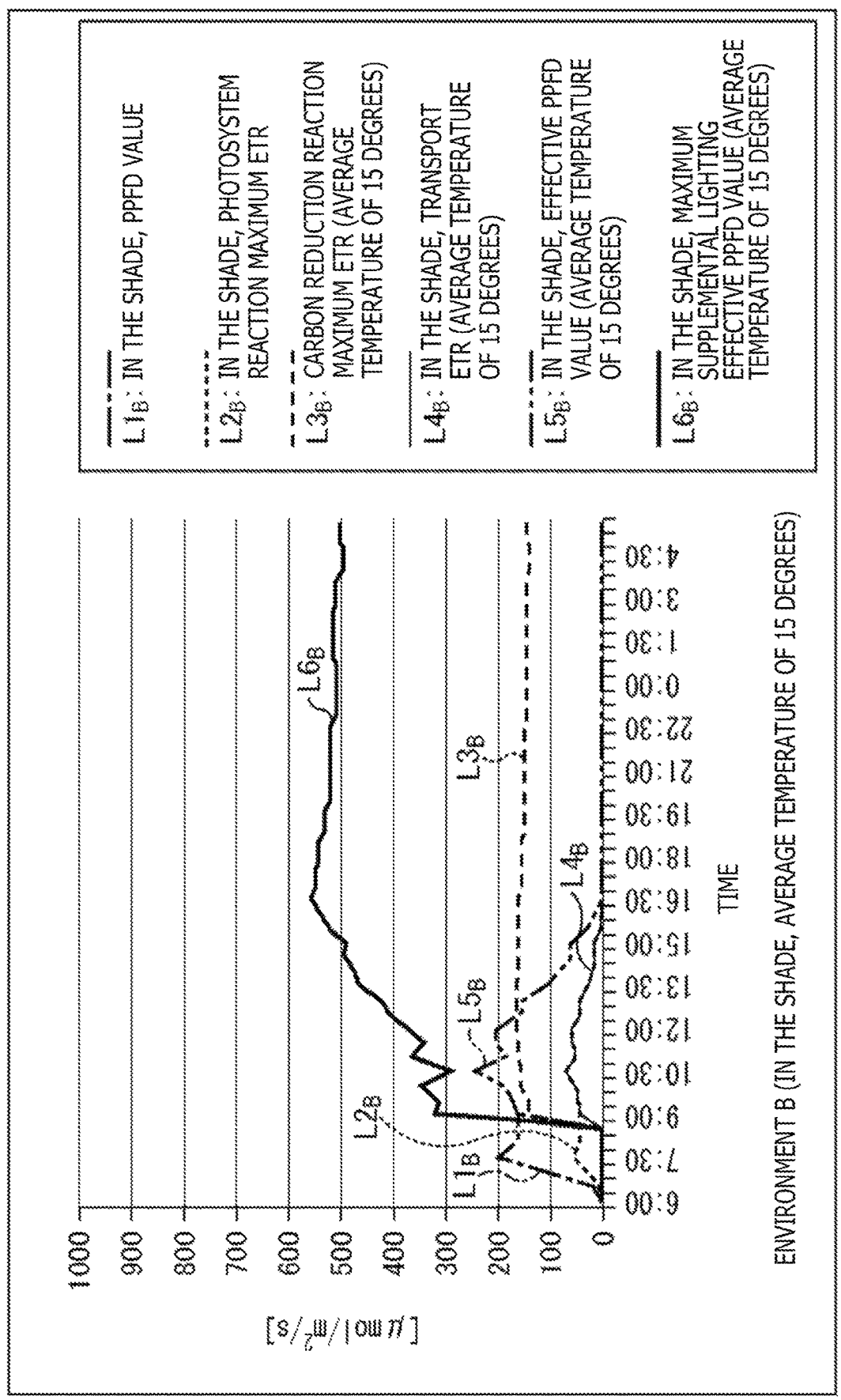
FIG. 34 is a diagram illustrating a display example of the maximum supplemental lighting effective PPFD value (average temperature of 15 degrees) in the environment B.

FIG. 34 is a diagram illustrating a display example of "maximum supplemental lighting effective PPFD value (average temperature of 15 degrees)" in the environment B.

In the environment B, the plant is in the shade, and the average temperature of one day around the plant is 15 degrees. As a result of the simulation in the environment, lines $L1_B$ to $L5_B$ indicate "in the shade, PPFD value," "in the shade, photosystem reaction maximum ETR," "carbon reduction reaction maximum ETR (average temperature of 15 degrees)," "in the shade, transport ETR (average temperature of 15 degrees)," and "in the shade, effective PPFD value (average temperature of 15 degrees)" as in the lines $L1_B$ to $L5_B$ illustrated in FIG. 23.

That is, although the unit of the scale of the vertical axis in FIG. 34 is different from that of FIG. 23, the shapes of the lines $L1_B$ to $L5_B$ are similar. Furthermore, in addition to the lines $L1_B$ to $L5_B$, a line $L6_B$ is added in FIG. 34.

In FIG. 34, the line $L6_B$ indicates a change in the environment improvement effective PPFD value obtained by the supplemental lighting performed by the lighting apparatus 303 according to the maximum amount of supplemental lighting in the shade in the environment B (in the shade, maximum supplemental lighting effective PPFD value (average temperature of 15 degrees)).

Here, focusing on "in the shade, effective PPFD value" indicated by the line $L5_B$ and "in the shade, maximum supplemental lighting effective PPFD value" indicated by the line $L6_B$ in FIG. 34, "in the shade, effective PPFD value" becomes zero after the sunset after 16 o'clock. On the other hand, the supplemental lighting can be performed according to the maximum amount of supplemental lighting to obtain "in the shade, maximum supplemental lighting effective PPFD value" always greater than "in the shade, effective PPFD value" regardless of whether the time is before or after the sunset.

(1-3) Display Example of Environment C (in the Sun, Average Temperature of 3 Degrees)

Figure 35:
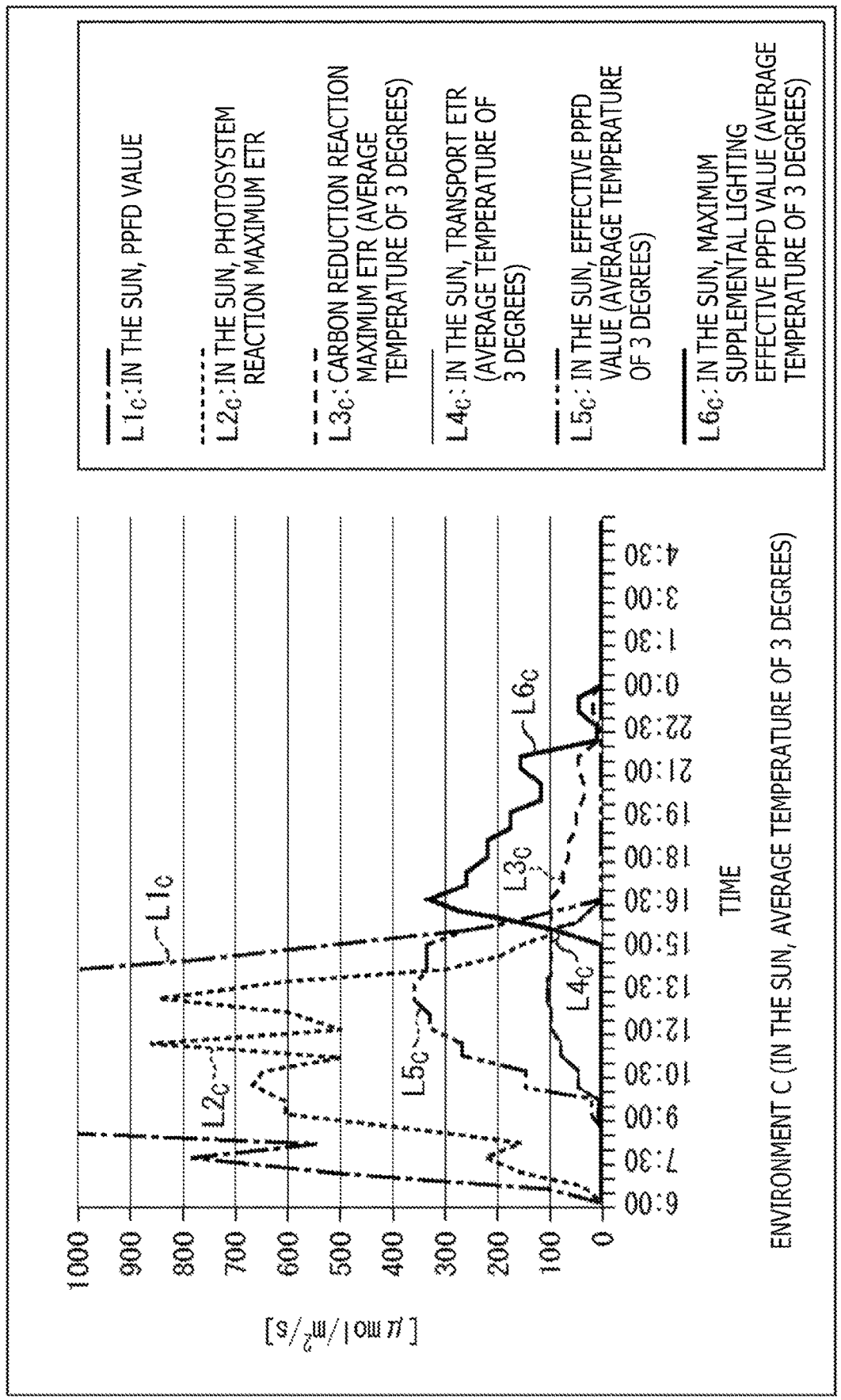
FIG. 35 is a diagram illustrating a display example of the maximum supplemental lighting effective PPFD value (average temperature of 3 degrees) in the environment C.

FIG. 35 is a diagram illustrating a display example of the maximum supplemental lighting effective PPFD value (average temperature of 15 degrees) in the environment C.

In the environment C, the plant is in the sun, and the average temperature of one day around the plant is 3 degrees. As a result of the simulation in the environment, lines $L1_C$ to $L5_0$ indicate "in the sun, PPFD value," "in the sun, photosystem reaction maximum ETR," "carbon reduction reaction maximum ETR (average temperature of 3 degrees)," "in the sun, transport ETR (average temperature of 3 degrees)," and "in the sun, effective PPFD value (average temperature of 3 degrees)" as in the lines $L1_C$ to $L5_C$ illustrated in FIG. 24.

That is, although the unit of the scale of the vertical axis in FIG. 35 is different from that of FIG. 24, the shapes of the lines $L1_C$ to $L5_C$ are similar. Furthermore, in addition to the lines $L1_C$ to $L5_C$, a line $L6_C$ is added in FIG. 35.

In FIG. 35, the line $L6_C$ indicates a change in the environment improvement effective PPFD value obtained by the supplemental lighting performed by the lighting apparatus 303 according to the maximum amount of supplemental lighting in the sun in the environment C (in the sun, maximum supplemental lighting effective PPFD value (average temperature of 3 degrees)).

Here, focusing on "in the sun, effective PPFD value" indicated by the line $L5_C$ and "in the sun, maximum supplemental lighting effective PPFD value" indicated by the line $L6_C$ in FIG. 35, "in the sun, effective PPFD value" becomes zero after the sunset after 16 o'clock. However, the supplemental lighting can be performed according to the maximum amount of supplemental lighting to obtain "in the sun, maximum supplemental lighting effective PPFD value" close to "in the sun, effective PPFD value" even after the sunset. On the other hand, "in the sun, maximum supplemental lighting effective PPFD value" is zero from the sunrise to around the sunset even when the supplemental lighting is performed according to the maximum amount of supplemental lighting.

(1-4) Display Example of Environment D (in the Shade, Average Temperature of 3 Degrees)

Figure 36:
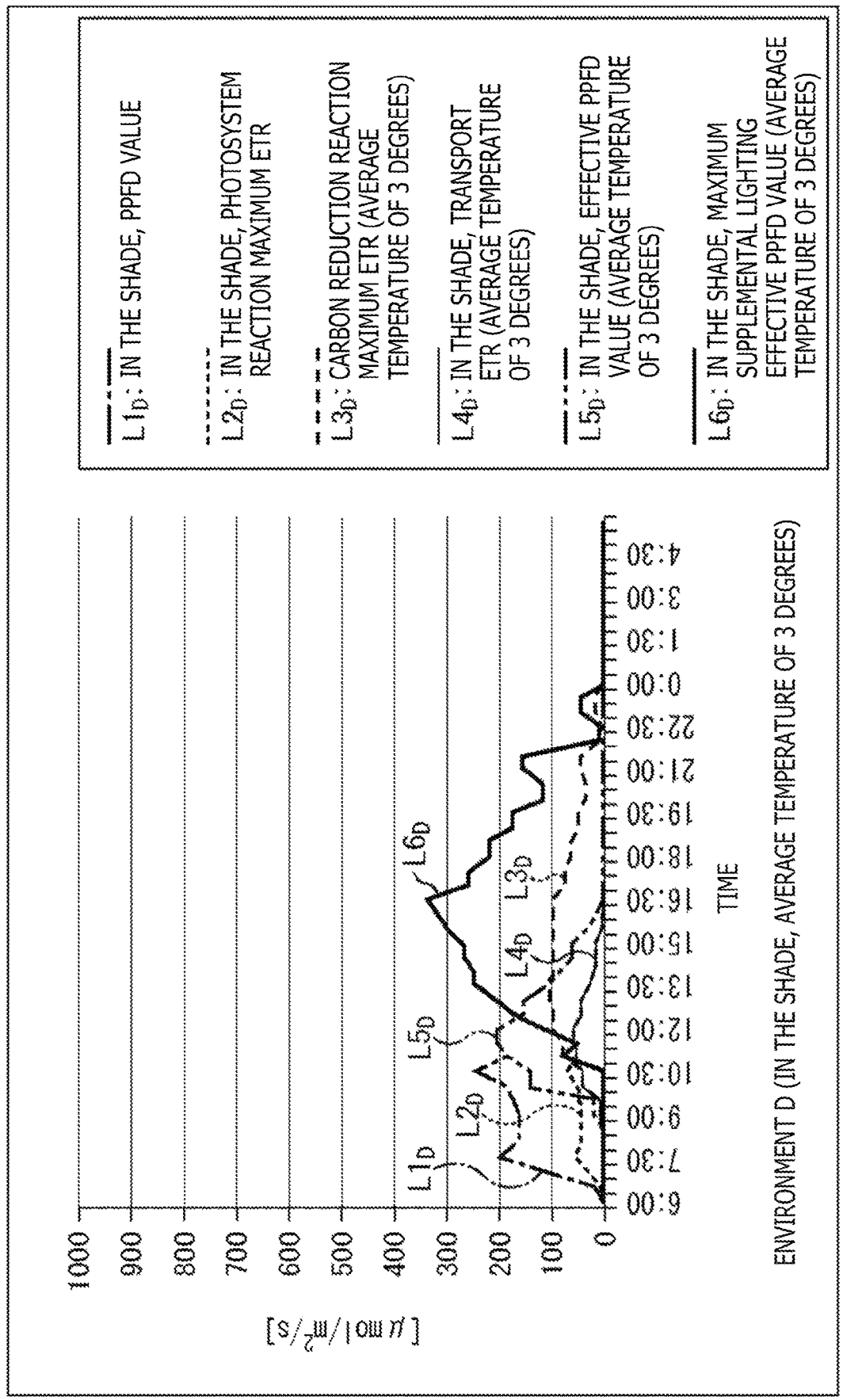
FIG. 36 is a diagram illustrating a display example of the maximum supplemental lighting effective PPFD value (average temperature of 3 degrees) in the environment D.

FIG. 36 is a diagram illustrating a display example of "maximum supplemental lighting effective PPFD value (average temperature of 15 degrees)" in the environment D.

In the environment D, the plant is in the shade, and the average temperature of one day around the plant is 3 degrees. As a result of the simulation in the environment, lines $L1_D$ to $L5_D$ indicate "in the shade, PPFD value," "in the shade, photosystem reaction maximum ETR," "carbon reduction reaction maximum ETR (average temperature of 3 degrees)," "in the shade, transport ETR (average temperature of 3 degrees)," and "in the shade, effective PPFD value (average temperature of 3 degrees)" as in the lines $L1_D$ to $L5_D$ illustrated in FIG. 25.

That is, although the unit of the scale of the vertical axis in FIG. 36 is different from that of FIG. 25, the shapes of the lines $L1_D$ to $L5_D$ are similar. Furthermore, in addition to the lines $L1_D$ to $L5_D$, a line $L6_D$ is added in FIG. 36.

In FIG. 36, the line $L6_D$ indicates a change in the environment improvement effective PPFD value obtained by the supplemental lighting performed by the lighting apparatus 303 according to the maximum amount of supplemental lighting in the shade in the environment D (in the shade, maximum supplemental lighting effective PPFD value (average temperature of 3 degrees)).

Here, focusing on "in the shade, effective PPFD value" indicated by the line $L5_D$ and "in the shade, maximum supplemental lighting effective PPFD value" indicated by the line $L6_D$ in FIG. 36, "in the shade, effective PPFD value" becomes zero after the sunset after 16 o'clock. On the other hand, the supplemental lighting can be performed according to the maximum amount of supplemental lighting to obtain "in the shade, maximum supplemental lighting effective PPFD value" regardless of whether the time is before or after the sunset.

(Comparison of Second Simulation Results)

Here, the following is comparison of the second simulation results illustrated in FIGS. 33 to 36.

That is, although the average temperature is 15 degrees in both of the environment A in FIG. 33 and the environment B in FIG. 34, "maximum supplemental lighting effective PPFD value (average temperature of 15 degrees)" is greater than "effective PPFD value (average temperature of 15 degrees)" in the shade as compared to in the sun. Therefore, the effect of the supplemental lighting performed by the lighting apparatus 303 according to the maximum amount of supplemental lighting is large.

In addition, although the average temperature is 3 degrees in both of the environment C in FIG. 35 and the environment D in FIG. 36, "maximum supplemental lighting effective PPFD value (average temperature of 3 degrees)" is greater than "effective PPFD value (average temperature of 3 degrees)" in the shade as compared to in the sun. Therefore, the effect of the supplemental lighting performed by the lighting apparatus 303 according to the maximum amount of supplemental lighting is large.

On the other hand, although the environment is in the sun in both of the environment A in FIG. 33 and the environment C in FIG. 35, "in the sun, maximum supplemental lighting effective PPFD value" at the average temperature of 15 degrees is greater than that at the average temperature of 3 degrees. The effect of the supplemental lighting performed by the lighting apparatus 303 according to the maximum amount of supplemental lighting is larger at a higher average temperature even in the same environment in the sun.

In addition, although the environment is in the shade in both of the environment B in FIG. 34 and the environment D in FIG. 36, "in the shade, maximum supplemental lighting effective PPFD value" at the average temperature of 15 degrees is greater than that at the average temperature of 3 degrees. The effect of the supplemental lighting performed by the lighting apparatus 303 according to the maximum amount of supplemental lighting is larger at a higher average temperature even in the same environment in the shade.

Next, integrated values in one day of the PPFD values, the effective PPFD values, and the effective PPFD values+ maximum supplemental lighting will be compared for each simulation in the environments A to D with reference to FIGS. 37 to 40.

(1-5) Display Example of Integrated Values in One Day in Environment A (in the Sun, Average Temperature of 15 Degrees)

Figure 37:
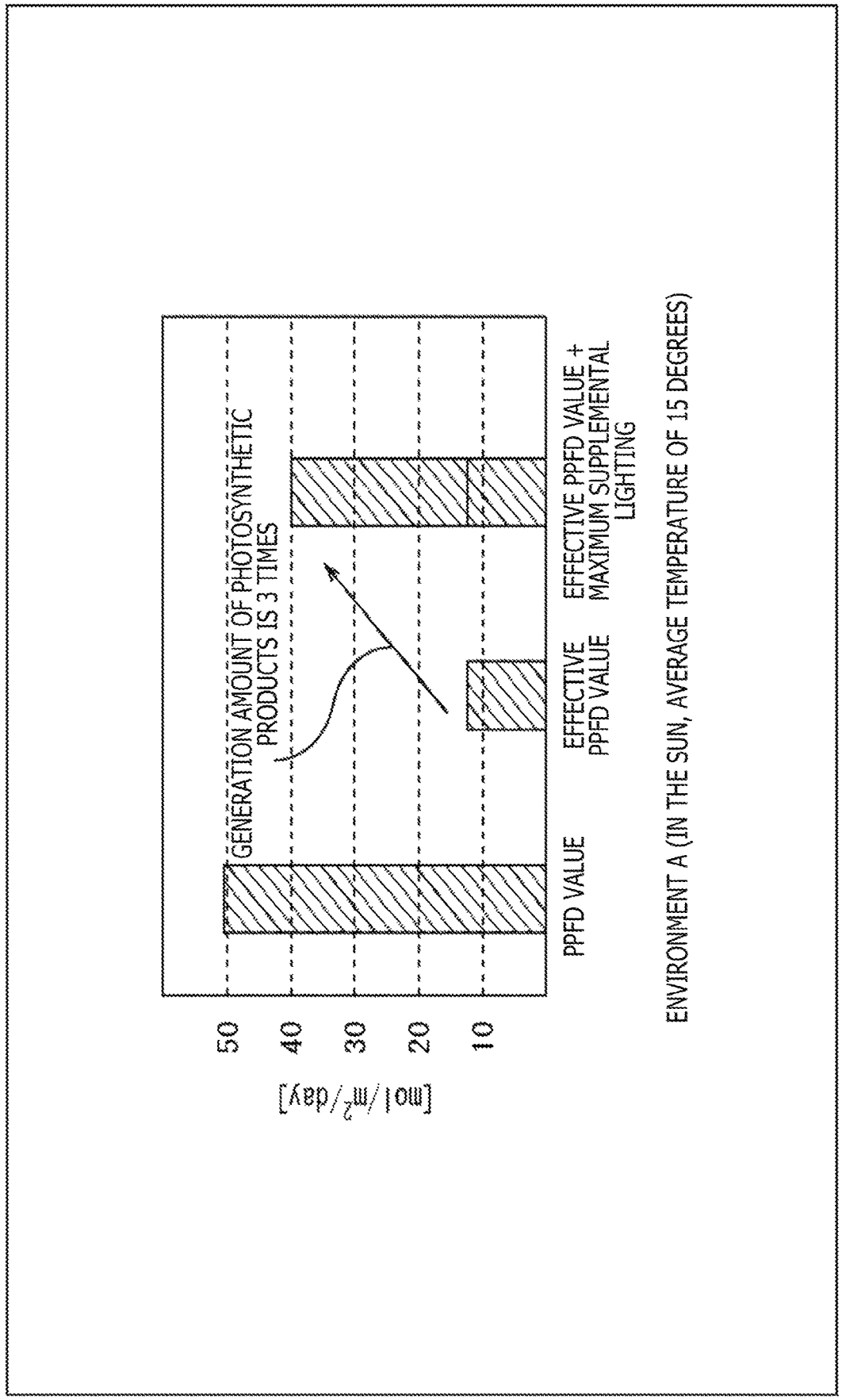
FIG. 37 is a diagram illustrating a display example of integrated values in one day of the PPFD values in the environment A.

FIG. 37 is a diagram illustrating a display example of integrated values in one day of the PPFD values in the environment A.

Here, the effective PPFD value is a PPFD value contributed to the growth of the plant in the PPFD value, and the maximum supplemental lighting effective PPFD value is an effective PPFD value obtained by the supplemental lighting performed by the lighting apparatus 303 according to the maximum amount of supplemental lighting. Here, the sum of these two values will be defined as "effective PPFD value+maximum supplemental lighting."

FIG. 37 illustrates a bar graph of the integrated values in one day of the PPFD values, the effective PPFD values, and the effective PPFD values+maximum supplemental lighting obtained in the simulation of the environment A. Therefore, the unit of the vertical axis in FIG. 37 is $mol/m^2/day$. Note that the relationship is also similar in FIGS. 38 to 40 and FIGS. 49 to 52 described later.

As described above, the PPFD value is decided according to the light of the sun applied to the plant. Therefore, the environment A is in the sun, and the integrated value in one day of the PPFD values is approximately 50 ($mol/m^2/day$). The integrated value is greater than in the environment in the shade, such as the environment B and the environment D.

On the other hand, the effective PPFD value is a PPFD value contributed to the growth of the plant in the PPFD value, and the integrated value of the effective PPFD values is smaller than the integrated value of the PPFD values. In addition, the effective PPFD value+maximum supplemental lighting is a sum of the effective PPFD value and the effective PPFD value obtained by the supplemental lighting performed by the lighting apparatus 303 according to the maximum amount of supplemental lighting. Therefore, the integrated value of the effective PPFD values+maximum supplemental lighting is greater than the integrated value of the effective PPFD values.

Here, comparing the integrated value in one day of the effective PPFD values and the integrated value in one day of the effective PPFD values+maximum supplemental lighting obtained in the simulation of the environment A, the integrated value of the effective PPFD values is approximately 13.4 ($mol/m^2/day$), and the integrated value of the effective PPFD values+maximum supplemental lighting is approximately 40.2 ($mol/m^2/day$). Therefore, the integrated value of the effective PPFD values+maximum supplemental lighting is approximately 3 times the integrated value of the effective PPFD values in the environment A.

That is, in the case where the supplemental lighting is performed according to the maximum amount of supplemental lighting, the generated amount of photosynthetic products, such as sugar of plant, is approximately 3 times according to the difference between the integrated value of the effective PPFD values and the integrated value of the effective PPFD values+maximum supplemental lighting. It can be understood that the amount of growth of the plant is significantly increased by performing the environment improvement control.

(1-6) Display Example of Integrated Values in One Day in Environment B (in the Shade, Average Temperature of 15 Degrees)

Figure 38:
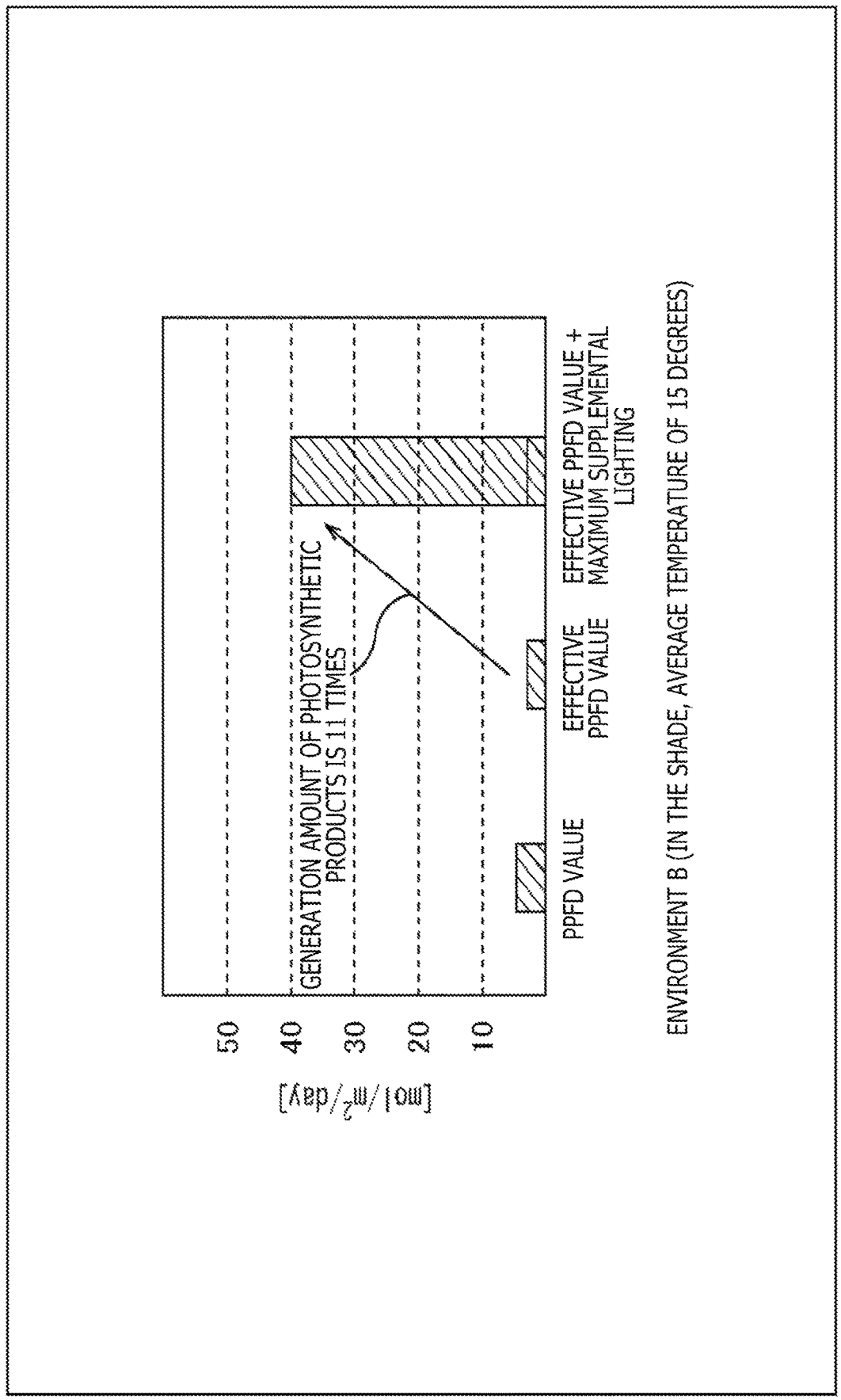
FIG. 38 is a diagram illustrating a display example of the integrated values in one day of the PPFD values in the environment B.

FIG. 38 is a diagram illustrating a display example of integrated values in one day of the PPFD values in the environment B.

In FIG. 38, comparing the integrated value in one day of the effective PPFD values and the integrated value in one day of the effective PPFD values+maximum supplemental lighting obtained in the simulation of the environment B, the integrated value of the effective PPFD values is approximately 3.7 ($mol/m^2/day$), and the integrated value of the effective PPFD values+maximum supplemental lighting is approximately 40.7 ($mol/m^2/day$). Therefore, the integrated value of the effective PPFD values+maximum supplemental lighting is approximately 11 times the integrated value of the effective PPFD values in the environment B.

That is, in the case where the supplemental lighting is performed according to the maximum amount of supplemental lighting, the generated amount of photosynthetic products, such as sugar of plant, is approximately 11 times according to the difference between the integrated value of the effective PPFD values and the integrated value of the effective PPFD values+maximum supplemental lighting. It can be understood that the amount of growth of the plant is considerably increased by performing the environment improvement control.

In addition, comparing the integrated values of the PPFD values in the environment B of FIG. 38 and the integrated values of the PPFD values in the environment A of FIG. 37, the average temperature of 15 degrees is the same in the environment B and the environment A, but the environment in the shade and the environment in the sun are different. Therefore, it can be understood that the increase in the amount of growth of the plant in the environment B of FIG. 38 (in the shade, generated amount of photosynthetic products is 11 times) is greater than that of the environment A in FIG. 37 (in the sun, generated amount of photosynthetic products is 3 times).

(1-7) Display Example of Integrated Values in One Day in Environment C (in the Sun, Average Temperature of 3 Degrees)

Figure 39:
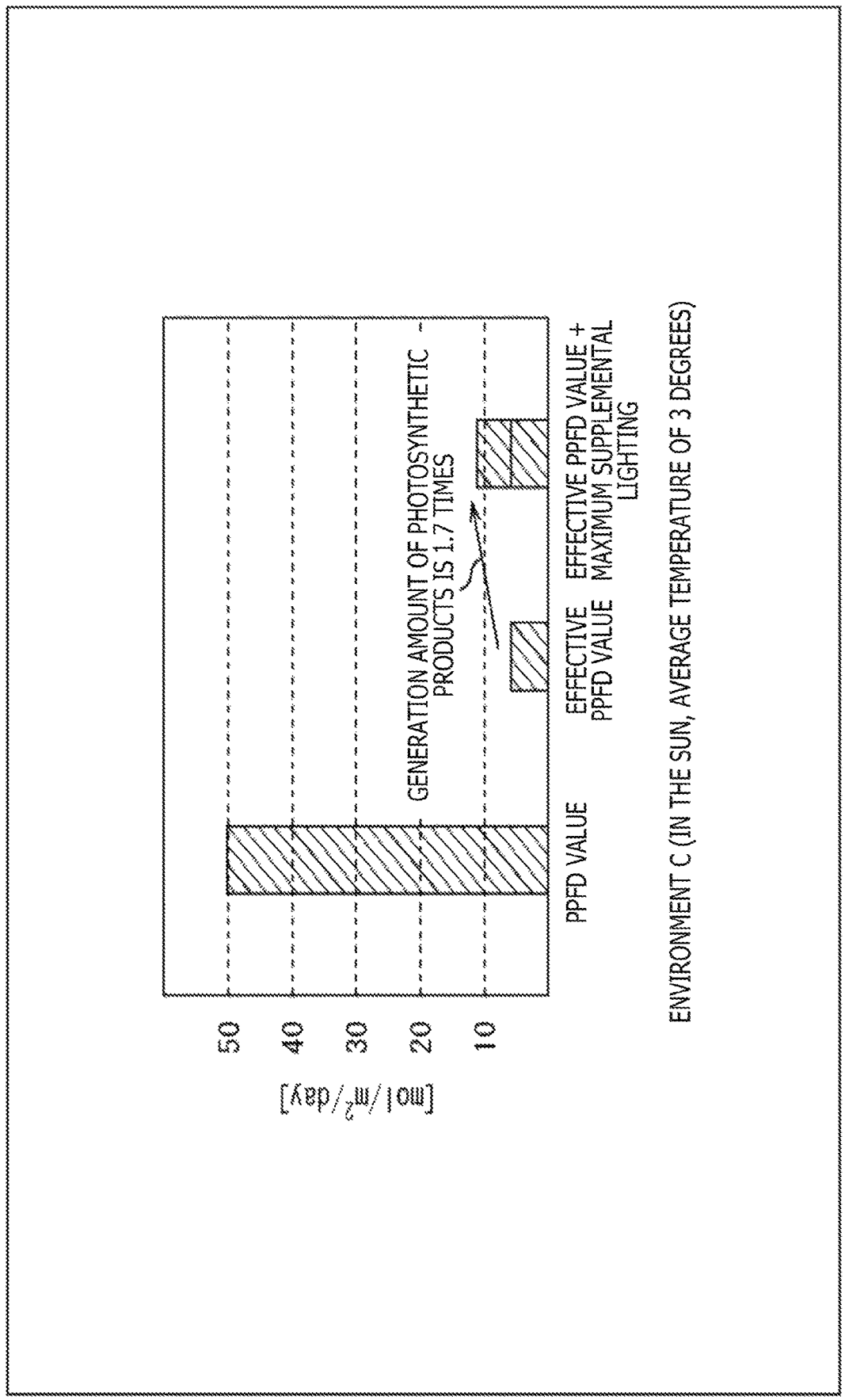
FIG. 39 is a diagram illustrating a display example of the integrated values in one day of the PPFD values in the environment C.

FIG. 39 is a diagram illustrating a display example of integrated values in one day of the PPFD values in the environment C.

In FIG. 39, comparing the integrated value in one day of the effective PPFD values and the integrated value in one day of the effective PPFD values+maximum supplemental lighting obtained in the simulation of the environment C, the integrated value of the effective PPFD values is approximately 6.4 ($mol/m^2/day$), and the integrated value of the effective PPFD values+maximum supplemental lighting is approximately 10.9 (mol/m2/day). Therefore, the integrated value of the effective PPFD values+maximum supplemental lighting is approximately 1.7 times the integrated value of the effective PPFD values in the environment C.

That is, in the case where the supplemental lighting is performed according to the maximum amount of supplemental lighting, the generated amount of photosynthetic products, such as sugar of plant, is approximately 1.7 times according to the difference between the integrated value of the effective PPFD values and the integrated value of the effective PPFD values+maximum supplemental lighting. It can be understood that the amount of growth of the plant is considerably increased by performing the environment improvement control.

In addition, comparing the integrated values of the PPFD values in the environment C of FIG. 39 and the integrated values of the PPFD values in the environment A of FIG. 37, the environment in the sun is the same in the environment C and the environment A, but the average temperature of 3 degrees and the average temperature 15 degrees are different. Therefore, it can be understood that the increase in the amount of growth of the plant in the environment A of FIG. 37 (average temperature of 15 degrees, generated amount of photosynthetic products is 3 times) is greater than that of the environment C in FIG. 39 (average temperature of 3 degrees, generated amount of photosynthetic products is 1.7 times).

This is because, for example, the supplemental lighting is effective after the sunset until the morning when the temperature is high. On the other hand, the temperature is low after 0 o'clock when the temperature is low. The carbon reduction reaction maximum ETR becomes zero, and the supplemental lighting is not effective.

(1-8) Display Example of Integrated Values in One Day in Environment D (in the Shade, Average Temperature of 3 Degrees)

Figure 40:
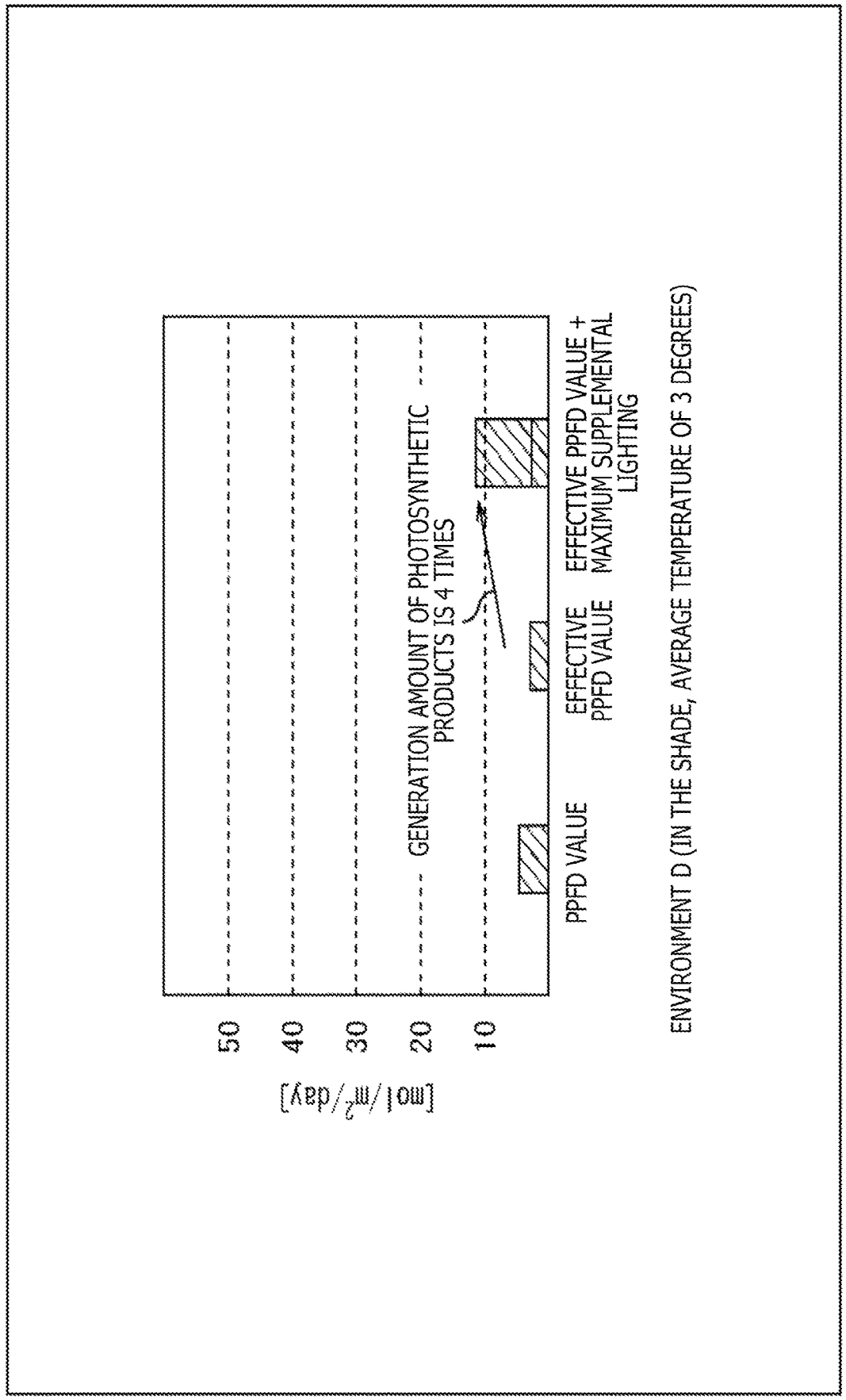
FIG. 40 is a diagram illustrating a display example of the integrated values in one day of the PPFD values in the environment D.

FIG. 40 is a diagram illustrating a display example of integrated values in one day of the PPFD values in the environment D.

In FIG. 40, comparing the integrated value in one day of the effective PPFD values and the integrated value in one day of the effective PPFD values+maximum supplemental lighting obtained in the simulation of the environment D, the integrated value of the effective PPFD values is approximately 2.9 (mol/m$^2$/day), and the integrated value of the effective PPFD values+maximum supplemental lighting is approximately 11.6 (mol/m$^2$/day). Therefore, the integrated value of the effective PPFD values+maximum supplemental lighting is approximately 4 times the integrated value of the effective PPFD values in the environment D.

That is, in the case where the supplemental lighting is performed according to the maximum amount of supplemental lighting, the generated amount of photosynthetic products, such as sugar of plant, is approximately 4 times according to the difference between the integrated value of the effective PPFD values and the integrated value of the effective PPFD values+maximum supplemental lighting. It can be understood that the amount of growth of the plant is considerably increased by performing the environment improvement control.

In addition, comparing the integrated values of the PPFD values in the environment D of FIG. 40 and the integrated values of the PPFD values in the environment C of FIG. 39, the average temperature of 3 degrees is the same in the environment D and the environment C, but the environment in the shade and the environment in the sun are different. Therefore, it can be understood that the increase in the amount of growth of the plant in the environment D of FIG. 40 (in the shade, generated amount of photosynthetic products is 4 times) is greater than that of the environment C in FIG. 39 (in the sun, generated amount of photosynthetic products is 1.7 times).

Furthermore, comparing the integrated values of the PPFD values in the environment D of FIG. 40 and the integrated values of the PPFD values in the environment B of FIG. 38, the environment in the shade is the same in the environment D and the environment B, but the average temperature of 3 degrees and the average temperature 15 degrees are different. Therefore, it can be understood that the increase in the amount of growth of the plant in the environment B of FIG. 38 (average temperature of 15 degrees, generated amount of photosynthetic products is 11 times) is greater than that of the environment D in FIG. 40 (average temperature of 3 degrees, generated amount of photosynthetic products is 4 times).

Note that the display examples illustrated in FIGS. 33 to 40 are examples of the display mode for presenting the statistics of the data, such as effective PPFD value+maximum supplemental lighting, and the statistics of the data, such as effective PPFD value+maximum supplemental lighting, may be displayed in other display modes.

In addition, the data can be compiled in a predetermined time range, such as on a daily basis, a weekly basis, and a monthly basis, as illustrated in FIGS. 37 to 40 to accumulate the data regarding, for example, the sunshine important for the growth of the plant. In this way, for example, the data, such as effective PPFD value+maximum supplemental lighting, can be compiled in a common time unit, such as on a daily basis and a weekly basis, for each plant as the measured object 1. In addition, the data, such as effective PPFD value+maximum supplemental lighting, can be presented as two-dimensional information for each region.

In this way, the PPFD value actually contributed to the growth of the plant is displayed as the effective PPFD value, and in addition, the environment improvement effective PPFD value can also be displayed. Therefore, the growth of the plant as the measured object 1 can be analyzed from various angles.

That is, it is known that the photosynthesis of a plant is affected by the number of photons that are particles of light, instead of the energy of light. However, the number of photons that allows the plant to effectively utilize the light is significantly affected by environmental conditions, such as carbon dioxide concentration ($CO_2$ concentration), temperature, humidity, and nutrients, as well as the type and the state of the plant. Therefore, the PPFD value that can be effectively utilized by the plant is predicted from the environmental conditions as well as the type and the state of the plant to calculate and display the effective PPFD value in the present technique. In addition, the effective PPFD value is further utilized here to improve the environment in real time to increase the growth of the plant.

The real-time environment control has been described.

Note that it is difficult in the current condition to perform the real-time control to control the environment, such as temperature, humidity, and carbon dioxide concentration, to improve the environment. However, the environment, such as temperature, can be easily controlled if the temperature or the like can be recognized in advance. Therefore, predicted environment control that allows to perform more difficult environment control will be described next.

(2) Predicted Environment Control (Configuration of Environment Control System)

Figure 41:
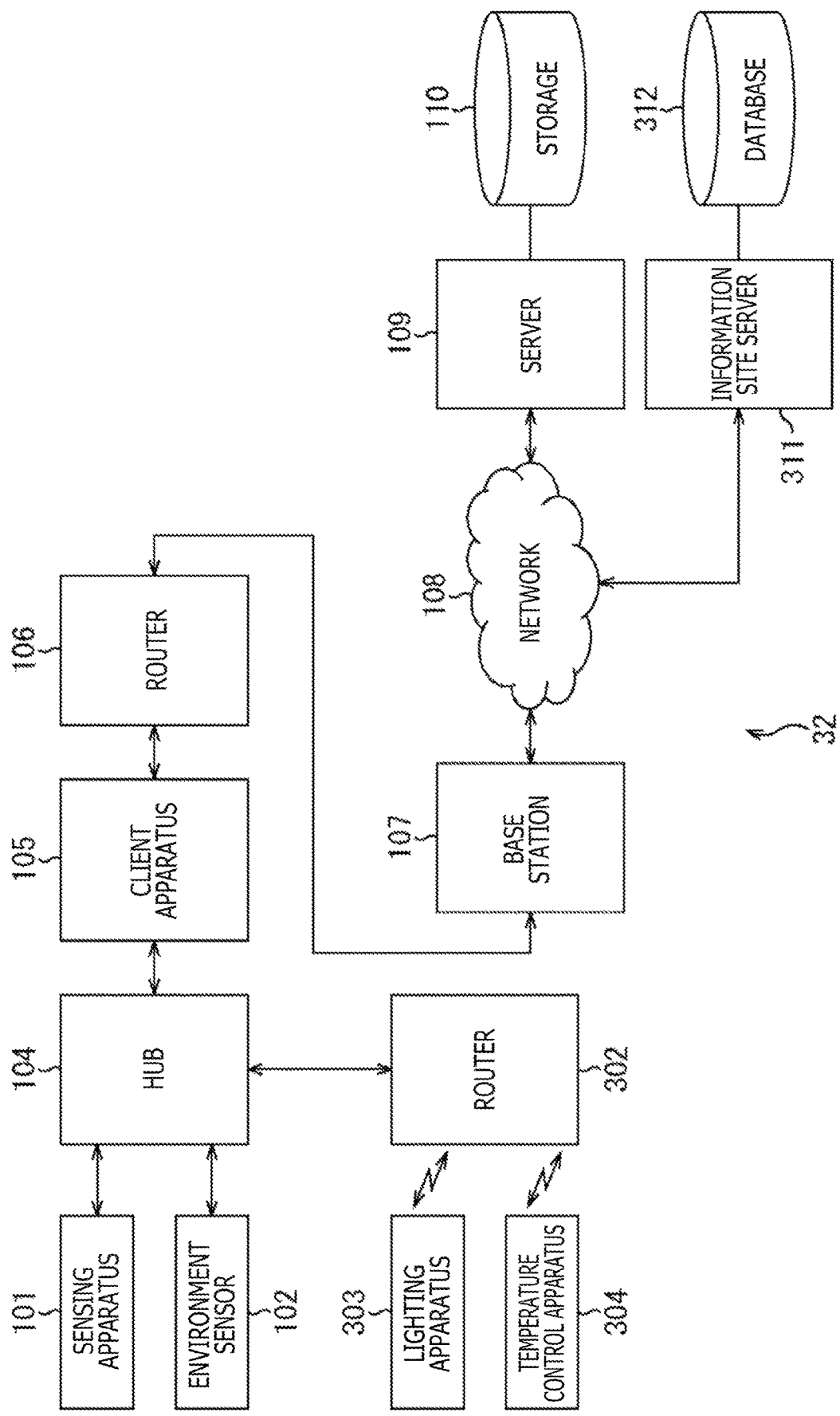
FIG. 41 is a diagram illustrating a configuration of an embodiment of an environment control system according to the present technique.

FIG. 41 is a diagram illustrating a configuration of an embodiment of an environment control system according to the present technique.

An environment control system 32 of FIG. 41 is a system for using prediction information obtained in advance to perform predicted environment control for improving the environment. That is, in the case where the measured object 1 is a plant (for example, a plant in a field or grass in stadium), and the effective PPFD value is calculated as an effective index of the measured object 1, the environment control system 32 uses prediction information to perform the control for improving the environment, such as light applied to the plant, based on the effective PPFD value.

In FIG. 41, the environment control system 32 includes the sensing apparatus 101, the environment sensor 102, the hub 104, the client apparatus 105, the router 106, the base station 107, the network 108, the server 109, the storage 110, the router 302, the lighting apparatus 303, the temperature control apparatus 304, an information site server 311, and a database 312.

In the environment control system 32 of FIG. 41, the same reference signs are provided to the parts corresponding to the environment control system 31 of FIG. 29, and the description will be appropriately omitted. That is, compared to the environment control system 31 of FIG. 29, the environment control system 32 of FIG. 41 includes only the lighting apparatus 303 and the temperature control apparatus 304 among the components from the lighting apparatus 303 to the $CO_2$ concentration control apparatus 306, and the information site server 311 is connected to the network 108. In addition, the database 312 is connected to the information site server 311.

In addition, although the server 109 has functions similar to the environment control apparatus 301 of FIG. 27 in the description of the environment control system 31 of FIG. 29, the server 109 has functions similar to the environment control apparatus 301 of FIG. 42 described later in the environment control system 32 of FIG. 41. Therefore, the detailed configuration of the server 109 will be described later with reference to FIG. 42.

The information site server 311 is a server that provides prediction information used for calculating the predicted effective PPFD value. The predicted information includes information, such as temperature information. The prediction information is sequentially stored in the database 312. Note that the predicted effective PPFD value is an effective PPFD value calculated by using various types of prediction information.

The information site server 311 receives a request transmitted from the server 109 through the network 108 and reads the prediction information stored in the database 312 according to the request. The information site server 311 transmits the read prediction information to the server 109 through the network 108.

The environment control system 32 is configured in this way.

(Configuration of Environment Control Apparatus)

Figure 42:
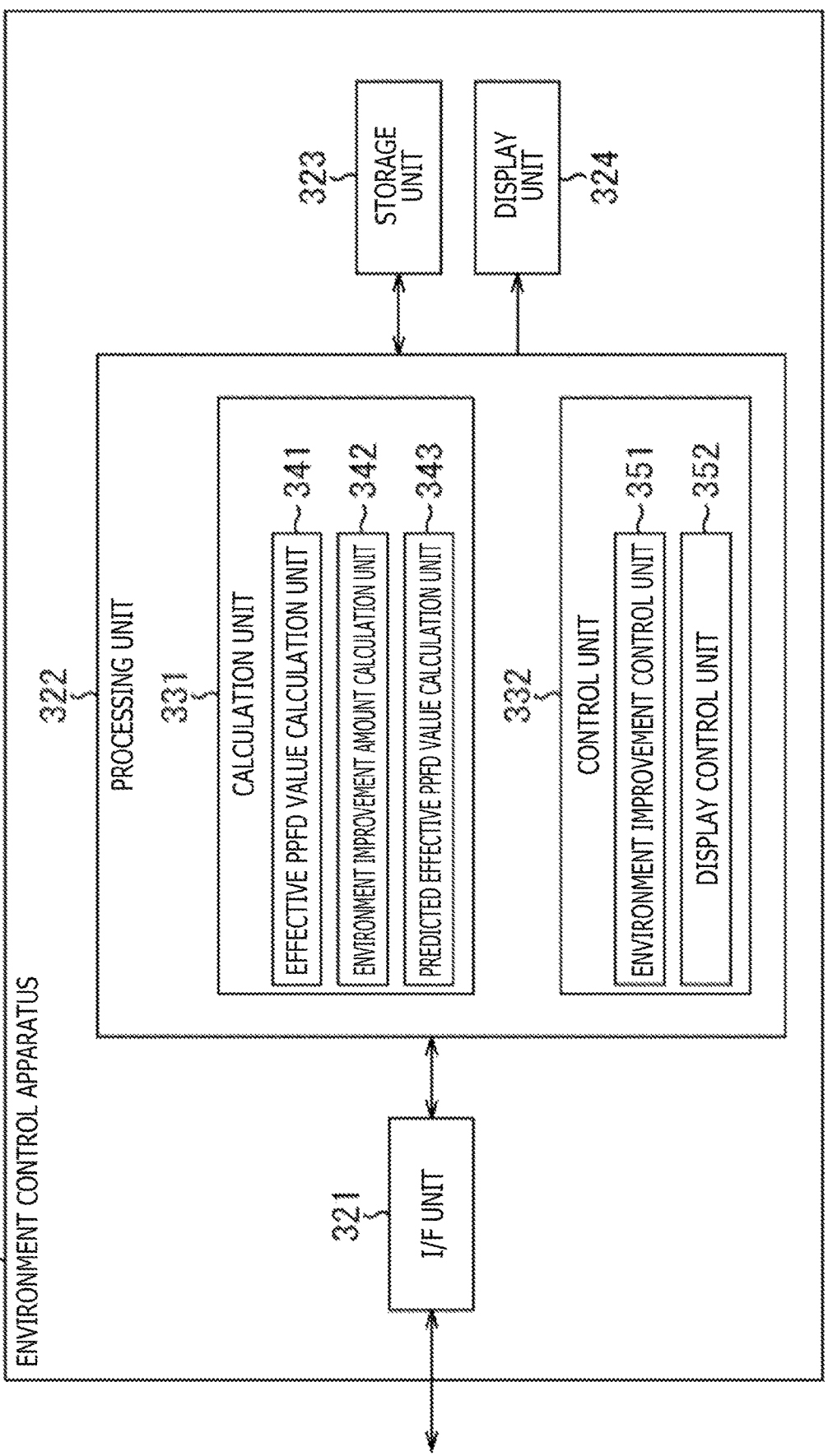
FIG. 42 is a diagram illustrating a configuration example of the environment control apparatus.

FIG. 42 is a diagram illustrating a configuration example of the environment control apparatus 301 as the server 109 of FIG. 41.

In FIG. 42, the environment control apparatus 301 includes the I/F unit 321, the processing unit 322, the storage unit 323, and the display unit 324 as in the environment control apparatus 301 of FIG. 27. Furthermore, in the environment control apparatus 301 of FIG. 42, the same reference signs are provided to the parts corresponding to the environment control apparatus 301 of FIG. 27, and the description will be appropriately omitted.

That is, in the environment control apparatus 301 of FIG. 42, a predicted effective PPFD value calculation unit 343 is newly added to the calculation unit 331 of the processing unit 322 in addition to the effective PPFD value calculation unit 341 and the environment improvement amount calculation unit 342. The predicted effective PPFD value calculation unit 343 calculates a predicted effective PPFD value on the basis of the prediction information acquired from the information site server 311, the storage 110, or the like.

The environment control apparatus 301 is configured in this way.

(Flow of Predicted Environment Control Process)

Next, a flow of a predicted environment control process executed by the server 109 of the environment control system 32 of FIG. 41 will be described with reference to a flow chart of FIG. 43.

In step S241, the predicted effective PPFD value calculation unit 343 acquires the prediction information from the information site server 311 through the network 108.

In a case illustrated here, the temperature information illustrated in FIG. 32 is acquired as predicted values (prediction information) of the temperature of several days later, for example. As for the temperature information, for example, the weather and the predicted temperature of several days later can be acquired from the weather forecast, and past weather information obtained by an automated meteorological data acquisition system (AMeDAS) can be used to set changes in temperature in the past as predicted values on the basis of the weather and the average temperature of the same period.

In addition, as for the sunshine, the server 109 can set the information (PPFD values) illustrated in FIGS. 22 to 25 as predicted values on the basis of the information stored in the storage 110, for example. Note that the method of acquiring the predicted values (prediction information) is an example, and other methods may be used to acquire the predicted values (prediction information).

In step S242, the predicted effective PPFD value calculation unit 343 calculates the predicted effective PPFD value on the basis of the prediction information obtained in the process of step S241.

In step S243, the environment improvement amount calculation unit 342 checks the bottleneck for the predicted effective PPFD value obtained in the process of step S242. Note that the bottleneck can also be checked in the calculation of the predicted effective PPFD value in the process of step S242.

In step S244, the environment improvement amount calculation unit 342 executes an environment improvement amount calculation process on the basis of the check result of the bottleneck obtained in the process of step S243.

In the environment improvement amount calculation process, the environment improvement candidates selected according to the check result of the bottleneck and the environment improvement function prepared in the environment control system 32 are used to determine the environment improvement target. Furthermore, the amount of environment improvement regarding the decided environment improvement target is calculated in the environment improvement amount calculation process.

Note that details of the environment improvement amount calculation process will be described later with reference to a flow chart of FIG. 44.

In addition, the amount of environment improvement may be decided according to the purpose, the time (allowed time), and the like of the user as described above. That is, modes according to the purpose, the time, and the like can be prepared in the environment control system 32, and a setting screen (UI) can be presented to the user to allow the user to select a desirable mode. As a result, the environment control system 32 performs environment improvement control according to the mode manually set by the user. In addition, the user may be able to manually set the modes while viewing the results of simulation described later.

In step S245, the environment improvement control is prepared.

Here, for example, in the case where the temperature is selected as an environment improvement candidate, and the temperature control apparatus 304 that improves the environment of the temperature is prepared as an environment improvement function, the temperature is decided as the environment improvement target. Therefore, the environment improvement temperature is calculated as the amount of environment improvement (S244). Note that the temperature control apparatus 304 is prepared in the environment control system 32 of FIG. 41.

In this case, when, for example, +5 degrees (all day, always +5 degrees) is calculated as the environment improvement temperature, the environment improvement control unit 351 can control the temperature control apparatus 304 including a heater or the like to raise the temperature by an amount of temperature according to the environment improvement temperature. More specifically, in the case where the measured object 1 is grass of a stadium, under-heating for grass may be installed, and the under-heating may be used as the temperature control apparatus 304.

In addition, for example, when +5 degrees is calculated as the environment improvement temperature, a plastic sheet or the like can be put on the target place to raise the temperature according to the environment improvement temperature. That is, in a case where the temperature is low, it can be determined to raise the temperature of a part in the shade in which a large effect of the environment improvement can be particularly expected. In this way, the environment improvement control, such as putting the plastic sheet on the target place, can be prepared.

As for the method of putting on the plastic sheet, an apparatus, such as the temperature control apparatus 304, may automatically put on the plastic sheet, or the user may manually put on the plastic sheet. In the case where the user manually puts on the plastic sheet, the details of the environment improvement (for example, information such as environment improvement temperature (+5 degrees) and target place) can be displayed to notify the user of the details to be handled.

Furthermore, in the temperature control, the temperature can be raised by one degree at a time when, for example, +5 degrees is calculated as the environment improvement temperature, or the temperature can be appropriately raised according to the values obtained with reference to the temperature correction coefficient LUT (LUT5) in B of FIG. 21.

In this way, it is difficult in the current condition to perform the real-time control to control the environment, such as temperature, humidity, and carbon dioxide concentration, to improve the environment. However, the environment, such as temperature, can be easily controlled if the temperature or the like can be recognized in advance. Therefore, the environment improvement candidates can be easily increased in the predicted environment control compared to the real-time control.

When the process of step S245 is finished, the process proceeds to step S246. In steps S246 to S250, the environment control process is executed in real time as in steps S201 to S205 of FIG. 30.

That is, for example, in the case where +5 degrees is calculated as the environment improvement temperature (S244), and the plastic sheet is put on the target place to prepare the environment improvement control for controlling the rise in temperature according to the environment improvement temperature (+5 degree) (S245) in the process of steps S241 to S245, the process of steps S246 to S250 is executed in this state.

As a result, the time zone in which the photosystem reaction maximum ETR is smaller than the carbon reduction reaction maximum ETR (carbon reduction reaction maximum ETR−photosystem reaction maximum ETR>0) is larger than in the case without the execution of the environment improvement control of the temperature, and this is checked in the simulation conducted by the inventor of the present technique. The light is then decided as the environment improvement target for the time zone, and the light according to the maximum amount of supplemental lighting is applied to the plant.

Figure 43:
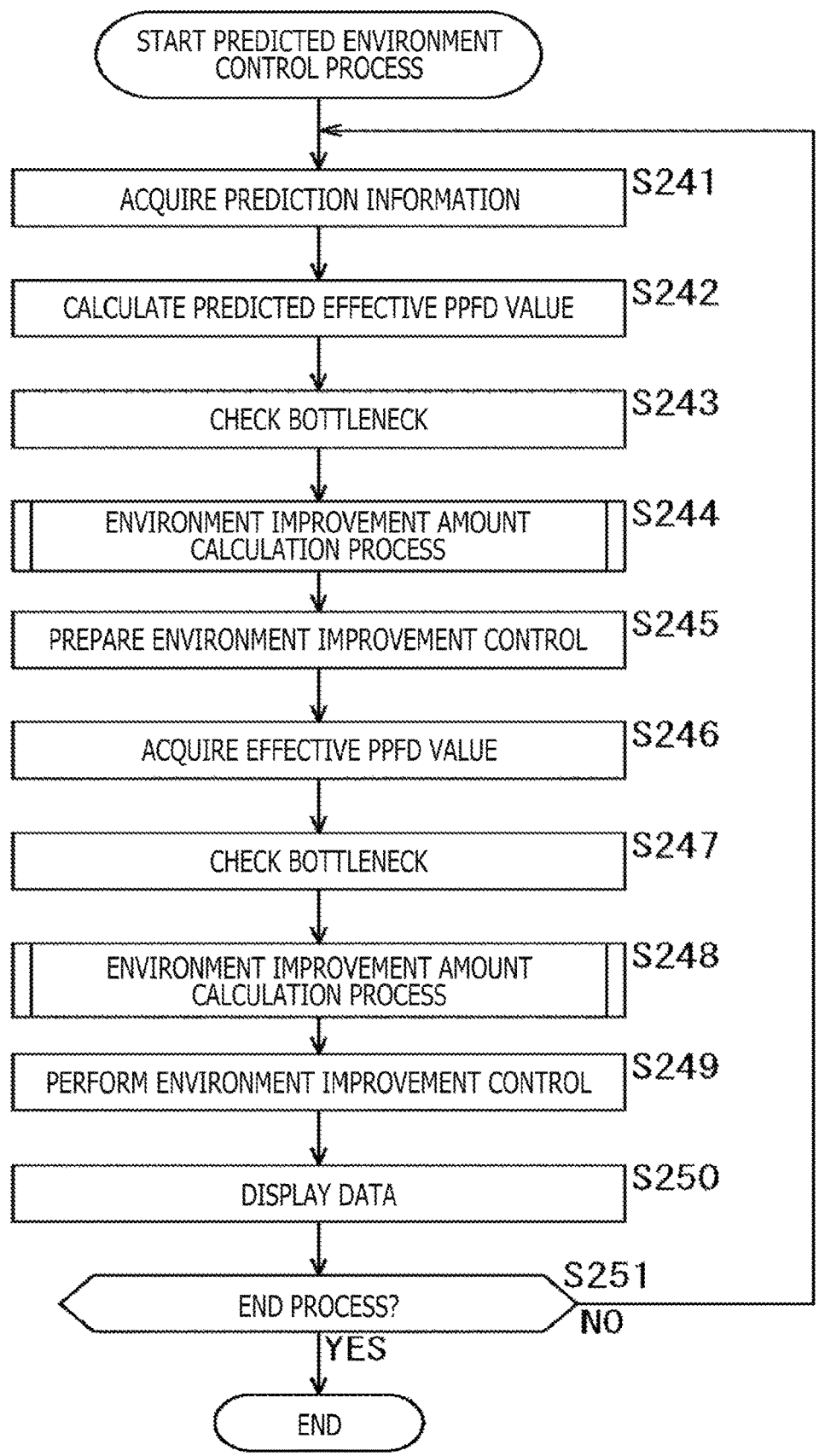
FIG. 43 is a flow chart describing a flow of a predicted environment control process.

Note that in the description of FIG. 43, although the process of steps S241 to S245 is repeatedly executed for the convenience of description, the predicted environment control of steps S241 to S245 may be performed once at the beginning and may not be repeatedly performed. That is, only the process of steps S246 to S250 is repeatedly executed in this case.

The flow of the predicted environment control process has been described.

Note that in a case where the configuration of an environment control system (not illustrated) as a local environment is adopted instead of the configuration of the environment control system 32 (FIG. 41) as a cloud environment, the client apparatus 105 with the function of the environment control apparatus 301 (FIG. 42) executes the process of steps S241 to S251 of FIG. 43, for example.

(Flow of Environment Improvement Amount Calculation Process)

Next, the details of the environment improvement amount calculation process corresponding to step S244 of FIG. 43 will be described with reference to a flow chart of FIG. 44.

In step S261, the magnitude relationship between the photosystem reaction maximum ETR and the carbon reduction reaction maximum ETR is determined on the basis of the check result of the bottleneck obtained in the process of step S243 of FIG. 43.

In a case where it is determined that the photosystem reaction maximum ETR is smaller than the carbon reduction reaction maximum ETR in step S261, the process proceeds to step S262.

In step S262, the photosynthetic rate is limited by the photosystem reaction, and the environment improvement amount calculation unit 342 selects the light as an environment improvement candidate.

In step S263, the environment improvement amount calculation unit 342 recognizes the light and the temperature as environment improvement functions prepared in the environment control system 32. Here, the environment control system 32 has the configuration illustrated in FIG. 41 and includes the lighting apparatus 303 that improves the environment of the light and the temperature control apparatus 304 that improves the environment of the temperature.

In step S264, the light as the environment improvement candidate selected in the process of step S262 is included in the environment improvement functions (light and temperature) recognized in the process of step S263, and the environment improvement amount calculation unit 342 decides the light as an environment improvement target.

In step S265, the environment improvement amount calculation unit 342 calculates the maximum amount of supplemental lighting as the amount of environment improvement of the environment improvement target that is the light according to the environment improvement target decided in the process of step S264. The maximum amount of supplemental lighting can be calculated in Equation (18).

In this way, in the case where it is determined that the photosystem reaction maximum ETR is smaller than the carbon reduction reaction maximum ETR (carbon reduction reaction maximum ETR−photosystem reaction maximum ETR>0), the photosystem reaction maximum ETR is the bottleneck, and the current photosynthetic rate is limited by the photosystem reaction. Therefore, the lighting apparatus 303 can perform the supplemental lighting to improve the environment. The light is decided as the environment improvement target, and the maximum amount of supplemental lighting is calculated as the amount of environment improvement.

On the other hand, in the case where it is determined that the photosystem reaction maximum ETR is greater than the carbon reduction reaction maximum ETR, the process proceeds to step S266.

In step S266, the photosynthetic rate is limited by the carbon reduction reaction, and the environment improvement amount calculation unit 342 selects the temperature, the humidity, and the carbon dioxide concentration as environment improvement targets. Note that for example, nutrients or the like for the plant may be added as environment improvement candidates as described above.

In step S267, the environment improvement amount calculation unit 342 recognizes the light and the temperature as environment improvement candidates prepared in the environment control system 32. Here, the environment control system 32 has the configuration illustrated in FIG. 41 and includes the lighting apparatus 303 and the temperature control apparatus 304.

In step S268, the temperature as the environment improvement candidate selected in the process of step S266 is included in the environment improvement functions (light and temperature) recognized in the process of step S267, and the environment improvement amount calculation unit 342 decides the temperature as the environment improvement target.

In step S269, the environment improvement amount calculation unit 342 calculates the environment improvement temperature as the amount of environment improvement of the environment improvement target that is the temperature according to the environment improvement target decided in the process of step S268. Here, for example, "+5 degrees" is calculated as the environment improvement temperature.

In this way, in the case where it is determined that the photosystem reaction maximum ETR is greater than the carbon reduction reaction maximum ETR (carbon reduction reaction maximum ETR−photosystem reaction maximum ETR≤0), the carbon reduction reaction maximum ETR is the bottleneck, and the current photosynthetic rate is limited by the carbon reduction reaction. Therefore, the temperature control apparatus 304 can change the temperature to improve the environment. The temperature is decided as the environment improvement target, and the environment improvement temperature is calculated as the amount of environment improvement.

When the process of step S265 or S269 is finished, the process proceeds to step S270.

In step S270, the difference between the photosystem reaction maximum ETR and the carbon reduction reaction maximum ETR is computed, and the magnitude relationship between the photosystem reaction maximum ETR and the carbon reduction reaction maximum ETR is determined according to the computation result.

In the case where it is determined that the photosystem reaction maximum ETR is smaller than the carbon reduction reaction maximum ETR in step S270, the process returns to step S261, and the process is repeated. On the other hand, in the case where it is determined that the photosystem reaction maximum ETR is greater than the carbon reduction reaction maximum ETR in step S270, the environment improvement amount calculation process of FIG. 44 is finished. When the environment improvement amount calculation process of FIG. 44 is finished, the process returns to step S244 of FIG. 43, and the subsequent process is executed.

The flow of the environment improvement amount calculation process has been described.

Figure 44:
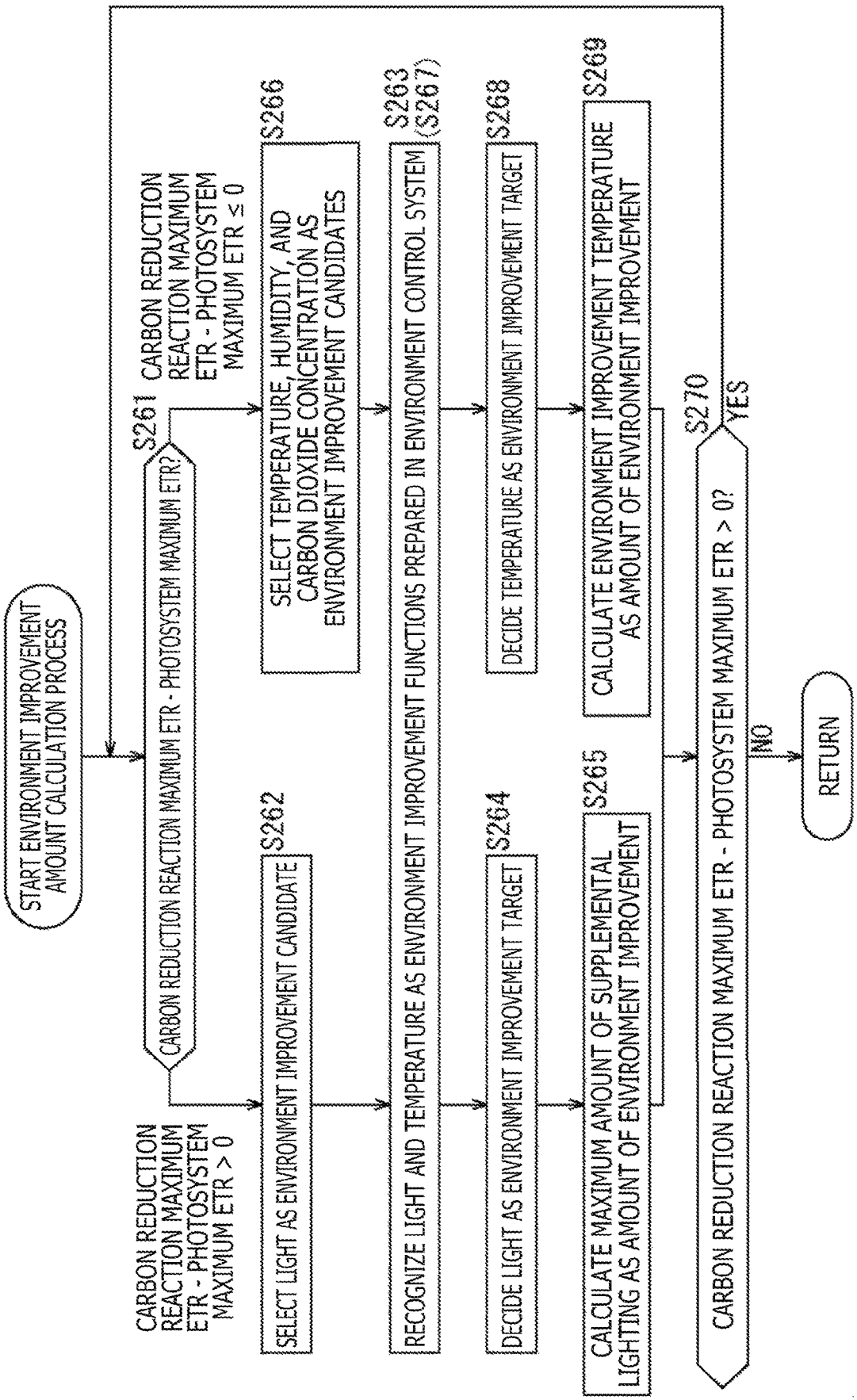
FIG. 44 is a flow chart describing a flow of an environment improvement amount calculation process.

Note that in the environment improvement amount calculation process of FIG. 44, the environment improvement target is set to the light to perform the environment improvement control when the current photosynthetic rate is limited by the photosystem reaction in the case where the environment improvement of the light and the temperature is possible. However, the environment improvement target can be set to the temperature to perform the environment improvement control when the current photosynthetic rate is limited by the carbon reduction reaction.

That is, at least one of the environment improvement control based on the environment improvement target corresponding to the photosystem reaction or the environment improvement control based on the environment improvement target corresponding to the carbon reduction reaction can be performed as the environment improvement control of the present technique. Then, for example, if one of the environments is improved by performing one of the environment improvement controls, and the other environment needs to be improved due to the improvement, the other environment improvement control can be further performed.

For example, there may be a situation in which the temperature is improved by the environment improvement control based on the environment improvement target (temperature) corresponding to the carbon reduction reaction, and the light needs to be improved due to the improvement. In that case, the environment improvement control based on the environment improvement target (light) corresponding to the photosystem reaction can be performed. That is, both of the environment improvement control based on the environment improvement target (temperature) corresponding to the carbon reduction reaction and the environment improvement control based on the environment improvement target (light) corresponding to the photosystem reaction can be performed to adjust (balance) the environment.

Next, display examples of the data displayed in the process of step S250 of FIG. 43 will be described with reference to FIGS. 45 to 52.

The inventor of the present technique has conducted a simulation (hereinafter, referred to as third simulation) in the following environments of (e) to (h) to check the changes in the effective PPFD value (environment improvement effective PPFD value) after performing the environment improvement of the light and the temperature for the measured object 1, such as a plant in a field, in an actual day.

(e) Environment E: in the sun, average temperature of one day is 20 degrees (f) Environment F: in the shade, average temperature of one day is 20 degrees (g) Environment G: in the sun, average temperature of one day is 8 degrees (h) Environment H: in the shade, average temperature of one day is 8 degrees That is, in the case where the environment control system 32 (FIG. 41) includes the lighting apparatus 303 and the temperature control apparatus 304 as environment improvement functions, the lighting apparatus 303 performs the supplemental lighting, and the temperature control apparatus 304 controls the temperature to improve the environment in the third simulation.

Therefore, although the lighting apparatus 303 performs the supplemental lighting according to the maximum amount of supplemental lighting to obtain the maximum supplemental lighting effective PPFD value as the environment improvement effective PPFD value in the third simulation, the average temperatures are different from the second simulation.

That is, +5 degrees is calculated for the environment improvement temperature when the temperature is decided as the environment improvement target in the third simulation. Therefore, compared to the second simulation (FIGS. 33 to 36) in which the environment improvement target is only the light, the average temperatures in the third simulation are raised 5 degrees from 15 degrees and 3 degrees to 20 degrees and 8 degrees.

Hereinafter, data obtained as a result of the third simulation will be illustrated. Note that the measured object 1 here is a plant.

(2-1) Display Example of Environment E (in the Sun, Average Temperature of 20 Degrees)

Figure 45:
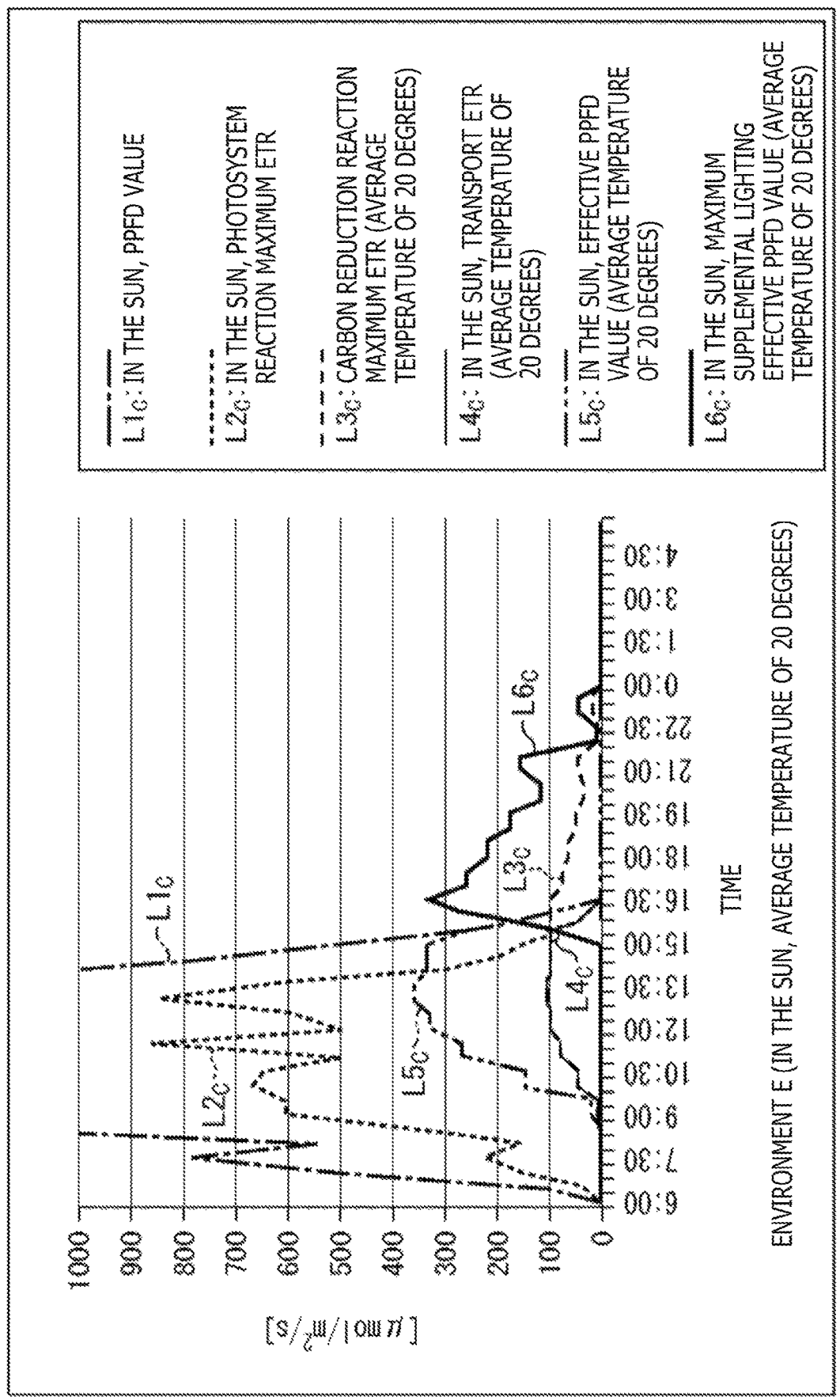
FIG. 45 is a diagram illustrating a display example of the maximum supplemental lighting effective PPFD value (average temperature of 20 degrees) in an environment E.

FIG. 45 is a diagram illustrating a display example of the maximum supplemental lighting effective PPFD value (average temperature of 20 degrees) in the environment E.

In the environment E, the plant is in the sun, and the average temperature of one day around the plant is 20 degrees. As a result of the simulation in the environment, lines $L1_E$ to $L5_E$ indicate "in the sun, PPFD value," "in the sun, photosystem reaction maximum ETR," "carbon reduction reaction maximum ETR (average temperature of 20 degrees)," "in the sun, transport ETR (average temperature of 20 degrees)," and "in the sun, effective PPFD value (average temperature of 20 degrees)."

In FIG. 45, a line $L6_E$ indicates a change in the environment improvement effective PPFD value (in the sun, maximum supplemental lighting effective PPFD value (average temperature of 20 degrees)) obtained by the temperature control performed by the temperature control apparatus 304 according to the environment improvement temperature (+5 degrees) and the supplemental lighting performed by the lighting apparatus 303 according to the maximum amount of supplemental lighting in the sun in the environment E.

Here, focusing on "in the sun, effective PPFD value" indicated by the line $L5_E$ and "in the sun, maximum supplemental lighting effective PPFD value" indicated by the line $L6_E$ in FIG. 45, "in the sun, effective PPFD value" becomes zero after the sunset after 16 o'clock. However, the temperature control according to the environment improvement temperature and the supplemental lighting according to the maximum amount of supplemental lighting can be performed to obtain "in the sun, maximum supplemental lighting effective PPFD value" equivalent to "in the sun, effective PPFD value" even after the sunset. On the other hand, "in the sun, maximum supplemental lighting effective PPFD value" is zero from the sunrise to around the sunset.

In addition, comparing "in the sun, maximum supplemental lighting effective PPFD value (average temperature of 20 degrees)" in the environment E of FIG. 45 and "in the sun, maximum supplemental lighting effective PPFD value (average temperature of 15 degrees)" in the environment A of FIG. 33, the line $L6_E$, in which not only the supplemental lighting according to the maximum amount of supplemental lighting, but also the temperature control according to the environment improvement temperature is performed, indicates greater effective PPFD values than the line $L6_A$ as is clear from the shapes of the line $L6_E$ in FIG. 45 and the line $L6_A$ in FIG. 33.

(2-2) Display Example of Environment F (in the Shade, Average Temperature of 20 Degrees)

Figure 46:
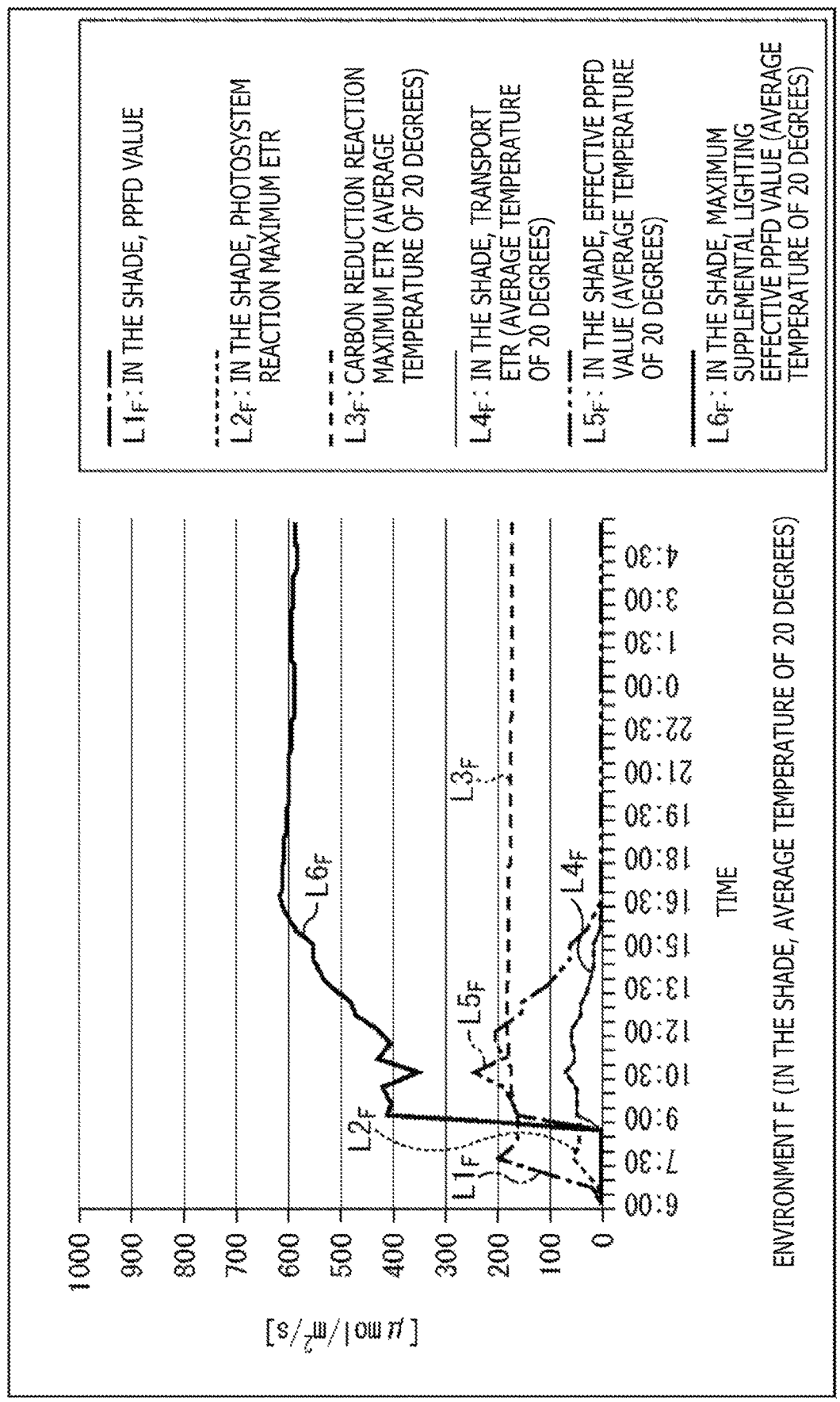
FIG. 46 is a diagram illustrating a display example of the maximum supplemental lighting effective PPFD value (average temperature of 20 degrees) in an environment F.

FIG. 46 is a diagram illustrating a display example of the maximum supplemental lighting effective PPFD value (average temperature of 20 degrees) in the environment F.

In the environment F, the plant is in the shade, and the average temperature of one day around the plant is 20 degrees. As a result of the simulation in the environment, lines $L1_F$ to $L5_F$ indicate "in the shade, PPFD value," "in the shade, photosystem reaction maximum ETR," "carbon reduction reaction maximum ETR (average temperature of 20 degrees)," "in the shade, transport ETR (average temperature of 20 degrees)," and "in the shade, effective PPFD value (average temperature of 20 degrees)."

In FIG. 46, a line $L6_F$ indicates a change in the environment improvement effective PPFD value (in the shade, maximum supplemental lighting effective PPFD value (average temperature of 20 degrees)) obtained by the temperature control performed by the temperature control apparatus 304 according to the environment improvement temperature (+5 degrees) and the supplemental lighting performed by the lighting apparatus 303 according to the maximum amount of supplemental lighting in the shade in the environment F.

Here, focusing on "in the shade, effective PPFD value" indicated by the line $L5_F$ and "in the shade, maximum supplemental lighting effective PPFD value" indicated by the line $L6_F$ in FIG. 46, "in the shade, effective PPFD value" becomes zero after the sunset after 16 o'clock. On the other hand, the temperature control according to the environment improvement temperature and the supplemental lighting according to the maximum amount of supplemental lighting can be performed to obtain "in the shade, maximum supplemental lighting effective PPFD value" always greater than "in the shade, effective PPFD value" regardless of whether the time is before or after the sunset.

In addition, comparing "in the shade, maximum supplemental lighting effective PPFD value (average temperature of 20 degrees)" in the environment F of FIG. 46 and "in the shade, maximum supplemental lighting effective PPFD value (average temperature of 15 degrees)" in the environment B of FIG. 34, the line $L6_F$, in which not only the supplemental lighting according to the maximum amount of supplemental lighting, but also the temperature control according to the environment improvement temperature is performed, indicates greater effective PPFD values than the line $L6_B$ as is clear from the shapes of the line $L6_F$ in FIG. 46 and the line $L6_B$ in FIG. 34.

(2-3) Display Example of Environment G (in the Sun, Average Temperature of 8 Degrees)

Figure 47:
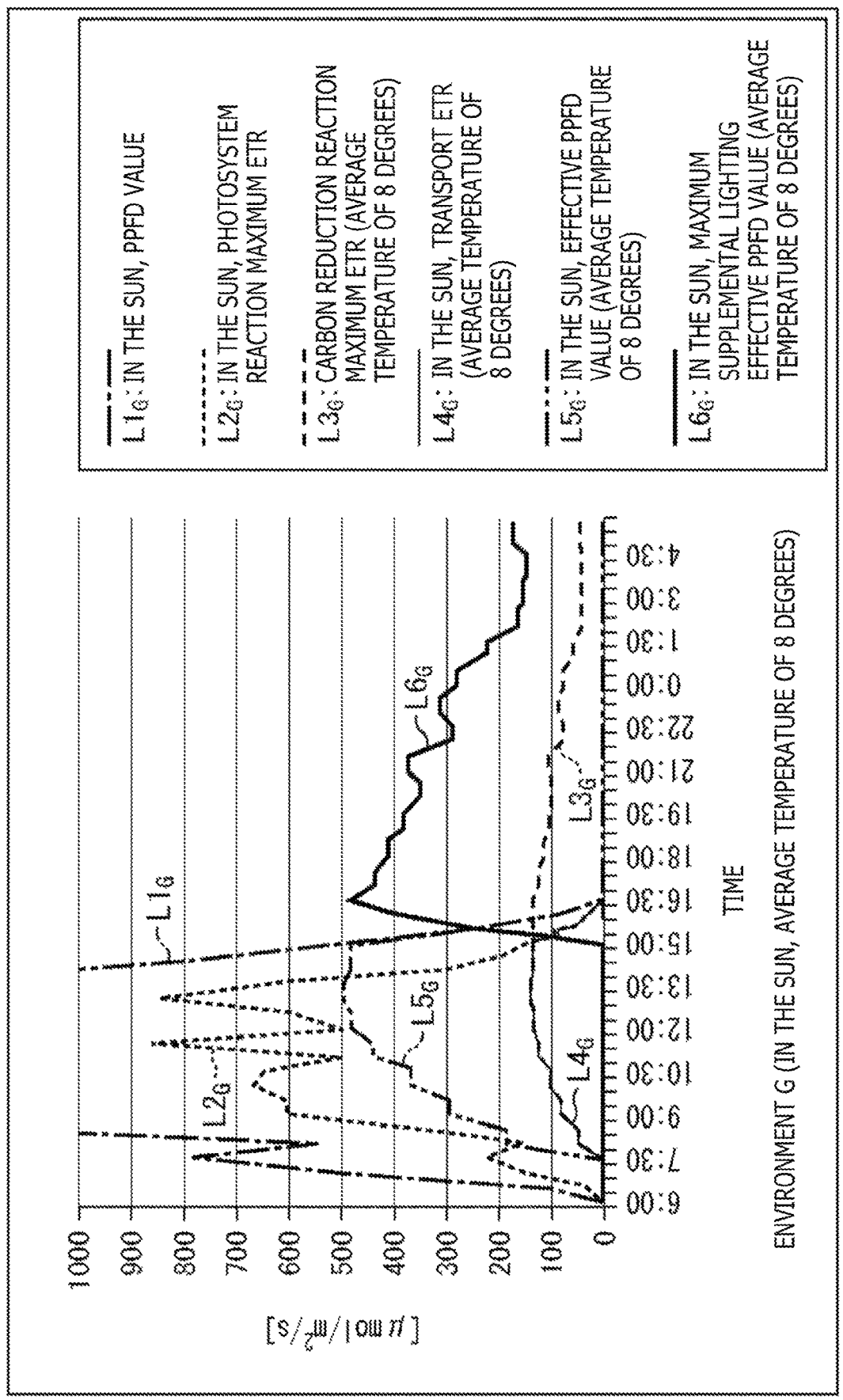
FIG. 47 is a diagram illustrating a display example of the maximum supplemental lighting effective PPFD value (average temperature of 8 degrees) in an environment G.

FIG. 47 is a diagram illustrating a display example of the maximum supplemental lighting effective PPFD value (average temperature of 8 degrees) in the environment G.

In the environment G, the plant is in the sun, and the average temperature of one day around the plant is 8 degrees. As a result of the simulation in the environment, lines $L1_G$ to $L5_G$ indicate "in the sun, PPFD value," "in the sun, photosystem reaction maximum ETR," "carbon reduction reaction maximum ETR (average temperature of 8 degrees)," "in the sun, transport ETR (average temperature of 8 degrees)," and "in the sun, effective PPFD value (average temperature of 8 degrees)."

In FIG. 47, a line $L6_G$ indicates a change in the environment improvement effective PPFD value (in the sun, maximum supplemental lighting effective PPFD value (average temperature of 8 degrees)) obtained by the temperature control performed by the temperature control apparatus 304 according to the environment improvement temperature (+5 degrees) and the supplemental lighting performed by the lighting apparatus 303 according to the maximum amount of supplemental lighting in the sun in the environment G.

Here, focusing on "in the sun, effective PPFD value" indicated by the line $L5_G$ and "in the sun, maximum supplemental lighting effective PPFD value" indicated by the line $L6_G$ in FIG. 47, "in the sun, effective PPFD value" becomes zero after the sunset after 16 o'clock. However, the temperature control according to the environment improvement temperature and the supplemental lighting according to the maximum amount of supplemental lighting can be performed to obtain "in the sun, maximum supplemental lighting effective PPFD value" close to "in the sun, effective PPFD value" even after the sunset.

In addition, comparing "in the sun, maximum supplemental lighting effective PPFD value (average temperature of 8 degrees)" in the environment G of FIG. 47 and "in the sun, maximum supplemental lighting effective PPFD value (average temperature of 3 degrees)" in the environment C of FIG. 35, the line $L6_G$, in which not only the supplemental lighting according to the maximum amount of supplemental lighting, but also the temperature control according to the environment improvement temperature is performed, indicates greater effective PPFD values than the line $L6_C$ as is clear from the shapes of the line $L6_G$ in FIG. 47 and the line $L6_C$ in FIG. 35.

(2-4) Display Example of Environment H (in the Shade, Average Temperature of 8 Degrees)

Figure 48:
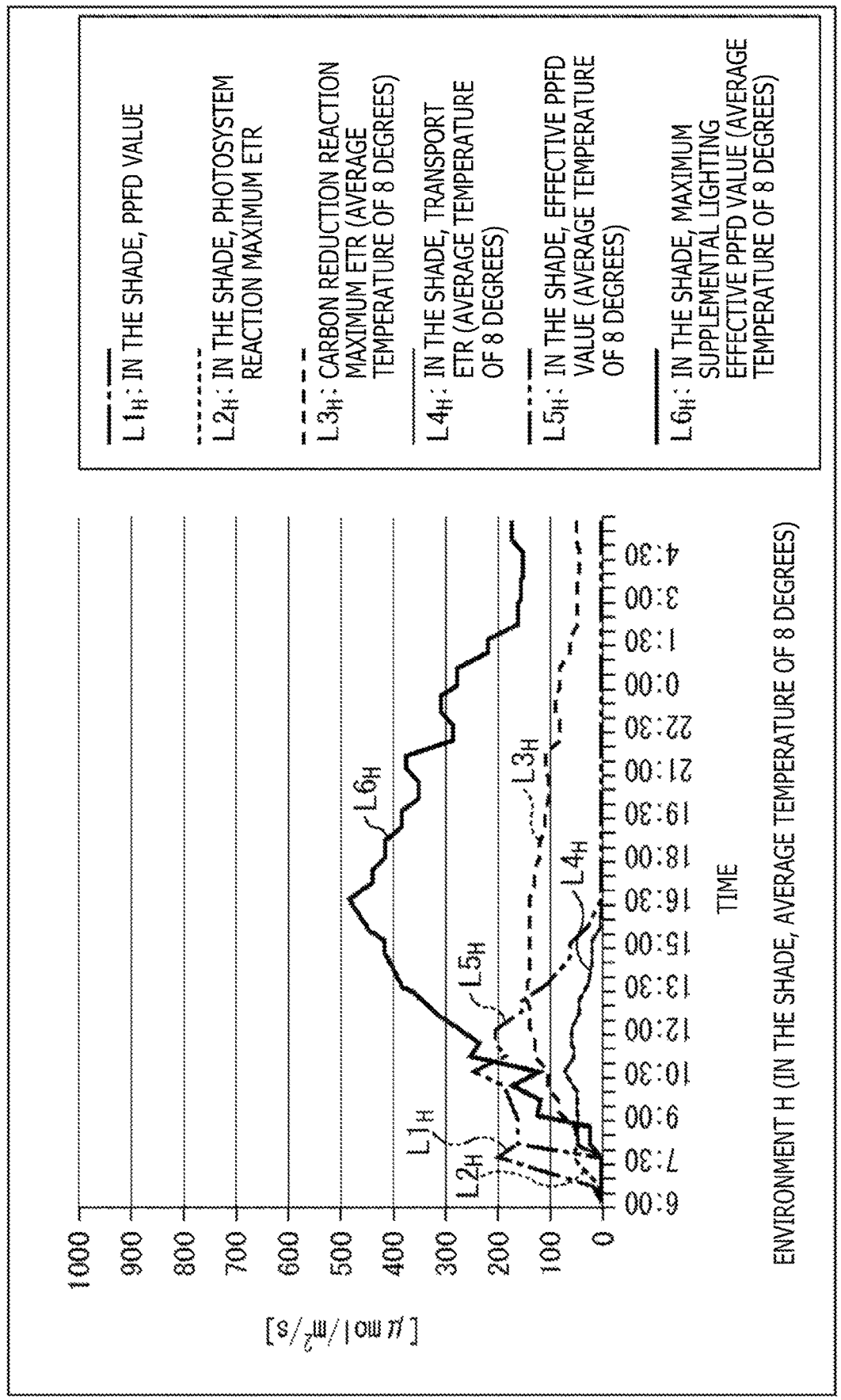
FIG. 48 is a diagram illustrating a display example of the maximum supplemental lighting effective PPFD value (average temperature of 8 degrees) in an environment H.

FIG. 48 is a diagram illustrating a display example of the maximum supplemental lighting effective PPFD value (average temperature of 8 degrees) in the environment H.

In the environment H, the plant is in the shade, and the average temperature of one day around the plant is 8 degrees. As a result of the simulation in the environment, lines $L1_H$ to $L5_H$ indicate "in the shade, PPFD value," "in the shade, photosystem reaction maximum ETR," "carbon reduction reaction maximum ETR (average temperature of 8 degrees)," "in the shade, transport ETR (average temperature of 8 degrees)," and "in the shade, effective PPFD value (average temperature of 8 degrees)."

In FIG. 48, a line $L6_H$ indicates a change in the environment improvement effective PPFD value (in the shade, maximum supplemental lighting effective PPFD value (average temperature of 8 degrees)) obtained by the temperature control performed by the temperature control apparatus 304 according to the environment improvement temperature (+5 degrees) and the supplemental lighting performed by the lighting apparatus 303 according to the maximum amount of supplemental lighting in the shade in the environment H.

Here, focusing on "in the shade, effective PPFD value" indicated by the line $L5_H$ and "in the shade, maximum supplemental lighting effective PPFD value" indicated by the line $L6_H$ in FIG. 48, "in the shade, effective PPFD value" becomes zero after the sunset after 16 o'clock. On the other hand, the temperature control according to the environment improvement temperature and the supplemental lighting according to the maximum amount of supplemental lighting can be performed to obtain "in the shade, maximum supplemental lighting effective PPFD value" regardless of whether the time is before or after the sunset.

In addition, comparing "in the shade, maximum supplemental lighting effective PPFD value (average temperature of 8 degrees)" in the environment H of FIG. 48 and "in the shade, maximum supplemental lighting effective PPFD value (average temperature of 3 degrees)" in the environment D of FIG. 36, the line $L6_H$, in which not only the supplemental lighting according to the maximum amount of supplemental lighting, but also the temperature control according to the environment improvement temperature is performed, indicates greater effective PPFD values than the line $L6_D$ as is clear from the shapes of the line $L6_H$ in FIG. 48 and the line $L6_D$ in FIG. 36.

(Comparison of Third Simulation Results)

Here, the following is comparison of the third simulation results illustrated in FIGS. 45 to 48.

That is, although the average temperature is 20 degrees in both of the environment E in FIG. 45 and the environment F in FIG. 46, "maximum supplemental lighting effective PPFD value (average temperature of 20 degrees)" is greater than "effective PPFD value (average temperature of 20 degrees)" in the shade as compared to in the sun. Therefore, the effect of the temperature control according to the environment improvement temperature and the supplemental lighting according to the maximum amount of supplemental lighting is large.

In addition, although the average temperature is 8 degrees in both of the environment G in FIG. 47 and the environment H in FIG. 48, "maximum supplemental lighting effective PPFD value (average temperature of 8 degrees)" is greater than "effective PPFD value (average temperature of 8 degrees)" in the shade as compared to in the sun. Therefore, the effect of the temperature control according to the environment improvement temperature and the supplemental lighting according to the maximum amount of supplemental lighting is large.

On the other hand, although the environment is in the sun in both of the environment E in FIG. 45 and the environment G in FIG. 47, "in the sun, maximum supplemental lighting effective PPFD value" at the average temperature of 20 degrees is greater than that at the average temperature of 8 degrees. The effect of the temperature control according to the environment improvement temperature and the supplemental lighting according to the maximum amount of supplemental lighting is larger at a higher average temperature even in the same environment in the sun.

In addition, although the environment is in the shade in both of the environment F in FIG. 46 and the environment H in FIG. 48, "in the shade, maximum supplemental lighting effective PPFD value" at the average temperature of 20 degrees is greater than that at the average temperature of 8 degrees. The effect of the temperature control according to the environment improvement temperature and the supplemental lighting according to the maximum amount of supplemental lighting is larger at a higher average temperature even in the same environment in the shade.

Next, integrated values in one day of the PPFD values, the effective PPFD values, and the effective PPFD values+ maximum supplemental lighting will be compared for each simulation in the environments E to H with reference to FIGS. 49 to 52.

(2-5) Display Example of Integrated Values in One Day in Environment E (in the Sun, Average Temperature of 20 Degrees)

Figure 49:
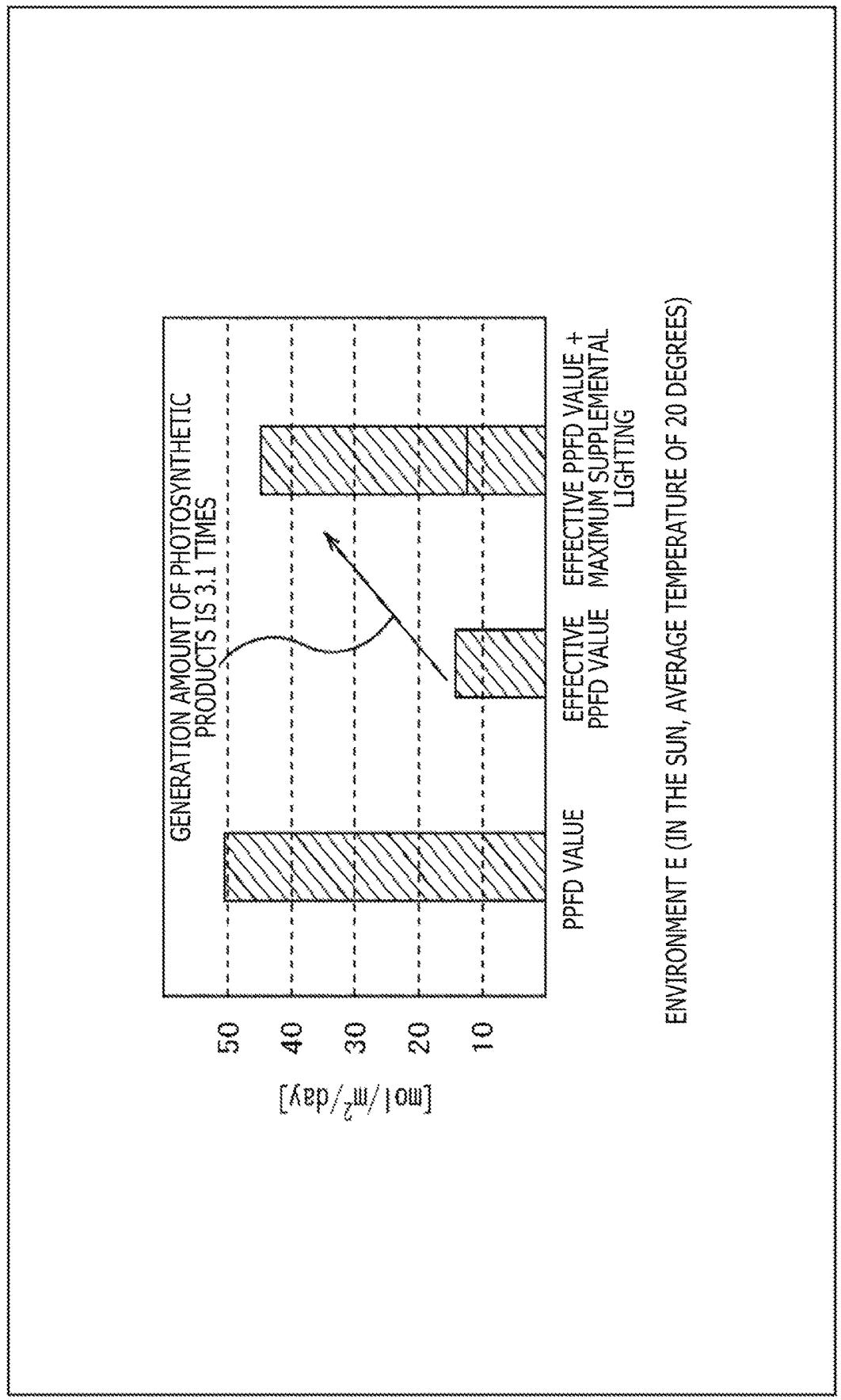
FIG. 49 is a diagram illustrating a display example of the integrated values in one day of the PPFD values in the environment E.

FIG. 49 is a diagram illustrating a display example of integrated values in one day of the PPFD values in the environment E.

In FIG. 49, comparing the integrated value in one day of the effective PPFD values and the integrated value in one day of the effective PPFD values+maximum supplemental lighting obtained in the simulation of the environment E, the integrated value of the effective PPFD values is approximately 14.8 (mol/m$^2$/day), and the integrated value of the effective PPFD values+maximum supplemental lighting is approximately 45.9 (mol/m$^2$/day). Therefore, the integrated value of the effective PPFD values+maximum supplemental lighting is approximately 3.1 times the integrated value of the effective PPFD values in the environment E.

That is, in the case where the temperature control according to the environment improvement temperature and the supplemental lighting according to the maximum amount of supplemental lighting are performed, the generated amount of photosynthetic products, such as sugar of plant, is approximately 3.1 times according to the difference between the integrated value of the effective PPFD values and the integrated value of the effective PPFD values+maximum supplemental lighting. It can be understood that the amount of growth of the plant is significantly increased by performing the environment improvement control.

In addition, comparing the integrated values of the PPFD values in the environment E of FIG. 49 and the integrated values of the PPFD values in the environment A of FIG. 37, the average temperature is raised 5 degrees from 15 degrees to 20 degrees in the temperature control, and therefore, the generated amount of photosynthetic products of the plant can be slightly increased in the environment E compared to the environment A, from 3 times to 3.1 times.

(2-6) Display Example of Integrated Values in One Day in Environment F (in the Shade, Average Temperature of 20 Degrees)

Figure 50:
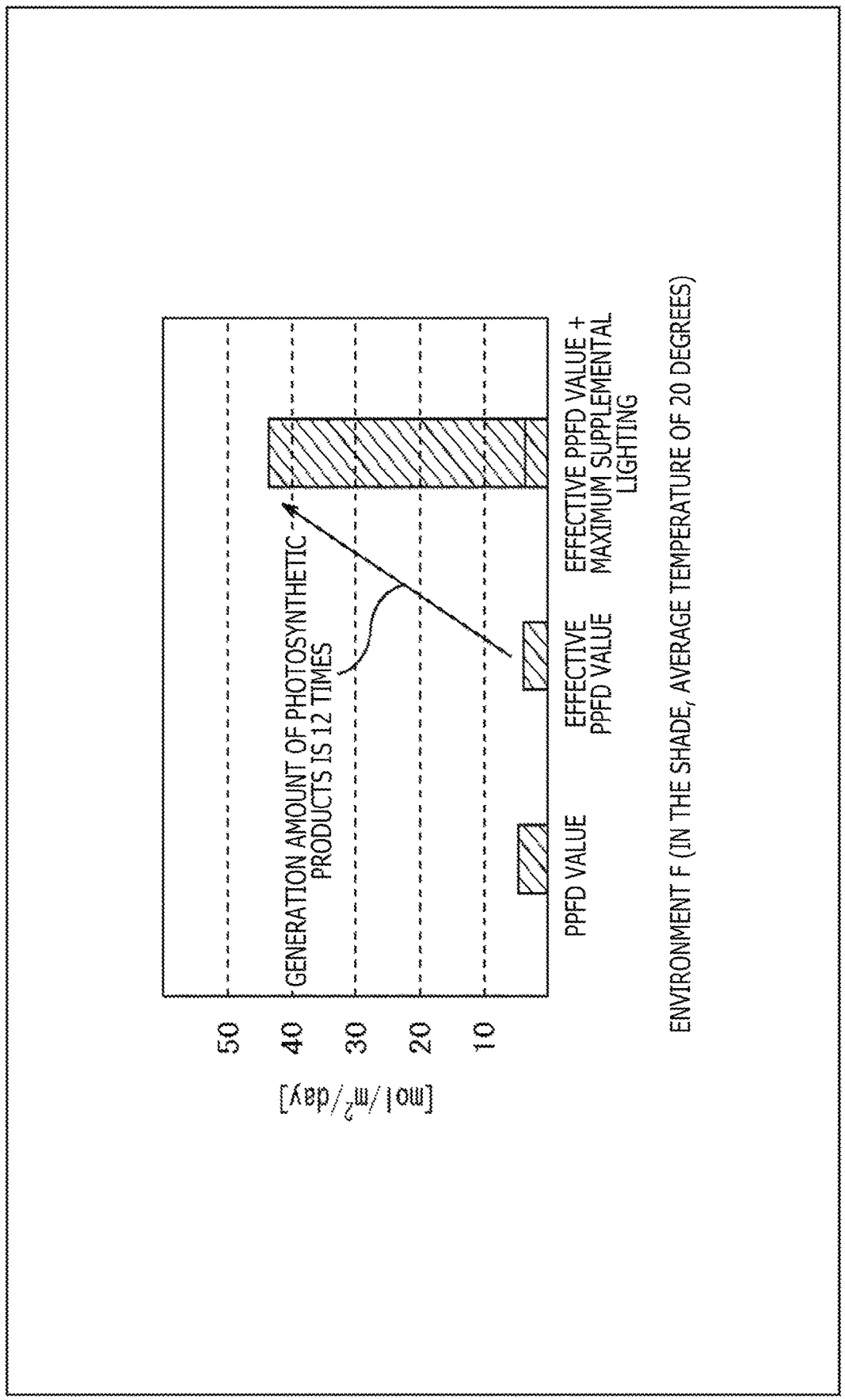
FIG. 50 is a diagram illustrating a display example of the integrated values in one day of the PPFD values in the environment F.

FIG. 50 is a diagram illustrating a display example of integrated values in one day of the PPFD values in the environment F.

In FIG. 50, comparing the integrated value in one day of the effective PPFD values and the integrated value in one day of the effective PPFD values+maximum supplemental lighting obtained in the simulation of the environment F, the integrated value of the effective PPFD values is approximately 3.7 (mol/m$^2$/day), and the integrated value of the effective PPFD values+maximum supplemental lighting is approximately 44.4 (mol/m$^2$/day). Therefore, the integrated value of the effective PPFD values+maximum supplemental lighting is approximately 12 times the integrated value of the effective PPFD values in the environment F.

That is, in the case where the temperature control according to the environment improvement temperature and the supplemental lighting according to the maximum amount of supplemental lighting are performed, the generated amount of photosynthetic products, such as sugar of plant, is approximately 12 times according to the difference between the integrated value of the effective PPFD values and the integrated value of the effective PPFD values+maximum supplemental lighting. It can be understood that the amount of growth of the plant is considerably increased by performing the environment improvement control.

In addition, comparing the integrated values of the PPFD values in the environment F of FIG. 50 and the integrated values of the PPFD values in the environment B of FIG. 38, the average temperature is raised 5 degrees from 15 degrees to 20 degrees in the temperature control, and therefore, the generated amount of photosynthetic products of the plant can be slightly increased in the environment F compared to the environment B, from 11 times to 12 times.

(2-7) Display Example of Integrated Values in One Day in Environment G (in the Sun, Average Temperature of 8 Degrees)

Figure 51:
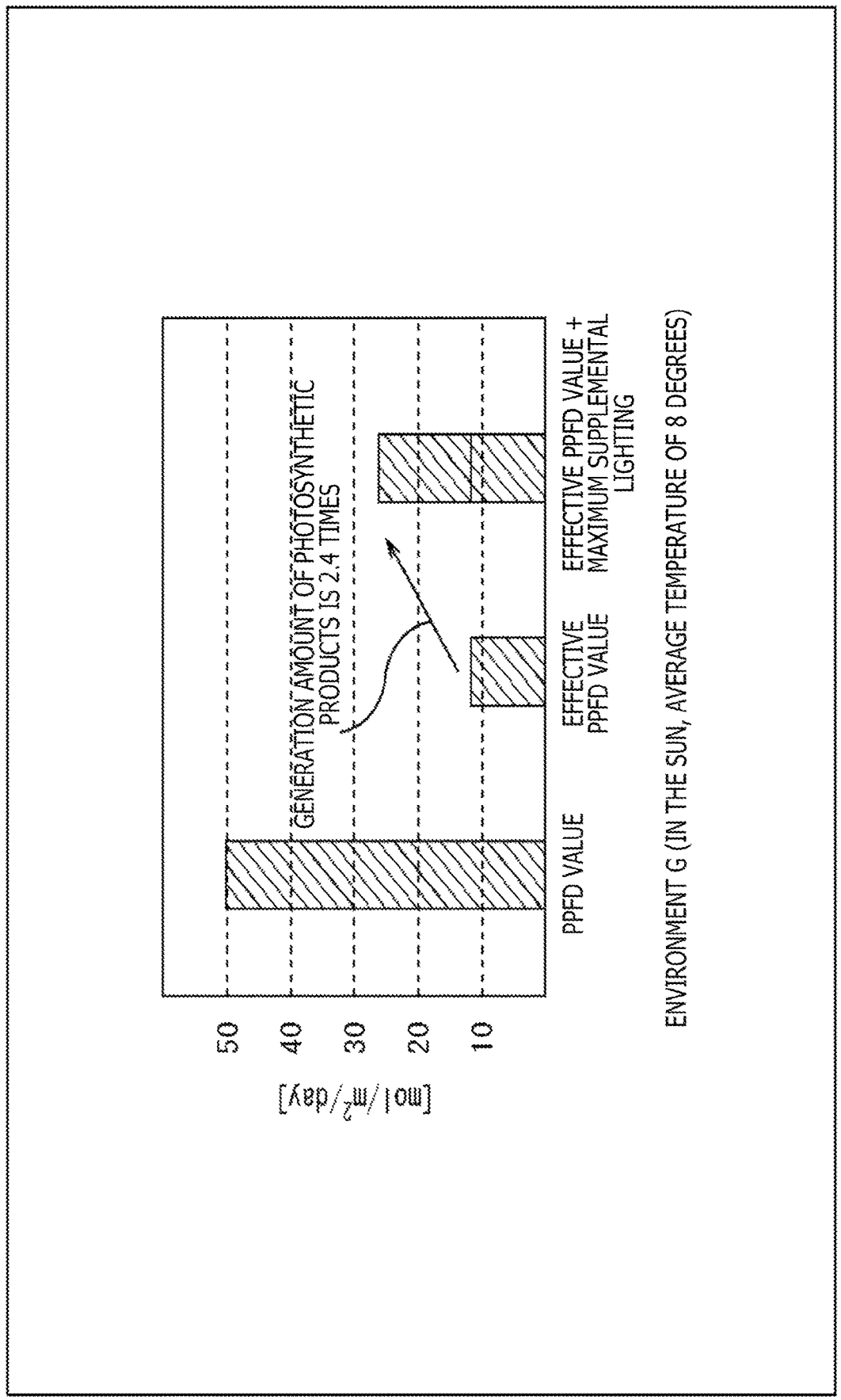
FIG. 51 is a diagram illustrating a display example of the integrated values in one day of the PPFD values in the environment G.

FIG. 51 is a diagram illustrating a display example of integrated values in one day of the PPFD values in the environment G.

In FIG. 51, comparing the integrated value in one day of the effective PPFD values and the integrated value in one day of the effective PPFD values+maximum supplemental lighting obtained in the simulation of the environment G, the integrated value of the effective PPFD values is approximately 11.4 (mol/m$^2$/day), and the integrated value of the effective PPFD values+maximum supplemental lighting is approximately 27.4 (mol/m$^2$/day). Therefore, the integrated value of the effective PPFD values+maximum supplemental lighting is approximately 2.4 times the integrated value of the effective PPFD values in the environment G.

That is, in the case where the temperature control according to the environment improvement temperature and the supplemental lighting according to the maximum amount of supplemental lighting are performed, the generated amount of photosynthetic products, such as sugar of plant, is approximately 2.4 times according to the difference between the integrated value of the effective PPFD values and the integrated value of the effective PPFD values+maximum supplemental lighting. It can be understood that the amount of growth of the plant is significantly increased by performing the environment improvement control.

In addition, comparing the integrated values of the PPFD values in the environment G of FIG. 51 and the integrated values of the PPFD values in the environment C of FIG. 39, the average temperature is raised 5 degrees from 3 degrees to 8 degrees in the temperature control, and therefore, the generated amount of photosynthetic products of the plant can be increased in the environment G compared to the environment C, from 1.7 times to 2.4 times.

That is, focusing on the environments in the sun, it can be understood that although the temperature is raised by the same 5 degrees in the temperature control, the increase in the amount of growth of the plant in the environments with lower average temperatures including the environment C of FIG. 39 (average temperature of 3 degrees, generated amount of photosynthetic products is 1.7 times) and the environment G of FIG. 51 (average temperature of 8 degrees, generated amount of photosynthetic products is 2.4 times) is greater than the increase in the amount of growth of the plant in the environments with higher average temperatures including the environment A of FIG. 37 (average temperature of 15 degrees, generated amount of photosynthetic products is 3 times) and the environment E of FIG. 49 (average temperature of 20 degrees, generated amount of photosynthetic products is 3.1 times) as a result of the environment improvement control.

(2-8) Display Example of Integrated Values in One Day in Environment H (in the Shade, Average Temperature of 8 Degrees)

Figure 52:
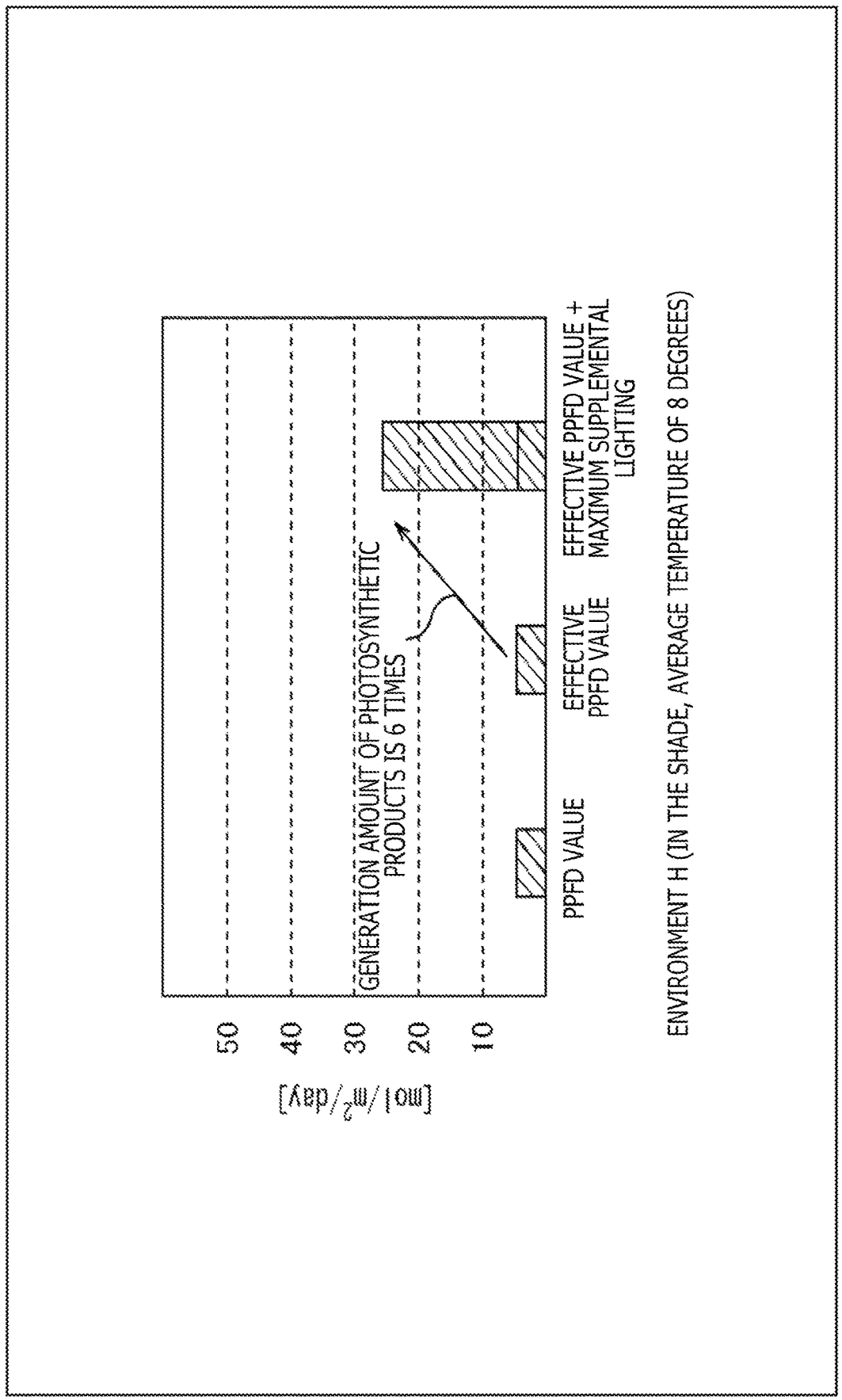
FIG. 52 is a diagram illustrating a display example of the integrated values in one day of the PPFD values in the environment H.

FIG. 52 is a diagram illustrating a display example of integrated values in one day of the PPFD values in the environment H.

In FIG. 52, comparing the integrated value in one day of the effective PPFD values and the integrated value in one day of the effective PPFD values+maximum supplemental lighting obtained in the simulation of the environment H, the integrated value of the effective PPFD values is approximately 4.3 (mol/m$^2$/day), and the integrated value of the effective PPFD values+maximum supplemental lighting is approximately 25.8 (mol/m$^2$/day). Therefore, the integrated value of the effective PPFD values+maximum supplemental lighting is approximately 6 times the integrated value of the effective PPFD values in the environment H.

That is, in the case where the temperature control according to the environment improvement temperature and the supplemental lighting according to the maximum amount of supplemental lighting are performed, the generated amount of photosynthetic products, such as sugar of plant, is approximately 6 times according to the difference between the integrated value of the effective PPFD values and the integrated value of the effective PPFD values+maximum supplemental lighting. It can be understood that the amount of growth of the plant is considerably increased by performing the environment improvement control.

In addition, comparing the integrated values of the PPFD values in the environment H of FIG. 52 and the integrated values of the PPFD values in the environment D of FIG. 40, the average temperature is raised 5 degrees from 3 degrees to 8 degrees in the temperature control, and therefore, the generated amount of photosynthetic products of the plant can be slightly increased in the environment H compared to the environment D, from 4 times to 6 times.

That is, focusing on the environments in the shade, it can be understood that although the temperature is raised by the same 5 degrees in the temperature control, the increase in the amount of growth of the plant in the environments with lower average temperatures including the environment D of FIG. 40 (average temperature of 3 degrees, generated amount of photosynthetic products is 4 times) and the environment H of FIG. 52 (average temperature of 8 degrees, generated amount of photosynthetic products is 6 times) is greater than the increase in the amount of growth of the plant in the environments with higher average temperatures including the environment B of FIG. 38 (average temperature of 15 degrees, generated amount of photosynthetic products is 11 times) and the environment F of FIG. 50 (average temperature of 20 degrees, generated amount of photosynthetic products is 12 times) as a result of the environment improvement control.

Note that the display examples illustrated in FIGS. 45 to 52 are examples of the display mode for presenting the statistics of the data, such as effective PPFD value+maximum supplemental lighting, and the statistics of the data, such as effective PPFD value+maximum supplemental lighting, may be displayed in other display modes.

In addition, the data can be compiled in a predetermined time range, such as on a daily basis, a weekly basis, and a monthly basis, as illustrated in FIGS. 49 to 52 to accumulate the data regarding, for example, the sunshine important for the growth of the plant. In this way, for example, the data, such as effective PPFD value+maximum supplemental lighting, can be compiled in a common time unit, such as on a daily basis and a weekly basis, for each plant as the measured object 1. In addition, the data, such as effective PPFD value+maximum supplemental lighting, can be presented as two-dimensional information for each region.

In this way, the PPFD value actually contributed to the growth of the plant is displayed as the effective PPFD value, and in addition, the environment improvement effective PPFD value can also be displayed. Therefore, the growth of the plant as the measured object 1 can be analyzed from various angles.

That is, it is known that the photosynthesis of a plant is affected by the number of photons that are particles of light, instead of the energy of light. However, the number of photons that allows the plant to effectively utilize the light is significantly affected by environmental conditions, such as carbon dioxide concentration ($CO_2$ concentration), temperature, humidity, and nutrients, as well as the type and the state of the plant. Therefore, the PPFD value that can be effectively utilized by the plant is predicted from the environmental conditions as well as the type and the state of the plant to calculate and display the effective PPFD value in the present technique. In addition, the effective PPFD value is further utilized here to improve the environment by using the prediction information to increase the growth of the plant.

Note that although an outdoor plant, such as a plant in a field and grass in a stadium, is mainly described as the measured object 1 in the description above, the environment improvement control of the present technique can also be applied to, for example, a plant in an indoor facility, such as a plant factory and a plastic greenhouse.

<5. Modifications>
(Another Example of Reference Reflection Plate)

Although the reference reflection plate with flat spectral reflection characteristics, such as a gray reflection plate, is used as the reference reflection plate 20 in the description above, the reference reflection plate is not limited to the movable plate-like shape, and the reference reflection plate may be a predetermined fixed region as long as the reflectance is known. For example, in the case of measuring the grass of a stadium, the en-tout-cas can be used as a reference reflection region. Furthermore, in the case of using, for example, the region without flat spectral reflection characteristics, such as en-tout-cas, as a reference reflection region, the coefficient calculation LUT (LUT1) corresponding to the reference reflection region needs to be prepared as described above.

Note that a reference reflection plate with predetermined reflectance may be created, and the reference reflection plate may be used as the reference reflection plate 20. In this case, the reference reflection plate can also be installed at an arbitrary position, and for example, the reference reflection plate with predetermined reflectance can be installed at a position that allows sensing the reference reflection plate at the same time as the measured object 1 as illustrated in FIG. 11. In addition, the reference reflection plate 20 (reference reflection region) may be sensed at a different time from the measured object 1.

(Other Vegetation Indices)

In addition, although the normalized difference vegetation index (NDVI value) is described as an example of the index (vegetation index) when a plant is set as the measured object 1 in the description above, a vegetation index other than the normalized difference vegetation index (NDVI value) may be measured. For example, a ratio vegetation index (RVI), a difference vegetation index (DVI), or the like can be used as the vegetation index.

Here, the ratio vegetation index (RVI value) can be calculated by computing the following Equation (19).

$$RVI = IR/R \quad (19)$$

In addition, the difference vegetation index (DVI value) can be calculated by computing the following Equation (20).

$$DVI = IR - R \quad (20)$$

Here, in Equation (19) and Equation (20), IR represents the reflectance of the infrared region, and R represents the reflectance of red in the visible region. Note that although only the vegetation indices including IR and R as parameters are illustrated here, the reflectance or the like of light in the visible region other than red can be obviously used as a parameter to measure another vegetation index. In addition, the ratio of spectra is not limited to the combination of R and IR. In a case where the sensor 144 outputs components of other wavelength bands, such as G and B other than R and IR, as output of RGBIR, these values may also be used.

(Another Configuration Example During Measurement of Sensing Apparatus)

Although the sensing apparatus 101 is mounted on the mobile measurement apparatus 70 that performs mobile observation (FIG. 11) or on the fixed-point measurement apparatus 80 that performs fixed-point observation (FIG. 11) in the case described above, any configuration can be adopted as long as the sensing apparatus 101 can sense the measured object 1 and the reference reflection plate 20.

For example, the sensing apparatus 101 may be mounted on a satellite. In the satellite, index measurement data (for example, measurement values corresponding to satellite image) obtained by sensing of the sensing apparatus 101 (imaging from satellite) is transmitted to the effective index computation apparatus 103 through a predetermined communication path. In addition, the calculation unit 171 in the effective index computation apparatus 103 can obtain the index (PPFD value) of the measured object 1 (for example, plant in field) measured from the satellite on the basis of the index measurement data transmitted from the sensing apparatus 101 mounted on the satellite.

(Specific Example of Amount of Environment Improvement)

In the description above, the environment improvement amount calculation process is executed to obtain the amount of environment improvement in the process of step S203 in FIG. 30, the process of step S244 in FIG. 43, and the process of step S248 in FIG. 43. The amount of environment improvement is information regarding the environment improvement that affects the calculation of the effective PPFD value, and for example, the following information is included.

That is, examples of the information include an amount of control of hardware, such as the lighting apparatus 303, including an LED or the like as a light source and include an amount of fertilizer in a case where the control cannot be performed on the basis of the hardware. In addition, the information regarding the environment improvement is obviously used for the environment improvement control of the control unit 332 (environment improvement control unit 351 of the control unit 332), and for example, the control unit 332 (display control unit 352 of the control unit 332) may also display, on the display unit 324, the information as information of numeric values, text, image, and the like.

<6. Configuration of Computer>

The series of processes (process of steps S102 to S106 in the effective PPFD value calculation process in FIG. 10, real-time environment control process in FIG. 30, or predicted environment control process in FIG. 43) can be executed by hardware or can be executed by software. In the case where the software executes the series of processes, a program included in the software is installed on a computer. FIG. 53 is a diagram illustrating a configuration example of the hardware of the computer that uses the program to execute the series of processes.

In a computer 1000, a CPU (Central Processing Unit) 1001, a ROM (Read Only Memory) 1002, and a RAM (Random Access Memory) 1003 are connected to each other through a bus 1004. An input-output interface 1005 is also connected to the bus 1004. An input unit 1006, an output unit 1007, a recording unit 1008, a communication unit 1009, and a drive 1010 are connected to the input-output interface 1005.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface and the like. The drive 1010 drives a removable storage medium 1011, such as a magnetic disk, an optical disk, a magneto-optical disk, and a semiconductor memory.

In the computer 1000 configured in this way, the CPU 1001 loads a program recorded in the ROM 1002 or the recording unit 1008 to the RAM 1003 through the input-output interface 1005 and the bus 1004 to execute the program to thereby execute the series of processes.

The program executed by the computer 1000 (CPU1001) can be provided by, for example, recording the program in the removable storage medium 1011 as a package medium or the like. The program can also be provided through wired or wireless transmission medium, such as a local area network, the Internet, and digital satellite broadcasting.

In the computer 1000, the removable storage medium 1011 can be mounted on the drive 1010 to install the program on the recording unit 1008 through the input-output interface 1005. In addition, the communication unit 1009 can receive the program through a wired or wireless transmission medium to install the program on the recording medium 1008. Furthermore, the program can be installed in advance on the ROM 1002 or the recording medium 1008.

Here, the processes executed by the computer according to the program in the present specification may not be executed in chronological orders described in the flow charts. That is, the processes executed by the computer according to the program also include processes executed in parallel or executed individually (for example, processes in parallel processing or processes using objects). In addition, the program may be processed by one computer (processor), or a plurality of computers may execute distributed processing of the program.

Note that the embodiments of the present technique are not limited to the embodiments described above, and various changes can be made without departing from the scope of the present technique. For example, a mode with a combination of all or part of the plurality of embodiments can be adopted.

Note that the present technique can be configured as follows.

(1)

A control apparatus including:

a control unit acquiring information regarding improvement of an environment that affects calculation of an effective index on a basis of the effective index representing an index that is related to light incident on a measured object and that is effectively utilized for the measured object.

(2)

The control apparatus according to (1), in which the measured object is a plant, and the effective index is obtained by converting a transport ETR (Electron Transfer Rate) of the plant into an amount of light incident on the plant.

(3)

The control apparatus according to (2), in which the transport ETR is a smaller ETR of a photosystem reaction maximum ETR that is a maximum value of photosystem reaction in the plant and a carbon reduction reaction maximum ETR that is a maximum value of carbon reduction reaction.

(4)

The control apparatus according to (3), in which the control unit acquires the information regarding the improvement of the environment based on at least one of an environment improvement target corresponding to the photosystem reaction or an environment improvement target corresponding to the carbon reduction reaction.

(5)

The control apparatus according to (4), in which the control unit decides that the environment improvement target is light in a case where a photosynthetic rate is limited by the photosystem reaction and acquires information regarding application of light to the plant as the information regarding the improvement of the environment.

(6)

The control apparatus according to (5), in which the control unit sets a value corresponding to a difference between the carbon reduction reaction maximum ETR and the photosystem reaction maximum ETR as a maximum amount of supplemental lighting and acquires the information regarding the application of light to the plant.

(7)

The control apparatus according to any one of (4) to (6), in which the control unit decides that the environment improvement target is at least one of temperature, humidity, or carbon dioxide concentration around the plant or nutrients for the plant in a case where the photosynthetic rate is limited by the carbon reduction reaction and acquires information regarding improvement of the environment.

(8)

The control apparatus according to any one of (1) to (7), in which the control unit improves the environment that affects the calculation of the effective index by controlling an environment improvement apparatus that improves the environment for the measured object on a basis of the information regarding the improvement of the environment.

(9)

The control apparatus according to any one of claims (1) to (8), in which the control unit controls display of the information regarding the improvement of the environment.

(10)

The control apparatus according to any one of (1) to (9), in which the control unit acquires the information regarding the improvement of the environment on a basis of the effective index acquired in real time.

(11)

The control apparatus according to any one of (1) to (9), in which the control unit acquires the information regarding the improvement of the environment on a basis of the effective index predicted from prediction information prepared in advance.

(12)

The control apparatus according to (11), in which the control unit controls the improvement of the environment on a basis of the information regarding the improvement of the environment after an end of preparation for the improvement of the environment according to the predicted effective index.

(13)

The control apparatus according to any one of (2) to (7), in which the index regarding the light incident on the plant is obtained from a measurement value of the plant obtained by sensing of an image sensor.

(14)

The control apparatus according to (2) to (7) or (13), in which the index is a photosynthetic photon flux density (PPFD), and the effective index is an effective PPFD value representing a PPFD value contributed to growth of the plant among PPFD values.

(15)

A control method of a control apparatus executed by the control apparatus, the control method including:

a step of acquiring information regarding improvement of an environment that affects calculation of an effective index on a basis of the effective index representing an index that is related to light incident on a measured object and that is effectively utilized for the measured object.

(16)

A control system including:

a sensing apparatus sensing a measured object;

an environment sensor sensing an environment around the measured object;

an environment improvement apparatus improving an environment for the measured object; and a control apparatus controlling the environment improvement apparatus, the control apparatus including a calculation unit calculating an effective index representing an index effectively utilized for the measured object as an index regarding light incident on the measured object on a basis of sensing results of the sensing apparatus and the environment sensor, and a control unit controlling the environment improvement apparatus on a basis of the effective index to improve an environment that affects the calculation of the effective index.

(17)

A control apparatus including:

a control unit controlling display of information obtained by controlling improvement of an environment that affects calculation of an effective index based on the effective index representing an index that is related to light incident on a measured object and that is effectively utilized for the measured object.

(18)

The control apparatus according to (17), in which the measured object is a plant, the effective index is obtained by converting a transport ETR of the plant into an amount of light incident on the plant, the transport ETR is a smaller ETR of a photosystem reaction maximum ETR that is a maximum value of photosystem reaction in the plant and a carbon reduction reaction maximum ETR that is a maximum value of carbon reduction reaction, the environment is improved on a basis of at least one of an environment improvement target corresponding to the photosystem reaction or an environment improvement target corresponding to the carbon reduction reaction, and the control unit causes displaying of a value of the effective index before the improvement of the environment and a value of the effective index after the improvement of the environment.

(19)

The control apparatus according to (18), in which the control unit causes displaying of a value of the effective index after the improvement of the environment obtained by improving light for the plant as the environment improvement target in a case where a photosynthetic rate is limited by the photosystem reaction.

(20)

The control apparatus according to (18) or (19), in which the control unit causes displaying of a value of the effective index after the improvement of the environment obtained by improving at least one of temperature, humidity, or carbon dioxide concentration around the plant or nutrients for the plant as the environment improvement target in a case where the photosynthetic rate is limited by the carbon reduction reaction.

(21)

The control apparatus according to any one of (18) to (20), in which the index is a photosynthetic photon flux density (PPFD), and the effective index is an effective PPFD value representing a PPFD value contributed to growth of the plant among PPFD values.

(22)

A control method of a control apparatus executed by the control apparatus, the control method including:

a step of controlling display of information obtained by controlling improvement of an environment that affects calculation of an effective index based on the effective index representing an index that is related to light incident on a measured object and that is effectively utilized for the measured object.

REFERENCE SIGNS LIST

10, 11 Effective index computation system, 20 Reference reflection plate, 30, 31, 32 Environment control system, 101, 101-1, 101-2 Sensing apparatus, 102 Environment sensor, 103 Effective index computation apparatus, 105 Client apparatus, 108 Network, 109 Server, 110 Storage, 121 Measurement unit, 122 Processing unit 141, 141-1, 141-2 Lens, 142, 142-1, 142-2 Exposure unit, 143 Filter, 143-1 RGB filter, 143-2 IR filter, 144, 144-1, 144-2 Sensor, 145, 145-1, 145-2 Signal processing unit, 146 I/F unit, 161 I/F unit, 162 Processing unit, 163 Storage unit, 164 Display unit, 171 Calculation unit, 172 Control unit, 221-1 B/R value calculation unit, 221-2 B/G value calculation unit, 221-3 G/R value calculation unit, 222-1 W1 decision unit, 222-2 W2 decision unit, 222-3 W3 decision unit, 223-1 Multiplier, 223-2 Multiplier, 223-3 Multiplier, 301 Environment control apparatus, 303 Lighting apparatus, 304 Temperature control apparatus, 305 Humidity control apparatus, 306 $CO_2$ concentration control apparatus, 311 Information site server, 312 Database, 321 I/F unit, 322 Processing unit, 323 Storage unit, 324 Display unit, 331 Calculation unit, 332 Control unit, 341 Effective PPFD value calculation unit, 342 Environment improvement amount calculation unit, 343 Predicted effective PPFD value calculation unit, 351 Environment improvement control unit, 352 Display control unit, 361 I/F unit, 362 Control unit, 363 Lighting unit, 371, 371-1 to 371-N LED, 1000 Computer, 1001 CPU

The invention claimed is:

1. A control apparatus comprising:

a processor configured to acquire environment improvement information regarding improvement of an environment that affects calculation of an effective index on a basis of the effective index, and control an environment improvement apparatus to improve an environment for a plant on a basis of the environment improvement information, wherein the effective index represents an index that is related to light incident on the plant and is effectively utilized for the plant, the effective index is obtained by converting a transport ETR (Electron Transfer Rate) of the plant into an amount of light incident on the plant, and the transport ETR is set to be a lower ETR value of a photosystem reaction maximum ETR, which is a maximum value of photosystem reaction in the plant and a carbon reduction reaction maximum ETR, which is a maximum value of carbon reduction reaction.

2. The control apparatus according to claim 1, wherein the processor acquires the environment improvement information based on at least one of an environment improvement target corresponding to the photosystem reaction or an environment improvement target corresponding to the carbon reduction reaction.

3. The control apparatus according to claim 2, wherein the processor determines that the environment improvement target is light when a photosynthetic rate is limited by the photosystem reaction, and acquires information regarding application of supplemental light to the plant as the environment improvement information.

4. The control apparatus according to claim 3, wherein the processor determines a maximum amount of supplemental light based on a difference between the carbon reduction reaction maximum ETR and the photosystem reaction maximum ETR, and sets the maximum amount of supplemental light as the information regarding application of supplemental light to the plant.

5. The control apparatus according to claim 2, wherein the processor determines that the environment improvement target is at least one of temperature, humidity, or carbon dioxide concentration around the plant or nutrients for the plant when the photosynthetic rate is limited by the carbon reduction reaction.

6. The control apparatus according to claim 1, wherein the processor controls display of the environment improvement information.

7. The control apparatus according to claim 1, wherein the processor acquires the environment improvement information on a basis of the effective index acquired in real time.

8. The control apparatus according to claim 1, wherein the processor acquires prediction information prepared in advance, calculate a predicted effective index based on the prediction information, and acquires the environment improvement information on a basis of the predicted effective index, wherein the prediction information includes temperature information.

9. The control apparatus according to claim 8, wherein
the processor determines whether to repeat or end a process for calculating the predicted effective index, and
in response to ending the process, controls the improvement of the environment on a basis of the environment improvement information.

10. The control apparatus according to claim 1, wherein
the index regarding the light incident on the plant is obtained from a measurement value of the plant obtained by sensing of an image sensor.

11. The control apparatus according to claim 10, wherein
the index is a photosynthetic photon flux density (PPFD), and
the effective index is an effective PPFD value representing a PPFD value contributed to growth of the plant among PPFD values.

12. A control method of a control apparatus executed by the control apparatus, the control method comprising:
acquiring environment improvement information regarding improvement of an environment that affects calculation of an effective index on a basis of the effective index, and
controlling an environment improvement apparatus to improve the environment for the plant on a basis of the environment improvement information, wherein
the effective index represents an index that is related to light incident on a plant and that is effectively utilized for the plant,
the effective index is obtained by converting a transport ETR (Electron Transfer Rate) of the plant into an amount of light incident on the plant, and
the transport ETR is set to be a lower ETR value of a photosystem reaction maximum ETR, which is a maximum value of photosystem reaction in the plant and a carbon reduction reaction maximum ETR, which is a maximum value of carbon reduction reaction.

13. A control system comprising:
a sensing apparatus sensing a plant;
an environment sensor configured to sense an environment around the plant;
an environment improvement apparatus configured to improve an environment for the plant; and
a control apparatus configured to control the environment improvement apparatus, the control apparatus including
a processor configured to
calculate an effective index representing an index effectively utilized for the plant as an index regarding light incident on the plant on a basis of sensing results of the sensing apparatus and the environment sensor, and
control the environment improvement apparatus on a basis of the effective index to improve an environment that affects the calculation of the effective index, wherein
the effective index is obtained by converting a transport ETR (Electron Transfer Rate) of the plant into an amount of light incident on the plant, and
the transport ETR is set to be a lower ETR value of a photosystem reaction maximum ETR, which is a maximum value of photosystem reaction in the plant and a carbon reduction reaction maximum ETR, which is a maximum value of carbon reduction reaction.

14. A control apparatus comprising:
a processor configured to
control display of information obtained by controlling improvement of an environment that affects calculation of an effective index based on the effective index representing an index that is related to light incident on a plant and that is effectively utilized for the plant,
improve the environment by controlling an environment improvement apparatus on a basis of at least one of an environment improvement target, and
cause displaying of a value of the effective index before the improvement of the environment and a value of the effective index after the improvement of the environment, wherein
the effective index is obtained by converting a transport ETR (Electron Transfer Rate) of the plant into an amount of light incident on the plant, and
the transport ETR is set to be a lower ETR value of a photosystem reaction maximum ETR, which is a maximum value of photosystem reaction in the plant and a carbon reduction reaction maximum ETR, which is a maximum value of carbon reduction reaction.

15. The control apparatus according to claim 14, wherein
the processor causes displaying of a value of the effective index after the improvement of the environment obtained by improving light for the plant as the environment improvement target in a case where a photosynthetic rate is limited by the photosystem reaction.

16. The control apparatus according to claim 14, wherein
the processor causes displaying of a value of the effective index after the improvement of the environment obtained by improving at least one of temperature, humidity, or carbon dioxide concentration around the plant or nutrients for the plant as the environment improvement target in a case where the photosynthetic rate is limited by the carbon reduction reaction.

17. The control apparatus according to claim 14, wherein
the index is a photosynthetic photon flux density (PPFD), and
the effective index is an effective PPFD value representing a PPFD value contributed to growth of the plant among PPFD values.

18. A non-transitory computer readable medium storing a computer program, the computer program being executable by a processor to perform operations comprising:
controlling display of information obtained by controlling improvement of an environment that affects calculation of an effective index based on the effective index representing an index that is related to light incident on a plant and that is effectively utilized for the plant,
improving the environment by controlling an environment improvement apparatus on a basis of at least one of an environment improvement target, and
causing display of a value of the effective index before the improvement of the environment and a value of the effective index after the improvement of the environment, wherein
the effective index is obtained by converting a transport ETR (Electron Transfer Rate) of the plant into an amount of light incident on the plant, and the transport ETR is set to be a lower ETR value of a photosystem reaction maximum ETR, which is a maximum value of photosystem reaction in the plant and a carbon reduction reaction maximum ETR, which is a maximum value of carbon reduction reaction.

* * * * *